United States Patent
Shimizu et al.

(10) Patent No.: US 7,622,898 B2
(45) Date of Patent: Nov. 24, 2009

(54) CHARGING OR DISCHARGING APPARATUS FOR ELECTRICALLY CHARGING OR DISCHARGING A CAPACITOR STORAGE TYPE POWER SOURCE ADAPTED TO STORE ELECTRIC ENERGY IN ELECTRIC DOUBLE LAYER CAPACITORS

(75) Inventors: Masaaki Shimizu, Kanagawa (JP);
Katsuji Mitsui, Kanagawa (JP);
Masahiko Shimizu, Kanagawa (JP);
Shinichi Yamamoto, Kanagawa (JP);
Atsushi Shimizu, Kanagawa (JP);
Masahiko Shinotsuka, Kanagawa (JP);
Masaaki Yamagishi, Kanagawa (JP);
Hiroshi Tsuji, Kyoto (JP)

(73) Assignee: Power Systems Co., Ltd., Kanagawa (JP)

( * ) Notice: Subject to any disclaimer, the term of this patent is extended or adjusted under 35 U.S.C. 154(b) by 323 days.

(21) Appl. No.: 11/707,097

(22) Filed: Feb. 16, 2007

(65) Prior Publication Data

US 2007/0194759 A1 Aug. 23, 2007

(30) Foreign Application Priority Data

| Feb. 17, 2006 | (JP) | 2006-040764 |
| Feb. 20, 2006 | (JP) | 2006-042000 |
| Feb. 20, 2006 | (JP) | 2006-042001 |
| Feb. 21, 2006 | (JP) | 2006-043335 |
| Mar. 24, 2006 | (JP) | 2006-081999 |
| Mar. 24, 2006 | (JP) | 2006-082096 |
| Mar. 24, 2006 | (JP) | 2006-083402 |
| Apr. 18, 2006 | (JP) | 2006-113987 |
| Aug. 1, 2006  | (JP) | 2006-209849 |
| Aug. 29, 2006 | (JP) | 2006-231485 |

(51) Int. Cl.
*H01M 10/46* (2006.01)
(52) U.S. Cl. ........................ 320/166
(58) Field of Classification Search .......... 320/107, 320/137, 139, 141, 166
See application file for complete search history.

(56) References Cited

U.S. PATENT DOCUMENTS 6,917,124 B2 * 7/2005 Shetler et al. ............ 307/66
7,541,782 B2 * 6/2009 Narendra et al. ......... 320/167

* cited by examiner

*Primary Examiner*—Edward Tso
(74) *Attorney, Agent, or Firm*—Rader, Fishman & Grauer, PLLC

(57) ABSTRACT

A charging apparatus for electrically charging a capacitor storage type power source comprises a switching circuit for turning on/off the charge current, a current detection circuit for detecting the charge current, a voltage detection circuit for detecting the voltage of power source, a constant current control circuit for outputting an error amplifying signal according to the current value, a power control circuit for outputting an error amplifying signal according to the current value, the voltage value-and a power reference value, a constant voltage control circuit for outputting an error amplifying signal according to the voltage value and a voltage reference value, an OR circuit for selecting one of the error amplifying signals and a control circuit for generating a pulse width modulation signal according to the error amplifying signal output from the OR circuit to turn on/off the switching circuit and control the charge current.

39 Claims, 47 Drawing Sheets

(a)

capacitor module voltage Vc ≥ 30V capacitor module voltage Vc < 30V

Have 907 constantly on regardless of capacitor module voltage Vc

CHARGING OR DISCHARGING APPARATUS FOR ELECTRICALLY CHARGING OR DISCHARGING A CAPACITOR STORAGE TYPE POWER SOURCE ADAPTED TO STORE ELECTRIC ENERGY IN ELECTRIC DOUBLE LAYER CAPACITORS

CROSS-REFERENCE TO RELATED APPLICATIONS

This patent application is based upon and claims the benefit of priority from the prior Japanese Patent Applications No. 2006-040764 filed on Feb. 17, 2006, No. 2006-042000 filed on Feb. 20, 2006, No. 2006-042001 filed on Feb. 20, 2006, No. 2006-043335 filed on Feb. 21, 2006, No. 2006-081999 filed on Mar. 24, 2006, No. 2006-082096 filed on Mar. 24, 2006, No. 2006-083402 filed on Mar. 24, 2006, No. 2006-113987 filed on Apr. 18, 2006, No. 2006-209849 filed on Aug. 1, 2006 and No. 2006-231485 filed on Aug. 29, 2006, the entire contents of which are incorporated herein by reference.

BACKGROUND OF THE INVENTION (A first aspect of the invention) This invention relates to a charging apparatus for a capacitor storage type power source for electrically charging a capacitor storage type power source storing electric energy in electric double layer capacitors.

The terminal voltages can fluctuate to a large extent in a high voltage and large capacity energy storage type power source, which is formed by connecting a plurality of electric double layer capacitors in series, as a function of the quantity of charged or discharged electric energy. Such a capacitor storage type power source operates inefficiently and gives rise to a problem of withstand current because a large charge current flows in the initial stages of a charging process when charged with electric energy at a constant voltage like a secondary battery. Therefore, such a capacitor storage type power source is charged with electric energy efficiently by way of a constant current charge process. In an energy storage type power source including electric double layer capacitors, a reference value is defined for the charge voltage of the electric double layer capacitors and a parallel monitor is connected to each electric double layer capacitor to limit the terminal voltage of the capacitor, bypassing the charge current, when the terminal voltage (charge voltage) exceeds the reference value because the capacitors that are connected in series can show variances of charge voltage.

Each of the parallel monitors bypasses the charge current in this way to limit the charge voltage to a predetermined level (full charge voltage that is lower than the withstand voltage) to reduce the variances of charge voltage among the electric double layer capacitors. However, as the charge voltages of the electric double layer capacitors rise and the parallel monitors sequentially operate to bypass the charge current, the power loss increases in proportion to the operation time and the number of parallel monitors operating to bypass the charge current. Therefore, it is necessary to avoid a situation where the parallel monitors operate to bypass a large charge current for a long time. Additionally, the charging apparatus for electrically charging an energy storage type power source is required to have a power limiter feature of switching from constant current charge to constant power charge when the charge voltage of the entire energy storage type power source rises above a predetermined level due to constant current charge typically by reducing the charge current in response to the rise of the charge voltage (See, for example, Michio Okamura, "Electric Double-Layer Capacitor and Electricity Accumulation System", The Nikkan Kogyo, Shimbun, Ltd., 3rded. Sep. 30, 2005, pp. 138-139 and Japanese Patent Publication No. 3306325).

(A second aspect of the invention) The present invention relates to a charging apparatus for a capacitor storage type power source for electrically charging a capacitor storage type power source storing electric energy in electric double layer capacitors by controlling the charge current, modulating the pulse width by means of a pulse width modulation means from a charge power source.

The terminal voltages can fluctuate to a large extent in a high voltage and large capacity energy storage type power source, which is formed by connecting a plurality of electric double layer capacitors in series, as a function of the quantity of charged or discharged electric energy. Such a capacitor storage type power source operates inefficiently and gives rise to a problem of withstand current because a large charge current flows in the initial stages of a charging process when charged with electric energy at a constant voltage like a secondary battery. Therefore, such a capacitor storage type power source is charged with electric energy efficiently by way of a constant current charge process. In an energy storage type power source including electric double layer capacitors, a parallel monitor is connected to each electric double layer capacitor to limit the terminal voltage (charge voltage) of the capacitor, bypassing the charge current at a predetermined reference voltage because the capacitors that are connected in series can show variances of charge voltage. Each of the parallel monitors bypasses the charge current in this way to limit the charge voltage to a predetermined level (full charge voltage that is lower than the withstand voltage) to reduce the variances of charge voltage among the electric double layer capacitors. However, as the charge voltages of the electric double layer capacitors rise and the parallel monitors sequentially operate to bypass the charge current, the power loss increases and the parallel monitors have a withstand current upper limit. Therefore, it is necessary to avoid a situation where the parallel monitors operate to bypass a large charge current for a long time. Additionally, the charging apparatus for electrically charging an energy storage type power source is required to have a power limiter feature of switching from constant current charge to constant power charge when the charge voltage of the entire energy storage type power source rises above a predetermined level due to constant current charge typically by reducing the charge current in response to the rise of the charge voltage (See, for example, Michio Okamura, "Electric Double-Layer Capacitor and Electricity Accumulation System", The Nikkan Kogyo Shimbun Ltd., 3rd ed. Sep. 30, 2005, pp. 134-139 and Japanese Patent Publications No. 2894444 and No. 3306325).

(On the third aspect of the invention) The present invention relates to a charging apparatus for electrically charging a capacitor storage type power source including a plurality of electric double layer capacitors connected in series for storing electric energy and having respective parallel monitors for bypassing the charge current at a predetermined voltage.

The terminal voltages can fluctuate to a large extent in a high voltage and large capacity energy storage type power source, which is formed by connecting a plurality of electric double layer capacitors in series, as a function of the quantity of charged or discharged electric energy. Such a capacitor storage type power source operates inefficiently and gives rise to a problem of withstand current because a large charge current flows in the initial stages of a charging process when charged with electric energy at a constant voltage like a secondary battery. Therefore, such a capacitor storage type power source is charged with electric energy efficiently by way of a constant current charge process. In an energy storage type power source including electric double layer capacitors, a parallel monitor is connected to each electric double layer capacitor to limit the terminal voltage (charge voltage) of the capacitor, bypassing the charge current at a predetermined reference voltage because the capacitors that are connected in series can show variances of charge voltage.

Each of the parallel monitors bypasses the charge current in this way to limit the charge voltage to a predetermined level (full charge voltage that is lower than the withstand voltage) to reduce the variances of charge voltage among the electric double layer capacitors. However, as the charge voltages of the electric double layer capacitors rise and the parallel monitors sequentially operate to bypass the charge current, the power loss increases. Additionally, there is an upper limit for the withstand current of the parallel monitors. Therefore, it is necessary to avoid a situation where the parallel monitors operate to bypass a large charge current for a long time (See, for example, Michio Okamura, "Electric Double-Layer Capacitor and Electricity Accumulation System", The Nikkan Kogyo Shimbun Ltd., 1st ed. Mar. 31, 1999, pp. 135, 145-159 and Japanese Patent Publication No. 3306325).

(A fourth aspect of the invention) The present invention relates to a charge/discharging apparatus for a capacitor storage type power source adapted to charge and discharge a capacitor storage type power source for storing electric energy in electric double layer capacitors, the capacitor storage type power source having a main switching circuit to be turned on/off according to an on/off signal and a synchronous rectifier circuit to be turned on/off at phases inverse relative to the main switching circuit to store electric energy in electric double layer capacitors by accumulating energy in a choke coil at the on time of the main switching circuit and discharging the energy accumulated in the choke coil by turning on the synchronous rectifier circuit at the off time of the main switching circuit.

The terminal voltages can fluctuate to a large extent in a high voltage and large capacity energy storage type power source, which is formed by connecting a plurality of electric double layer capacitors in series, as a function of the square root of the quantity of electric energy stored in the capacitors. Thus, a PWM (pulse width modulation) control technique is employed in such a charge/discharging apparatus for an energy storage type power source so as to make it efficiently follow the terminal voltages that can fluctuate to a large extent by changing the pulse width to control the charge/discharge operation in a desired manner.

In a switching power source apparatus for storing electric energy in a choke coil by turning on/off a main switching circuit and discharging the stored electric energy by way of a rectifier diode, the ratio of the loss produced by the rectifier diode rises when obtaining a low voltage DC output. Therefore, the synchronous rectifier circuit (switching circuit) that is turned on/off at phases inverse relative to a main switching circuit is replaced by a rectifier diode to reduce the loss. A charge/discharging apparatus for a capacitor storage type power source that employs a PWM control technique can improve the charge/discharge efficiency by using a synchronous rectifier circuit (see, for example, Michio Okamura, "Electric Double-Layer Capacitor and the Electricity Accumulation System", The Nikkan Kogyo Shimbun Ltd., 3rd ed. Sep. 30, 2005, pp. 133-142 and Japanese Patent Publication No. 3626072).

(A fifth aspect of the invention) The present invention relates to a charging apparatus for a capacitor storage type power source adapted to charge a capacitor storage type power source for storing electric energy in electric double layer capacitors by pulse width modulation by means of a pulse width modulation means from a charge power source.

The terminal voltages can fluctuate to a large extent in a high voltage and large capacity energy storage type power source, which is formed by connecting a plurality of electric double layer capacitors in series, as a function of the quantity of charged or discharged electric energy. When solar cells are employed as a charge power source for an energy storage type power source including electric double layer capacitors, they have to be controlled by taking their characteristics into consideration. This is because solar cells have a maximum power point MPP, as shown in FIG. 37B, of the accompanying drawings and other specific characteristics. The specific characteristics of a solar cell include a hill-shaped power characteristic having its peak at the maximum power point MPP and a voltage-current characteristic that the electric current decreases from a maximum current Imax to 0 as the voltage rises until the maximum voltage Vmax is reached while the electric current steeply falls when the voltage passes the maximum power point MPP. These characteristics fluctuate depending on sunlight and the ambient temperature.

To improve the charge efficiency from solar cells, it is preferable to arrange a DC/DC converter between the solar cells and the energy storage type power source so as to make them operate as maximum power point tracker (MPPT) that tracks the maximum power point (MPP) if sunlight changes and also make the converter operate as current source for the electric double layer capacitors. Then, the output power of the solar cells is subjected to A/D conversion to produce digital data and the obtained digital data are controlled by a microcomputer. More specifically, the load of the solar cells is made to fluctuate minutely and data on the fluctuations are collected. Then, the obtained data are averaged and/or otherwise processed and the processed data are compared with the preceding corresponding data to see if the MPP is directed to the rising side or the falling side of the load current. Then, the load of the solar cells is fed back for the purpose of maximizing the output power (See, for example, Michio Okamura, "Electric Double-Layer Capacitor and Electricity Accumulation System", The Nikkan Kogyo Shimbun Ltd., 3rd ed. Mar. 31, 1999, pp. 184-188, 191-194 and Japanese Patent Publication No. 3559803).

(A sixth aspect of the invention) The present invention relates to a capacitor storage type power source adapted to generate solar power by means of solar cell panels and store the generated power in capacitors such as electric double layer capacitors.

The shift of energy source from fossil fuel to natural energy sources has been discussed in recent years in various fields. Particularly, solar power generation by means of solar cells is expected to provide power generation systems in the future because, unlike other natural energy sources, it can be realized with ease by arranging solar cells on the roofs and/or walls of buildings without entailing any nuisances such as noises.

Meanwhile, capacitors such as electric double layer capacitors are non-Faradic devices that can store electric energy only by exploiting physical phenomena and hence differ from batteries that utilizes chemical reactions. Thus, capacitors can realize a charge/discharge efficiency higher than 90%, a cycle life of a million times and a service life longer than 10 years, which are beyond conceivability for chemical batteries. Charging apparatus for capacitor storage type power sources have been proposed to generate solar power by means of solar cells and stores the generated power in capacitors such as electric double layer capacitors.

FIG. 45 illustrates the relationship of the output current, the output voltage and the output power of a solar cell. FIG. 45 shows the output characteristics of a solar cell under certain sunshine conditions and certain temperature conditions. In FIG. 45, the horizontal axis indicates the solar cell current "A" and the vertical axis indicates the solar cell voltage "V" and the solar cell output power "W". In FIG. 45, the solid line shows the I-V characteristic of the cell, while the dotted line shows the output power characteristic (I-P characteristic). Referring to FIG. 45, as the load of the solar cell, or the solar cell voltage, is changed from 1.7V to 0.5V, the output current of the solar cell increases from 0 A to about 0.3 A but the output power of the solar cell shows a maximum value of about 0.3 W at or near 0.23 A (maximum power Pmax) and rapidly falls below 0.1 W beyond that current value. Thus, the output power of a solar cell shows a characteristic curve having a peak value. The output characteristic of a solar cell changes as a function of on the sunshine conditions and the temperature conditions and the maximum power Pmax changes accordingly. A maximum power point tracking (MPPT) control method is known for constantly taking out a maximum power Pmax in order to raise the generation efficiency and popularly being used.

Capacitors such as electric double layer capacitors are described in Michio Okamura, "Electric Double-Layer Capacitor and Electricity Accumulation System", The Nikkan Kogyo Shimbun Ltd., 3rd ed. Sep. 30, 2005 and Japanese Patent Application Laid-Open Publication No. 2006-59126 discloses an MPPT control method for solar cells.

(A seventh aspect of the invention) The present invention relates to a charging apparatus for capacitor storage type power source that are very suitable for storing electric energy in capacitors such as electric double layer capacitors.

Capacitor chargers are provided with a constant voltage mode (CV mode), a constant current mode (CC mode) and a constant power mode (CP mode). Capacitors can be charged with electricity efficiently if it is charged in a constant current mode (CC mode) in the initial stages of the charge process, subsequently in a constant power mode (CP mode) and finally in a constant voltage mode (CV mode) when the process approaches a fully charged condition.

A technique of PWM (pulse width modulation) control that employs a switching converter is used for capacitor chargers in order to realize a stable power supply. Then, the charge process is controlled in a desired manner by changing the pulse width for the constant voltage mode (CV mode), the constant current mode (CC mode) and the constant power mode (CP mode). With a switching converter, the DC power applied to the primary winding side of the transformer of the switching converter is periodically turned on and off and the AC power induced at the secondary winding side of the transformer is rectified and smoothed so as to obtain DC power as output power with a voltage shift. A charge method and a charger are described in detail in Michio Okamura, "Electric Double-Layer Capacitor and Electricity Accumulation System", The Nikkan Kogyo Shimbun Ltd, 3rd ed. Sep. 30, 2005, pp. 135-137 and Japanese Patent Application Laid-Open Publication No. H7-87668. FIG. 50 illustrates the waveform of the electric current that is produced at the primary side of the transformer of a switching converter. As shown in FIG. 50, the electric power of the Ton period is taken out at the secondary side out of each period T.

(A eighth aspect of the invention) The present invention relates to a charge or discharging apparatus for a capacitor storage type power source adapted to charge or discharge, whichever appropriate, a capacitor storage type power source having a main switching circuit to be turned on/off according to an on/off signal and a choke coil with electric energy.

The terminal voltages can fluctuate to a large extent in a high voltage and large capacity energy storage type power source, which is formed by connecting a plurality of electric double layer capacitors in series, as a function of the square root of the quantity of electric energy stored in the capacitors. Thus, a PWM (pulse width modulation) control technique is employed in such a charge or discharging apparatus for an energy storage type power source so as to make it efficiently follow the terminal voltages that can fluctuate to a large extent by changing the pulse width to control the charge/discharge operation (e.g., switching of constant current control CC, constant power control CP and constant voltage control CV) in a desired manner.

In a switching power source apparatus for storing electric energy in a choke coil by turning on/off a main switching circuit and discharging the stored electric energy by way of a rectifier diode, the ratio of the loss produced by the rectifier diode rises when obtaining a low voltage DC output. Therefore, the synchronous rectifier circuit (switching circuit) that is turned on/off at phases inverse relative to a main switching circuit is replaced by a rectifier diode to reduce the loss. A charge/discharging apparatus for a capacitor storage type power source that employs a PWM control technique can improve the charge or discharge efficiency by using a synchronous rectifier circuit (see, for example, Michio Okamura, "Electric Double-Layer Capacitor and Electricity Accumulation System", The Nikkan Kogyo Shimbun Ltd., 3rd ed. Sep. 30, 2005, pp. 135-137 and Japanese Patent Application Laid-Open Publication No. H7-87668).

(A ninth aspect of the invention) The present invention relates to a discharging apparatus for discharging electric energy from a capacitor storage type power source for storing electric energy in electric double layer capacitors to a load.

The terminal voltages can fluctuate to a large extent in a high voltage and large capacity energy storage type power source, which is formed by connecting a plurality of electric double layer capacitors in series, as a function of the square root of the quantity of electric energy stored in the capacitors. Thus, a PWM (pulse width modulation) control technique is employed in such a discharging apparatus for an energy storage type power source so as to secure a stable power supply from the largely fluctuating terminal voltages for control purposes by changing the pulse width to control the charge/discharge operation (e.g., switching of constant current control CC, constant power control CP and constant voltage control CV) in a desired manner.

In a switching power source apparatus for storing electric energy in a choke coil by turning on/off a main switching circuit and discharging the stored electric energy by way of a rectifier diode, the ratio of the loss produced by the rectifier diode rises when obtaining a low voltage DC output. Therefore, the synchronous rectifier circuit (switching circuit) that is turned on/off at phases inverse relative to a main switching circuit is replaced by a rectifier diode to reduce the loss. A discharging apparatus for a capacitor storage type power source that employs a PWM control technique can improve the charge or discharge efficiency by using a synchronous rectifier circuit (see, for example, Michio Okamura, "Electric Double-Layer Capacitor and Electricity Accumulation System", The Nikkan Kogyo Shimbun Ltd., 3rd ed. Sep. 30, 2005, pp. 135-137 and Japanese Patent Application Laid-Open Publication No. H7-87668).

(A tenth aspect of the invention) The present invention relates to a discharging apparatus for discharging electric energy from a capacitor storage type power source for storing electric energy in electric double layer capacitors to a load.

The terminal voltages can fluctuate to a large extent in a high voltage and large capacity energy storage type power source, which is formed by connecting a plurality of electric double layer capacitors in series, as a function of the square root of the quantity of electric energy stored in the capacitors. Thus, a discharging apparatus according to the invention comprises a regulated power supply circuit so as to secure a stable power supply from the largely fluctuating terminal voltages for control purposes and a PWM (pulse width modulation) control technique is employed so as to make it efficiently follow the terminal voltages that can fluctuate to a large extent by changing the pulse width to control the charge/discharge operation (e.g., switching of constant current control CC, constant power control CP and constant voltage control CV) in a desired manner.

In a switching power source apparatus for storing electric energy in a choke coil by turning on/off a main switching circuit and discharging the stored electric energy by way of a rectifier diode, the ratio of the loss produced by the rectifier diode rises when obtaining a low voltage DC output. Therefore, the synchronous rectifier circuit (switching circuit) that is turned on/off at phases inverse relative to a main switching circuit is replaced by a rectifier diode to reduce the loss. A charge/discharging apparatus for a capacitor storage type power source that employs a PWM control technique can improve the charge or discharge efficiency by using a synchronous rectifier circuit (see, for example, Michio Okamura, "Electric Double-Layer Capacitor and Electricity Accumulation System", The Nikkan Kogyo Shimbun Ltd., 3rd ed. Sep. 30, 2005, pp. 135-137 and Japanese Patent Application Laid-Open Publication No. H7-87668).

SUMMARY OF THE INVENTION (A first aspect of the invention) When a capacitor is charged with a constant current from 0V to the full charge voltage that is 3V, for example, the electric power (the product of the voltage and the current) that enters the capacitor is very small in the initial stages of the charge process but increases in proportion to the voltage in the final stages of the charge process. If the rated maximum power for a home use plug socket is defined to be 1.5 kW, the plug socket shows a margin when the capacitor is charged at a constant current and the charge voltage is low but the capacitor becomes short of power when the voltage rises depending on the capacitance of the capacitor. If a low power type charge process is employed, the charge current is high when the voltage is low and falls as the full charge condition comes closes but becomes very large in a voltage region close to nil so that it flows excessively.

When the upper limit of the withstand current of the parallel monitors of an energy storage type power source is reduced for the purpose of reducing the power loss that arises as a result of bypass operations of the parallel monitors, the charge current needs to be reduced accordingly. Then, a prolonged charge time is required. Problems arise when an attempt is made to minimize the variances of charge voltage. For example, the operation of initializing the electric double layer capacitors has to be repeated frequently. Then, a cumbersome process has to be executed to adjust the operation of switching the constant current charge and the constant power charge and a complex circuit and a complex control operation will be required for such a process to consequently raise the cost.

In view of the above-identified problems, it is therefore an object of the present invention to provide a charging apparatus for a capacitor storage type power source that neither excessively flows an electric current nor gives rise to a power shortage but can charge the power source efficiently and at high speed and reduce the power loss.

According to the present invention, the above object is achieved by providing a charging apparatus for electrically charging a capacitor storage type power source adapted to store electric energy in electric double layer capacitors, the apparatus including: a switching circuit for turning on/off the charge current supplied from a charge power source to the capacitor storage type power source; a current detection circuit for detecting the charge current; a voltage detection circuit for detecting the voltage of the capacitor storage type power source; a constant current control circuit for outputting an error amplifying signal for controlling the charge current according to the current value detected by the current detection circuit and a current reference value; a power control circuit for outputting an error amplifying signal for controlling the charge current according to the current value detected by the current detection circuit, the voltage value detected by the voltage detection circuit and a power reference value; a constant voltage control circuit for outputting an error amplifying signal for controlling the charge current according to the voltage value detected by the voltage detection circuit and a voltage reference value; a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the switching circuit and control the charge current; the capacitor storage type power source having a plurality of electric double layer capacitors connected in series and parallel monitors for bypassing the respective charge currents of the capacitors; the constant current control circuit selecting a smaller reference value from a plurality of reference values provided as the current reference value according to the bypassing operations of the parallel monitors, or the constant current control circuit having a circuit for switching, using another charging apparatus for electrically charging a capacitor storage type power source as a master apparatus, the current reference value to a current value detected by the current detection circuit of the master apparatus.

According to the present invention, there is also provided a charging apparatus for electrically charging a capacitor storage type power source adapted to store electric energy in electric double layer capacitors, the apparatus including: a switching circuit for turning on/off the charge current supplied from a charge power source to the capacitor storage type power source; a current detection circuit for detecting the charge current; a voltage detection circuit for detecting the voltage of the capacitor storage type power source; a constant current control circuit for outputting an error amplifying signal for controlling the charge current according to the current value detected by the current detection circuit and a current reference value; a power control circuit for outputting an error amplifying signal for controlling the charge current according to the current value detected by the current detection circuit, the voltage value detected by the voltage detection circuit and a power reference value; a constant voltage control circuit for outputting an error amplifying signal for controlling the charge current according to the voltage value detected by the voltage detection circuit and a voltage reference value; a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the switching circuit and control the charge current.

Thus, with a charging apparatus according to the invention, the logical OR circuit selects one of the error amplifying signals output from the constant current control circuit, the power control circuit and the constant voltage control circuit and outputs it and the control circuit generates a pulse width modulation signal to turn on/off the switching circuit and control the charge current. Therefore, it is possible to charge a capacitor storage type power source by causing the pulse width to efficiently follow the capacitor voltages that fluctuate to a large extent by means of a simple arrangement so that the constant current mode can be switched to a constant power mode and then to a constant voltage mode smoothly. Additionally, since a plurality of reference values are provided for the switching operation, it is possible to flexibly shift the switching points for selecting a constant current mode, a constant power mode or a constant voltage mode. Still additionally, the charge current can be boosted to realize a high speed charge operation by using another charging apparatus for a capacitor storage type power source as master apparatus, the proper charging apparatus operating as a slave apparatus, so that the detection signal for the charge current of the master apparatus can be introduced into the slave apparatus as reference value.

(A second aspect of the invention) When a power limiter feature is realized to select a constant power mode when the charge voltage exceeds a predetermined level so that the charge current may be reduced as the charge voltage rises to produce a constant power in a manner as described above, conventionally the voltage value and the current value are input to computationally determine the power value and the charging apparatus is controlled according to the outcome of the computation. However, in the case of a large capacity capacitor storage type power source, the current value and the voltage value respectively are as large as tens to hundreds of several amperes and hundreds to thousands of several volts, while the corresponding values are several amperes and several volts for conventional power sources. Additionally, the voltage changes over a wide range from nearly 0V to a large full charge voltage. Then, a multiplier that can cover such a wide range is costly and requires adjustment operations to consequently raise the cost of the components and hence the entire apparatus.

In view of the above-identified problems, it is therefore an object of the present invention to provide a charging apparatus for a capacitor storage type power source where a feature equivalent to a power limiter feature is realized by means of a simple arrangement to make it possible to reduce the power consumption rate of the parallel monitors of the capacitor storage type power source and downsize the capacitor storage type power source.

According to the present invention, the above object is achieved by providing a charging apparatus for a capacitor storage type power source adapted to store electric energy in electric double layer capacitors, the apparatus charging the power source, controlling the charge current by modulating the pulse width by a pulse width modulation means from a charge power source, the apparatus including: a constant current signal generation means for comparing the first reference value and the charge current and generating an error amplifying signal; a current diminishing signal generation means for inputting the detection signal of the charge voltage of the capacitor storage type power source to the inverted input terminal of an operational amplifier by way of a resistor and an offset value to the non-inverted input terminal and comparing the second reference value taken out from a subtraction circuit formed by connecting a resistor between the inverted input terminal and the output terminal and the charge current to generate an error amplifying signal; and a logical OR circuit for inputting the error amplifying signal of the constant current signal generation means and the error amplifying signal of the current diminishing signal generation means, executing a logical OR process on the input error amplifying signals and outputting the outcome of the logical OR process to the pulse width modulation means; the constant current charge according to the error amplifying signal of the constant current signal generation means being switched to the current diminishing charge according to the error amplifying signal of the current diminishing signal generation means in response to an increase of the charge voltage to the capacitor storage type power source.

According to the present invention, there is provided a charging apparatus for a capacitor storage type power source adapted to store electric energy in a plurality of electric double layer capacitors provided with respective parallel monitors for bypassing the charge current at a predetermined voltage, the apparatus charging the power source, controlling the charge current by modulating the pulse width by a pulse width modulation means from a charge power source, the apparatus including: a constant current signal generation means for comparing the first reference value and the charge current and generating an error amplifying signal; a current diminishing signal generation means for comparing the second reference value obtained by inverting the charge voltage of the capacitor storage type power source and turning it into a positive value by means of an offset value and the charge current to generate an error amplifying signal; a switching circuit for switching effectiveness/ineffectiveness of the error amplifying signal of the current diminishing signal generation means; and a logical OR circuit for inputting the error amplifying signal of the constant current signal generation means and the error amplifying signal of the current diminishing signal generation means made effective by the switching circuit, executing a logical OR process on the input error amplifying signals and output the outcome of the logical OR process to the pulse width modulation means; a charge process being executed by turning the error amplifying signal of the current diminishing signal generation means ineffective; the switching circuit being controlled according to the bypass operation signals of the parallel monitors to turn the error amplifying signal of the current diminishing signal generation means effective.

Thus, according to the present invention, it is possible to generate a reference value by means of a simple circuit configuration as the reference value is inversely proportional to the rise of the charge voltage of the capacitor storage type power source. Then, it is possible to reduce the charge current in inverse proportion to the rise of the charge voltage when the capacitor storage type power source is charged until the charge voltage gets to a predetermined level in a constant current mode by means of a simple circuit configuration as the circuit for controlling the charge current according to the reference value and the charging circuit that controls the charge current to a constant level are connected in parallel. Therefore, a charging apparatus adapted to switch from a constant current mode to a charge mode equivalent to a constant power mode can be realized without using a costly multiplier and the switching points can be defined by way of simple adjustment operation of adjusting the set reference value. Thus, it is possible to reduce the cost of the components and hence the entire apparatus.

(A third aspect of the invention) Now, the above-mentioned parallel monitors will be described summarily. FIG. 25 is a schematic circuit diagram of a parallel monitor. In FIG. 25, C denotes a electric double layer capacitor and CMP denotes a comparator, while D and Tr denote a diode and a transistor and Vr denotes a set voltage, respectively. In an energy storage type power source formed by combining a plurality of large capacity capacitors, a problem of equalizing the load voltages of the capacitors inevitably arises when connecting the capacitors in series. Parallel monitors are respectively connected between the terminals of the plurality of capacitors that are connected in series to form the energy storage type power source and provided with comparators. Each of the comparators is adapted to compare the charge voltage of the corresponding capacitor and the set voltage. Thus, each parallel monitor operates as a voltage monitor/control device that bypasses the charge current when the set voltage is exceeded and detects a full charge condition to generate a full charge signal so that the capacitor can be charged maximally within the withstand voltage. As shown in FIG. 25, the comparator CMP compares the voltage of the capacitor C and the set voltage Vr and monitors the capacitor C. When the voltage of the capacitor C exceeds the set voltage Vr, the parallel monitor turns the transistor Tr on and bypasses the charge current.

Now, a charging apparatus for electrically charging the electric double layer capacitors that are provided with respective parallel monitors and connected in series will be described below. FIG. 26 is a schematic illustration of a charging apparatus for electrically charging a plurality of electric double layer capacitors that are provided with respective parallel monitors. In FIG. 26, C1, C2, . . . , Cn denote respective electric double layer capacitors that are connected in series and M1, M2, . . . , Mn denote parallel monitors connected in parallel with the respective electric double layer capacitors C1, C2, . . . , Cn, while CH denotes a charging apparatus. When one of the capacitors C1, C2, . . . , Cn begins to show a predetermined voltage level, the electric current trying to flow through the capacitor is bypassed and a full charge signal is output to the charging apparatus CH to indicate that the predetermined voltage level is reached.

Since the parallel monitors have a rated current value (withstand current upper limit value), the charging apparatus CH lowers the charge current to the withstand current value of the parallel monitors once one of the electric double layer capacitors C1, C2, . . . , Cn starts bypassing the current. The current value is typically about several amperes and hence much smaller than the charge current that is typically about 10 to 60 A. Since the parallel monitor of the bypassing capacitor outputs a full charge signal when the bypassing starts so that the charging apparatus CH lowers the charge current to the level of the withstand current value of the parallel monitors when it receives a full charge signal.

An electric double layer capacitor has an internal resistance component besides a capacitor component but there is no knowing about the internal resistance component from the outside of the capacitor. FIG. 27 is a circuit diagram of an equivalent circuit of an electric double layer capacitor including its internal resistance component. Since a capacitor has such an internal resistance component, the full charge voltage at the terminals of the capacitor includes the voltage fall due to the internal resistance. Thus, there arises a problem that the parallel monitor stops outputting a full charge signal the instant that the charge current is lowered to the level of the withstand current value as described above (because Vr is reduced as the voltage fall is reduced so that Vr+Vc that is the terminal voltage does not get to the full charge voltage). The voltage fall due to the internal resistance is large when the current value is large. As the charge voltage is lowered to the level of the withstand current value, according to the full charge signal output from the parallel monitor, the capacitor that apparently gets to the full charge voltage has to be charged by the withstand current of its parallel monitor that is far smaller than the ordinary charge current.

Attempts have been made to raise the electric current in order to charge electric double layer capacitors at high speed. However, when the electric double layer capacitors are charged with a large electric current, there remain relatively large unfilled capacitances of electric double layer capacitors and such electric double layer capacitors have to be charged with a small electric current. The net result will be a problem of being incapable of reducing the charge time.

According to claim 11 of the patent application, there is provided a charging apparatus for a capacitor storage type power source adapted to store electric energy in a plurality of electric double layer capacitors connected in series and provided with respective parallel monitors for bypassing the charge current at a predetermined voltage, the apparatus charging the power source, controlling the charge current by modulating the pulse width by a pulse width modulation means from a charge power source, the apparatus including: a first charge current control means for lowering the charge current in inverse proportion to the increase of the charge voltage of the capacitor storage type power source; and a second charge current control means for flowing the charge current of the withstand current value of the parallel monitors; the apparatus operating the second charge current control means to control the charge current for a predetermined time period upon detecting one of the parallel monitors bypassing the charge current and subsequently the first charge current control means to control the charge current for another predetermined time period.

According to claim 12 of the patent application, in a charging apparatus for a capacitor storage type power source according to claim 11, the control operation of the second charge current control means for the predetermined time period and the control operation of the first charge current control means for the other predetermined time period are repeated alternately.

Thus, according to the present invention, it is possible to avoid a situation where a capacitor that apparently gets to the full charge voltage has to be charged by the withstand current Is of its parallel monitor that is far smaller than the ordinary charge current so that the capacitors charging apparatus be charged efficiently.

(A fourth aspect of the invention) When a charge/discharging apparatus that operates for pulse width modulation control is adapted to use a synchronous rectifier circuit, there arises a problem of an inverse current that arises when the charging apparatus is operating with a light load and the pulse duty ratio becomes extremely small. A light load of a charge/discharging apparatus for a capacitor storage type power source typically corresponds to a charge operation where the charge current is reduced as the capacitors come close to a full charge condition or a discharge operation where the discharge current is reduced to stop the discharge to the load as the remaining charges of the capacitors become small. An inverse current starts the instance when the choke coil completely loses energy. The problem is not negligible because the capacitors have a large storage capacity and shows a high output level if compared with secondary batteries.

It is therefore an object of the present invention to overcome the above identified problem by preventing an inverse current of the synchronous rectifier circuit from occurring at the time of light load and eliminating any wasteful losses that can take place when charging and discharging a capacitor storage type power source to improve the charging and discharging efficiencies.

According to the present invention, the above object is achieved by providing a charging apparatus for a capacitor storage type power source, the capacitor storage type power source having a main switching circuit to be turned on/off according to an on/off signal and a synchronous rectifier circuit to be turned on/off at phases inverse relative to the main switching circuit to store electric energy in electric double layer capacitors by accumulating energy in a choke coil at the on time of the main switching circuit and discharging the energy accumulated in the choke coil by turning on the synchronous rectifier circuit at the off time of the main switching circuit, the apparatus including: a current detection circuit for detecting the charge current; a voltage detection circuit for detecting the charge voltage of the electric double layer capacitors; a constant current control circuit for performing an operation of comparing the current detection value detected by the current detection circuit and a current reference value to output an error amplifying signal; a power control circuit for performing an operation of comparing the current detection value detected by the current detection circuit and a power reference value to output an error amplifying signal; a constant voltage control circuit for performing an operation of comparing the voltage detection value detected by the voltage detection circuit and a voltage reference value to output an error amplifying signal; a logical OR circuit for selecting one of the error amplifying signals output from the constant current control circuit, the power control circuit and the constant voltage control circuit and outputting the selected error amplifying signal; a control circuit for generating a pulse-width-modulated on/off signal according to the error amplifying signal output from the logical OR circuit to turn on/off the switching circuit and the synchronous rectifier circuit and control the charge current; a pulse width detection circuit for detecting pulse width of the on part of the on/off control signal as fallen blow a predetermined value; and a signal holding circuit for holding the synchronous rectifier circuit to an off state by means of the detection signal of the pulse width detection circuit regardless of the on/off control signal; a diode being connected to the polarity for discharging the energy accumulated in the choke coil in parallel with the synchronous rectifier circuit so as to stop the synchronous rectification under the condition of the pulse width fallen below the predetermined value.

It is preferable that the power control circuit is adapted to subtract the voltage value detected by the voltage detection circuit from the reference value and set the power reference value according to the difference obtained by the subtraction and that the pulse width detection circuit includes a rectifying and smoothing circuit for rectifying and smoothing the on/off signal and a transistor circuit controlled so as to be turned off when the output of the rectifying and smoothing circuit gets to a predetermined value and hold the signal for turning on/off the synchronous rectifier circuit to an off state. Preferably, the signal of the synchronous rectifier circuit is obtained by inverting the on/off control signal by means of an inversion circuit and the main switching circuit and the synchronous rectifier circuit are supplied with an on/off signal by way of a delay circuit that delays the signal at the rising edge of a pulse. Preferably, the delay circuit is formed by inserting a parallel circuit of a diode showing the polarity opposite to the signal and a resistor in series and connecting a capacitor to the output side of the parallel circuit.

Thus, according to the present invention, a diode is connected to the polarity for discharging the energy accumulated in the choke coil in parallel with the synchronous rectifier circuit to detect the pulse width of the on part of the on/off control signal as fallen below a predetermined value and the synchronous rectifier circuit is held to an off state regardless of the on/off control signal so that it is possible to prevent the synchronous rectifier circuit from being turned on and both the charge current and the discharge current from flowing inversely by way of the synchronous rectifier circuit when the load is light. Additionally, an electric current flows to the diode to give rise to a current loss only when the load is light and hence the loss is small so that the energy accumulated in the choke coil is discharged by way of the synchronous rectifier circuit under normal conditions. Thus, the loss is minimized as a whole and it is possible to eliminate wasteful charges/discharges and improve the charge/discharge efficiencies.

(A fifth aspect of the invention) Conventional charging apparatus that employ solar cells as a charge power source for electrically charging an energy storage type power source including electric double layer capacitors require an A/D converter and a microcomputer for causing the charging apparatus to track the maximum power point (MPP) as well as a memory for storing the control program for operating the microcomputer. Thus, the cost of the A/D converter and so on is added to the cost of the apparatus. Additionally, while the computer program can control complex operations, the processing speed will be low if compared with hardware processing operations. Thus, conventional charging apparatus are accompanied by these and other problems.

According to the present invention, the above problems are overcome by realizing a simple circuit configuration that accommodates the characteristics of solar cells and can reduce the cost of the parts and the product when a capacitor storage type power source is electrically charged by using solar cells as a charge power source.

According to the present invention, there is provided a charging apparatus for a capacitor storage type power source adapted to store electric energy in electric double layer capacitors, the apparatus charging the power source, controlling the charge current by modulating the pulse width by a pulse width modulation means from a charge power source, the apparatus at least including: a constant current signal generation means for comparing the charge current of the capacitor storage type power source with a current reference value and generating an error amplifying signal for holding the charge current to a constant level by limiting the charge current at the time of exceeding the current reference value; an input constant voltage signal generation means for comparing the input voltage from the charge power source with an input voltage reference value and generating an error amplifying signal for holding the input voltage to a constant level by lowering the charge current at the time of falling of the input voltage below the input voltage reference value and by raising the charge current at the time of rising of the input voltage above the input voltage reference value; and a current diminishing signal generation means for setting a current diminishing reference value according to the value obtained by subtracting the voltage of the capacitor storage type power source from an offset value, comparing the current diminishing reference value with the charge current of the capacitor storage type power source and generating an error amplifying signal for bringing the charge current to the current diminishing reference value by limiting the charge current at the time the charge current rises above the current diminishing reference value; the error amplifying signals being supplied to the pulse width modulation means by way of a logical OR circuit.

Preferably, the input constant voltage signal generation means connects with the logical OR circuit by way of a switching circuit for controlling the sending out of the error amplifying signals. Preferably, when solar cells are used as a charge power source, the input voltage reference value is the solar cell voltage close to the maximum power point of the solar cells. Preferably, the input voltage reference value changes according to the sunshine conditions. Preferably, the logical OR circuit compares the charge voltage of the capacitor storage type power source defined by the constant voltage signal generation means with a charge voltage reference value along with the error amplifying signals, compares the charge power of the capacitor storage type power source defined by the error amplifying signals for limiting the charge current when the charge voltage exceeds the charge voltage reference value and the constant power signal generation means, and executes a logical OR process on the error amplifying signals for limiting the charge current to supply the outcome of the logical OR process to the pulse width modulation means, when the charge power exceeds the charge power reference value.

Thus, according to the present invention, when a capacitor storage type power source is electrically charged by using solar cells having a maximum power point at a voltage lower than the maximum voltage as a charge power source, it is possible to prevent the solar cells from charging the capacitor storage type power source in a voltage region where the voltage of the solar cells falls below the maximum power point without using a costly power tracker mechanism unlike conventional charging apparatus adapted to follow the maximum power point MPP of the solar cells. Additionally, a control feature is provided and operated to control the input constant voltage so as to limit the charge current when the input voltage is compared with an input voltage reference value and found to be lower than the latter. Then, the control feature is realized by a simple circuit arrangement without using a specific program to reduce the cost of the components and hence the entire product.

(A sixth aspect of the invention) An orthodox technique of controlling maximum power point tracking is detecting the solar cell voltage and the solar cell current, computing the power value along with the power values when the solar cell voltage is raised and lowered by means of a computer and detecting the maximum power point of the solar cells from the difference of the power values before and after the voltage change. If the power value is greater after the voltage change, the solar cell voltage is made to change in the same direction. If, on the other hand, the power value is smaller than the voltage change, the solar cell voltage is made to change in the opposite direction. Then, this operation is repeated to make the solar cells approach the maximum power point. However, with such a technique, it is necessary to detect the solar cell voltage and the solar cell current and multiply them by each other in order to computationally determine the maximum power Pmax. Then, there arise problems including the cost of the hardware for detecting both the voltage and the current and multiplying them by each other and occurrences of operation errors including detection errors.

According to the present invention, the above problems are dissolved by providing a charging apparatus for a capacitor storage type power source, the apparatus having solar cells, a power conversion circuit and capacitors so as to convert the output power of the solar cells by means of the power conversion circuit and store the converted power in the capacitors, the apparatus including: a sweep section for sweeping the input voltage of the power conversion circuit within a predetermined range; and a current detection section for detecting the charge current to the capacitors; the current detection section being adapted to detect the change in the charge current to the capacitors produced by the sweep of the input voltage by the sweep means; the input voltage maximizing the charge current being defined as the maximum power point of the solar cells.

According to claim 25 of the present invention, the above problems are overcome also by providing a charging apparatus for a capacitor storage type power source, the apparatus having solar cells, a power conversion circuit and capacitors so as to convert the output power of the solar cells by means of the power conversion circuit and store the converted power in the capacitors, the apparatus including: a sweep section for sweeping the input voltage of the power conversion circuit within a predetermined range; and a voltage detection section for detecting the charge voltage to the capacitors; the voltage detection section being adapted to detect the change with time of the charge voltage to the capacitors produced by the sweep of the input voltage by the sweep means; the input voltage maximizing the change with time of the charge voltage being defined as the maximum power point of the solar cells.

Thus, according to the present invention, it is no longer necessary to detect the solar cell voltage and the solar cell current and multiply them by each other so that the circuit arrangement (hardware) can be simplified. Additionally, according to the present invention, it is possible to charge a capacitor storage type power source by means of a capacitor system having solar cells in an adverse environment where the ambient temperature is extremely high or low because the maximum power point of the solar cells is determined from the actually stored energy that involves the efficiency of the power conversion circuit.

(A seventh aspect of the invention) To realize a constant power charge mode (CP mode) by means of a switching converter, generally the electric current and the voltage of the secondary side of the switching converter of the capacitor charger are detected and the product of multiplication of them is fed back to the primary side for feedback control. However, such feedback control is accompanied by problems including (1) that constant power control is instable and difficult when the output voltage is relatively low, (2) that delays can occur and (3) that the multiplier for multiplying the current and the voltage of the secondary side is costly.

In view of these problems, capacitor chargers that can realize a constant power charge mode (CP mode) solely at the primary side without feedback control are being studied. A constant power charge mode (CP mode) can be realized by utilizing the fact that a constant power level can be produced at the secondary side by controlling the input side so as to make it show a constant voltage and a constant current if the switching converter is assumed to have a constant efficiency. A PFC (power factor correction) circuit can be arranged upstream relative to the charger in order to satisfy the requirement of constant voltage at the input side. Then, it is possible to realize a constant power charge mode (CP mode) without feedback control only by controlling the input side so as to make it show a constant current. However, to do this, it is necessary to sense the average current at the primary side.

Meanwhile, it is known that an IC for a switching converter is provided with an anti-overcurrent feature as one of its features. With this feature, the peak current that flows at the primary side of the transformer of the switching converter is monitored to protect the transformer and the oscillation is suspended when there is a risk of overcurrent. An overcurrent can flow due to a phenomenon of magnetic saturation of the core of the transformer. As magnetic saturation appears in the core of the transformer, the L-component of the transformer disappears and a short-circuit current flows to the primary side of the transformer where the impedance is lost. Such a short-circuit current operates as overcurrent for the IC for the switching converter that eventually destroys the IC. For this reason, an IC for a switching converter is provided with an anti-overcurrent feature as pointed out above. FIG. 51 shows the current waveform that appears at the primary side of the transformer when magnetic saturation takes place in the core of the transformer. To exploit the anti-overcurrent feature of the IC, it is necessary to detect the peak current that flows at the primary side.

To summarize the above description, the primary side of the switching converter requires a circuit for detecting the average current for realizing a constant power charge mode (CP mode) and the peak current for exploiting the anti-overcurrent feature of the IC. However, when such a circuit is provided additionally and separately, the overall circuit configuration will become complex and costly.

According to claim 26 of the patent application, the above problem is overcome by providing a charging apparatus for a capacitor storage type power source adapted to induce an electric current in the secondary side winding by turning on/off the DC current applied to the primary side winding of a transformer by means of a switching element, rectify and smooth the induced current and supply the current to capacitors to charge the capacitors, the apparatus including: a power factor improvement circuit for generating the DC current; a PWM control section for controlling the on/off operation of the switching element; and a current transformer having a primary side connected to the primary side winding of the transformer in series and a secondary side connected to a CT circuit detection circuit section; the CT circuit detection circuit section being adapted to take out a voltage proportional to the average current flowing through the primary side winding of the transformer and a voltage proportional to the peak current flowing through the primary side winding of the transformer.

Thus, according to the present invention, it is no longer necessary to arrange two independent circuits including one for detecting the average current value and one for detecting the peak current value because the peak current flowing through the primary side winding of the transformer is detected at the time when the average current value of the electric current flowing through the primary side of the transformer is detected. As a result, the circuit configuration is simplified to provide an advantage of cost reduction.

(An eighth aspect of the invention) A capacitor storage type power source provides an advantage that it can be electrically charged at high speed but, at the same time, is accompanied by a problem of discharging a large current and rapidly flowing out the accumulated energy. Therefore, it is important for a charge or discharging apparatus for electrically charging or discharging, whichever appropriate, such a power source to be provided with a means for preventing energy from leaking out and being wasted. Differently stated, while there is no problem for flowing a large current for the proper purpose of electrically charging a capacitor storage type power source or electrically discharging the capacitor storage type power source to supply necessary power to a load, a circuit from which a leak current flows out discharges energy to an unnegligible extent as a function of the impedance of the circuit when the charging or discharging, whichever appropriate, operation is stopped to give rise to a problem that the overall efficiency of utilization of the capacitor storage type power source falls if the charge/discharge efficiency is raised.

Therefore, it is an object of the present invention to overcome the above problem and suppress the wasteful power loss due to the leak current that arises when the charging or discharging operation is stopped.

According to claim 27 of the patent application, there is provided a charge or discharging apparatus for a capacitor storage type power source, the apparatus having a main switching circuit for performing on/off operations according to on/off control signals and a choke coil and adapted to electrically charge or discharge the electric double layer capacitors of the power source, the apparatus including: a signal intercept circuit inserted and connected in series to the signal line connected to the circuit for electrically charging or discharging the capacitor storage type power source for the purpose of detecting the current and the voltage at the time of charge or discharge, whichever appropriate; the signal intercept circuit being adapted to intercept the signal of the signal line on the condition of the voltage being nil at the side opposite to the side of connecting the main switching circuit and the choke coil to the capacitor storage type power source.

According to claim 28 of the patent application, there is provided a charging apparatus for a capacitor storage type power source, the apparatus having a main switching circuit for performing on/off operations according to on/off control signals and a choke coil and adapted to electrically charge the electric double layer capacitors of the power source, the apparatus including: a current detection circuit for detecting the charge current; a voltage detection circuit for detecting the voltage of the capacitor storage type power source; a constant current control circuit for outputting an error amplifying signal for controlling the charge current according to the current value detected by the current detection circuit and a current reference value; a power control circuit for outputting an error amplifying signal for controlling the charge current according to the current value detected by the current detection circuit, the voltage value detected by the voltage detection circuit and a power reference value; a constant voltage control circuit for outputting an error amplifying signal for controlling the charge current according to the voltage value detected by the voltage detection circuit and a voltage reference value; a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the main switching circuit and control the charge current; a signal intercept circuit being inserted and connected in series to the signal line for detecting the charge current of the current detection circuit and the signal for detecting the voltage of the voltage detection circuit, the signal intercept circuit being adapted to intercept the signals of the signal lines on the condition of the voltage being nil at the side opposite to the side of connecting the main switching circuit and the choke coil to the capacitor storage type power source.

According to claim 29 of the patent application, there is provided a discharging apparatus for a capacitor storage type power source, the apparatus having a main switching circuit for performing on/off operations according to on/off control signals and a choke coil and adapted to electrically discharge the electric double layer capacitors of the power source, the apparatus: a current detection circuit for detecting the discharge current; a voltage detection circuit for detecting the voltage of the capacitor storage type power source; and a control circuit for inputting the detected discharge current and voltage and turning on/off the main switch circuit to control the discharge current; a signal intercept circuit being inserted and connected in series to the signal line for detecting the discharge current of the current detection circuit and the signal line for detecting the voltage of the voltage detection circuit, the signal intercept circuit being adapted to intercept the signals of the signal lines on the condition of the voltage being nil at the side opposite to the side of connecting the main switching circuit and the choke coil to the capacitor storage type power source.

Thus, according to the present invention, the signals on the signal lines for detecting the current and the voltage at the time of charge or discharge by means of a signal intercept circuit after determining the condition where the charge or discharge operation is stopped so that it is possible to eliminate the power loss due to a wasteful leak current that flows from the capacitor storage type power source storing electric energy by way of the signal lines and raise the charge/discharge efficiency of the capacitor storage type power source. Additionally, it is possible to determine the condition where the charge or discharge operation is stopped by determining the condition of being cut off of the charge power source for charging or discharging the capacitor storage type power source and also determine the off condition of the main switching circuit by determining if the voltage is being applied or not by means of a simple circuit configuration.

(A ninth aspect of the invention) The applicants of this patent application have proposed a capacitor storage type power source formed by combining a plurality of electric double layer capacitors and an electronic circuit having an initialization feature and a bank switching feature as ECS (energy capacitor system) or ECaSS (energy capacitor system) (tradenames). For such a capacitor storage type power source, components may be prepared in advance as modules such as capacitor modules of 16V, 30V, 60V and so on, charging circuit modules and discharging circuit modules, which may be combined selectively and appropriately in response to the request of the client in order to reduce the system design period and raise the degree of design freedom. When trying to prepare modules such as charging circuit modules and discharging circuit modules separately in addition to capacitor modules to raise the degree of design freedom, it is necessary to form a sub power source necessary for driving the discharging circuit module that utilizes the power supplied from the capacitor module that shows large voltage fluctuations. In other words, a discharging circuit module is required to have the ability of producing a sub power source that corresponds to any of various capacitor modules of 16V, 30V, 60V and so on and can accommodate voltage fluctuations of the capacitor module. In short, a discharging circuit module is required to operate in a very flexible manner under control.

However, a sub power source was prepared so as to activate the discharge control circuit, using the power supplied from the capacitors in an experiment to find that the discharge efficiency was 87.6% for a 30 W type discharging circuit when the full charge voltage of the capacitors was 16V but it fell to 70.8% when the full charge voltage of the capacitors was 60V. In short, the discharge efficiency is highly dependent on the voltage and falls remarkably when the voltage of the capacitor module is high.

The above-cited Non-Patent Document 1 describes that the electric power can be exploited by 94% when the capacitors are operated until the capacitor voltage falls to ¼ of the full charge voltage. While the efficiency does not include the loss at the charge/discharging circuit, the Non-Patent Document 1 shows that the power stored in the capacitors can be utilized until the capacitor voltage falls to ¼ of the full charge voltage to achieve a high efficiency of 94%. Thus, ideally, the stored power needs to be utilized until the capacitor voltage falls to ¼ of full charge voltage if it is possible.

According to claim 30 of the patent application, the above problem is overcome by providing a discharging apparatus for a capacitor storage type power source, the apparatus being separated from the charging apparatus for a capacitor storage type power source and adapted to discharge electric energy from the capacitor storage type power source storing electric energy in electric double layer capacitors to a load and charging the capacitor storage type power source with electric energy, the apparatus including: a control circuit for controlling the discharge of electric energy to the load; a main power supply circuit for supplying circuit drive power to the control circuit; an auxiliary power supply circuit for boosting the voltage of the capacitor storage type power source to the operating voltage of the main power supply circuit and supplying circuit drive power to the main power supply circuit; and a voltage boosting operation control circuit adapted to turn off the auxiliary power supply circuit when the voltage of the capacitor storage type power source is not lower than a predefined value to output the voltage of the capacitor storage type power source to the main power supply circuit but turn on the auxiliary power supply circuit when the voltage of the capacitor storage type power source is lower than the predefined value to output the voltage of the capacitor storage type power source to the main power supply circuit after it is boosted by the auxiliary power supply circuit.

Thus, according to the present invention, it is possible to exploit the capacitor module until the capacitor voltage falls to ¼ of the full charge voltage by connecting and disconnecting the auxiliary power supply circuit of the sub power source of the discharging circuit. Thus, it is possible to utilize the power stored in the capacitor module with a high efficiency. Additionally, a single kind of discharging circuit module can accommodate capacitor modules of various different voltages.

When the operation of electrically charging a capacitor storage type power source is stopped, electric energy is discharged with time from the circuits where leak currents flow so that energy is rapidly dissipated if the capacitor storage type power source is charged with electric energy efficiently. For instance, the discharging apparatus needs to hold the electric power accumulated in the capacitor storage type power source when it is not operating for discharge control. However, if the capacitor storage type power source is left without operation and with the discharging apparatus connected to it, there arises a problem that the electric power stored in the electric double layer capacitors of the capacitor storage type power source is gradually reduced due to leak currents. Of the power loss due to the circuit where leak currents flow, the part that is discharged from the control power supply circuit for controlling the electric discharge of the discharging apparatus is large. Thus, the measure for suppressing the leak currents of a discharging apparatus is important.

In view of the above-identified problem, it is therefore an object of the present invention to limit the leak currents from the discharging apparatus when the discharge operation is suspended and suppress the wasteful power loss.

In an aspect of the present invention, the above object is achieved by providing a discharging apparatus of a capacitor storage type power source for discharging electric energy from the capacitor storage type power source storing electric power in electric double layer capacitors to a load, the apparatus including: a control circuit having a control power supply circuit and adapted to control the electric discharge; an intercept circuit for turning on/off the power feed circuit for feeding electric power from the capacitor storage type power source to the control power supply circuit; a bias voltage supply circuit for supplying a bias voltage to the intercept circuit; a judge circuit for determining the discharge condition or the suspended discharge condition and controlling the bias voltage supply circuit so as to turn off the supply of the bias voltage in the suspended discharge condition; and a high impedance circuit for connecting the power feed circuit through a high impedance element to the judge circuit for determining the discharge condition or the suspended discharge condition and controlling the bias voltage supply circuit; the electric current flowing in the suspended discharge condition being limited by the high impedance element.

Preferably, the bias voltage supply circuit constitutes a circuit for supplying a constant current bias voltage. Preferably, the control circuit is a circuit for controlling operations of turning on/off the discharge current according to pulse width modulation signals. Preferably, the judge circuit determines the condition of the switch for suspending the electric discharge, the presence or absence of a signal for controlling the electric discharge of the control circuit or the presence or absence of a voltage at the load side.

Preferably, the control power supply circuit includes a voltage boosting circuit for boosting the voltage of the electric power fed from the capacitor storage type power source and a voltage stabilizing circuit connected to the voltage boosting circuit to stabilize the output voltage. Preferably, the voltage boosting circuit includes a switching converter formed by connecting a choke coil and a switching circuit in series and adapted to take out a boosted voltage from the connection point of the series connection according to on/off state of the switching circuit and the switching circuit is adapted to be switched from a voltage boosting mode for turning on/off the switching circuit to a voltage non-boosting mode for holding the switching circuit in an off condition and vice versa. Preferably, the switching converter switches to the voltage-boosting mode after determining that the voltage of the power fed from the capacitor storage type power source to be not higher than ½ of the full charge voltage thereof.

Thus, according to the present invention, a suspended discharge condition is determined to turn on/off the power feed circuit of the control power supply circuit so that it is possible to prevent the power accumulated in the electric double layer capacitors of the capacitor storage type power source from being decreased due to the leak currents from the control power supply circuit for controlling electric discharges if the capacitor storage type power source left with the discharging apparatus connected thereto for a long period of time. Additionally, the electric current that flows to the circuits when the power feed circuit is turned off is limited to only the current flowing through the high impedance element so that it is possible to minimize the leak currents that flow in a suspended discharge condition. Therefore, it is possible to improve the effective efficiency of the discharging apparatus and suppress the emission of heat of the discharging apparatus.

BRIEF DESCRIPTION OF THE DRAWINGS

DETAILED DESCRIPTION OF THE PREFERRED EMBODIMENTS (A first aspect of the invention) Now, the present invention will be described by referring to the accompanying drawings that illustrate preferred embodiments of the invention. FIG. 1 is a circuit diagram of the main circuit of an embodiment of a charging apparatus for a capacitor storage type power source according to the present invention and FIG. 2 is a circuit diagram of the signal processing circuit of an embodiment of a charging apparatus for a capacitor storage type power source. Referring to FIGS. 1 and 2, there are shown a constant current signal generation circuit 101, a constant power signal generation circuit 102, a constant voltage signal generation circuit 103, a charge power source 105, a charging apparatus 106, a capacitor storage type power source 107, a signal processing circuit 1061, a PWM signal generation circuit 1062, an amplifier 1063, an inverting amplifier 1064, electric double layer capacitors 1071, analog switches AS11, AS12, AS21, AS22, capacitors C1, C2, diodes D11, D21, D31, a coil L, a current detecting resistor R, a main switch circuit SW1, a synchronous rectifier circuit SW2, current reference value setting circuit Vrefi1, Vrefi2, a power reference value setting circuit Vrefp, charge voltage reference value setting circuit Vrefv1, Vrefv2, a charge current I, a charge voltage Vc and an input voltage Vi.

Figure 1:
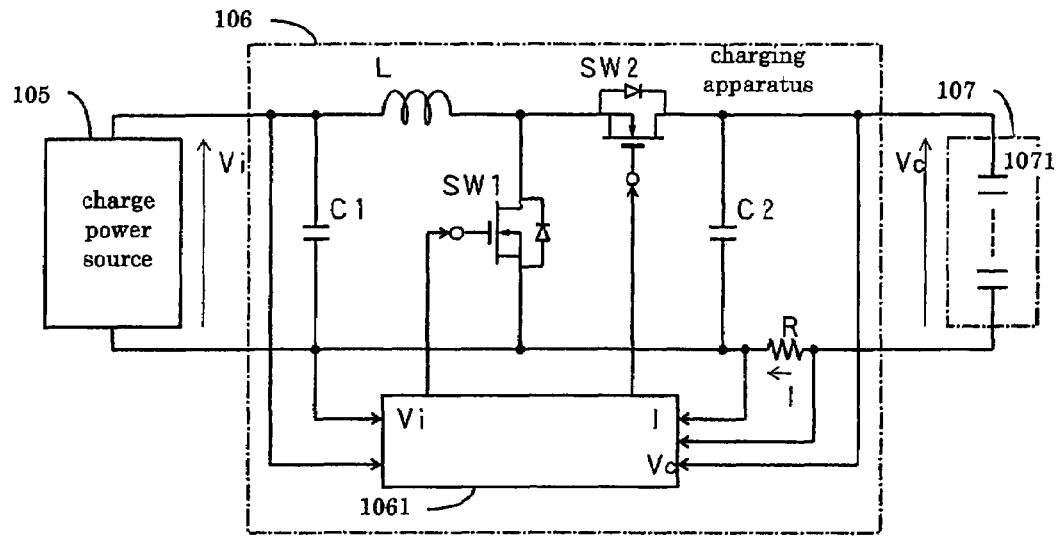
FIG. 1 is a circuit diagram of the main circuit of an embodiment of a charging apparatus for a capacitor storage type power source according to the present invention.

The charging apparatus for a capacitor storage type power source of this embodiment of FIG. 1 is adapted to electrically charge a capacitor storage type power source 107 formed by connecting a plurality of electric double layer capacitors 1071 in series from a charge power source 105 by way of a charging apparatus 106 and store electric energy in them. Each of the plurality of electric double layer capacitors 1071 of the capacitor storage type power source 107 are provided with respective parallel monitors that are connected in parallel to bypass the charge current when the charge voltage is raised and gets to a predetermined reference voltage. The charging apparatus 106 is realized by connecting a choke coil L for charge control and a synchronous rectifier circuit SW2 in series between the charge power source 105 and the capacitor storage type power source 107, then a main switch circuit SW1 to the series connection point in parallel and then connecting smoothing capacitors C1, C2 in parallel between the input side and the output side to form a voltage boosting switching converter and subsequently inserting and connecting a current detecting resistor R in series in order to detect the charge current I.

Figure 2:
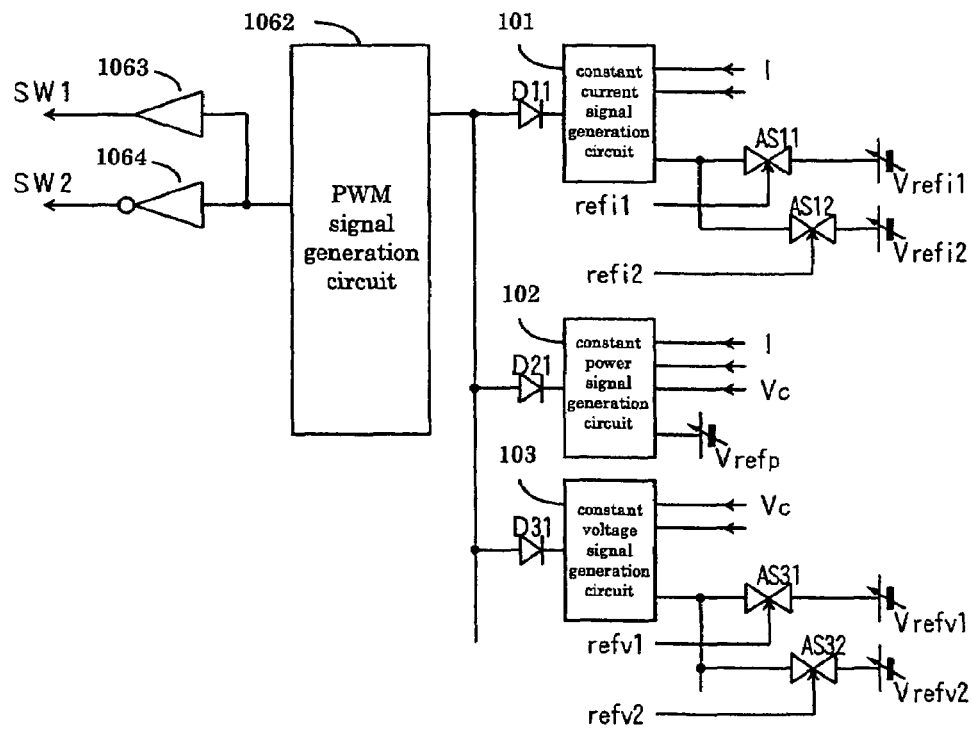
FIG. 2 is a circuit diagram of the signal processing circuit of an embodiment of a charging apparatus for a capacitor storage type power source.

The signal processing circuit 1061 is to control the charge current by turning on/off the main switch circuit SW1 and the synchronous rectifier circuit SW2 at phases inverse relative to each other according to on/off control signals. For this purpose, the signal processing circuit 1061 detects the charge current I, the charge voltage Vc and the input voltage Vi, compares them with respective reference values defined for control purposes and generates and outputs on/off control signals according to the error amplifying signals produced as a result of the comparisons. The on/off control signals are modulated for the pulse width depending on the charge mode in effect, which may be a constant current mode, a constant power mode or a constant voltage mode. More specifically, as shown in FIG. 2, the signal processing circuit 1061 includes a constant current signal generation circuit 101, a constant power signal generation circuit 102, a constant voltage signal generation circuit 103 and a PWM signal generation circuit 1062. The circuits (1 through 3) for generating error amplifying signals respectively compare the reference values set by the current reference value setting circuit Vrefi1 or Vrefi2, the constant power reference value setting circuit Vrefp, the constant voltage reference value setting circuit Vrefv1 or Vrefv2 with the detection signals of the charge current I and the charge voltage Vc to output error amplifying signals. Then, one of the error amplifying signals is selected by the switching operation of the logical OR circuit having diodes D11, D21, D31 and input to the PWM signal generation circuit 1062. Thus, an on/off control signal (PWM signal) that is modulated for the pulse width is generated from the PWM signal generation circuit 1062 and output to the main switching circuit SW1 and the synchronous rectifier circuit SW2 respectively by way the amplifier 1063 and the inverting amplifier 1064.

In the embodiment illustrated in FIG. 2, the constant current signal generation circuit 101 can select one of a plurality of current reference value setting circuits Vrefi1 and Vrefi2 by means of analog switches AS11, AS12 and change the selected current reference value while the constant voltage signal generation circuit 103 can select one of a plurality of constant voltage reference value setting circuits Vrefv1 and Vrefv2 by means of analog switches AS31, AS32 and change the reference value.

The selection of the current reference value Vrefi1 or Vrefi2 is realized under the condition that any of the parallel monitors that are connected to the respective electric double layer capacitors 1071 in parallel bypasses the charge current (according to a full charge signal: F signal) while the withstand current upper limit value of the parallel monitors is held low relative to the withstand current upper limit value of the electric double layer capacitors 1071. The analog switch AS11 is held on by means of selection signal refi1 and the analog switching AS12 is held off by means of selection signal refi2 until any of the parallel monitors bypasses the charge current so as to electrically charge the electric double layer capacitors 1071 with a large charge current that corresponds to the withstand current upper limit value. However, once the current bypassing operation of any of parallel monitors is detected, the analog switch AS11 is turned off by means of selection signal refi1 and the analog switch AS12 is turned on by means of selection signal refi2 so as to select a charge current level lower than the withstand current upper limit value of the parallel monitors. As a result of switching the current reference value, it is possible to reduce the capacity of the parallel monitors and minimize the power loss that can be produced by the bypassing operation after the appearance of a full charge condition.

When a plurality of charging apparatus are operated in parallel and the charging apparatus are controlled so as to output charge currents of the same level, the value of the charge current detected by the master charging apparatus is made to be equal to the current reference value of the slave charging apparatus. In such a case, the analog switch AS11 is turned on by means of selection signal refi1 and the analog switch AS12 is turned off by means of selection signal refi2 in the single master charging apparatus, while the analog switch AS11 is turned off by means of selection signal refi1 and the analog switch AS12 is turned on by means of selection signal refi2 in all the slave charging apparatus in order to select the detected value of the charge current taken out from the master charging apparatus as current reference value. Then, the plurality of charging apparatus does not operate independently. In this way, the plurality of charging apparatus can be synchronously controlled by selecting one of them as master charging apparatus and selecting the charge current output from the master charging apparatus as current reference value for all the slave charging apparatus. Then, it is possible to increase the entire charge current and charge the capacitor storage type power source at high speed.

The selection of one of the constant voltage reference value setting circuits Vrefv1, Vrefv2 is typically realized by means of external signals (refv1, refv2) such as the output signals of a rated voltage switch. According to an empirical law, when the rated voltage life of the electric double layer capacitors 1071 is 5V, the service life of the electric double layer capacitor capacitors 1071 is prolonged by 1.5 times when the operating voltage is lowered by 0.2V from 5V. Thus, the analog switch AS31 is turned on by means of selection signal refv1 to select the constant voltage reference value Vrefv1 in an ordinary operation mode but the analog switch AS32 is turned on by means of selection signal refv2 to select the constant voltage reference value Vrefv2 in a longevity operation mode.

Figure 3:
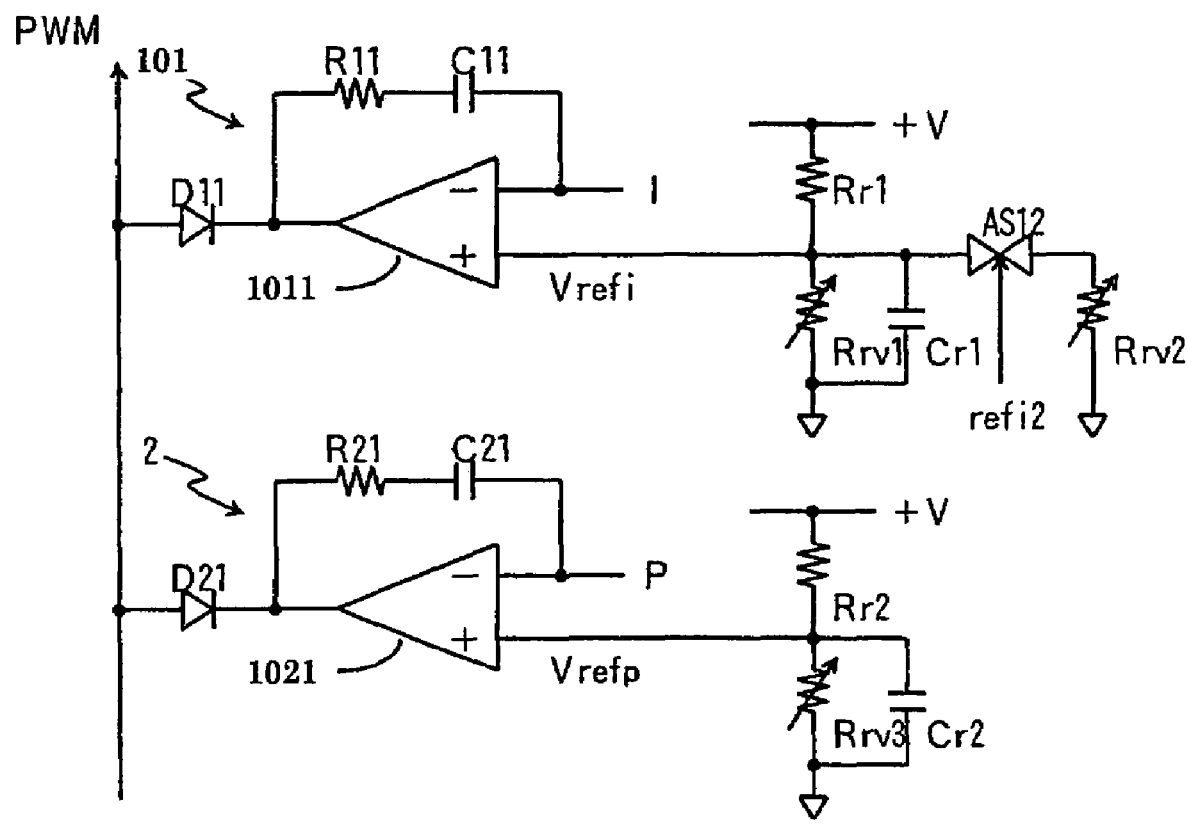
FIG. 3 is a circuit diagram of an embodiment of a constant voltage signal generation circuit and the constant power signal generation circuit of a charging apparatus according to the present invention.
Figure 4A:
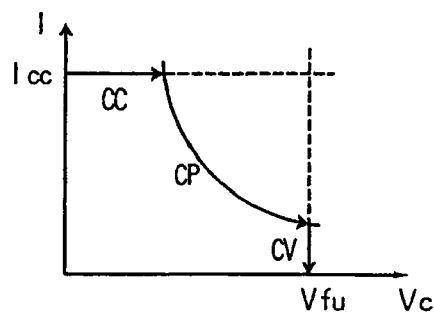
FIG. 4A is a graph illustrating the transition of a control mode of a constant current-constant power-constant voltage control.
Figure 4B:
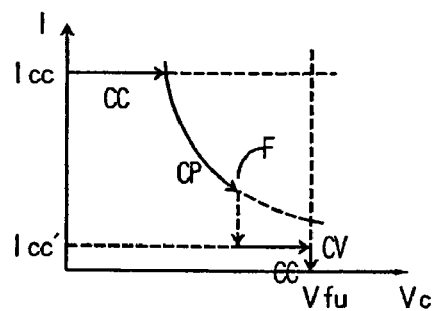
FIG. 4B is another graph illustrating the transition of control mode of a constant current-constant power-constant voltage control.
Figure 4C:
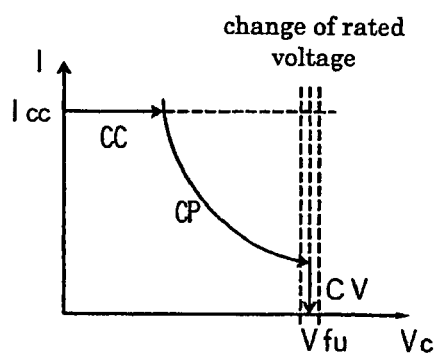
FIG. 4C is still another graph illustrating the transition of a control mode of a constant current-constant power-constant voltage control.
Figure 5:
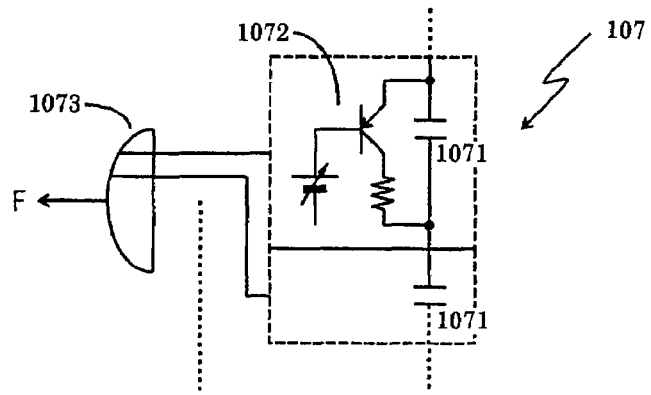
FIG. 5 is a circuit diagram of an embodiment of a switching signal generation circuit employing a bypass operation of a parallel monitor.

FIG. 3 is a circuit diagram of an embodiment of constant voltage signal generation circuit and the constant power signal generation circuit of a charging apparatus according to the present invention. FIG. 4A is a graph illustrating the transition of a control mode for constant current-constant power-constant voltage control. FIG. 4B is another graph illustrating the transition of a control mode for constant current-constant power-constant voltage control. FIG. 4C is still another graph illustrating the transition of constant current-constant power-constant voltage control. FIG. 5 is a circuit diagram of an embodiment of switching signal generation circuit employing a bypass operation of a parallel monitor. In these figures, there are shown operational amplifiers 1011, 1021, a parallel monitor 1072, an OR gate 1073, an analog switch AS12, capacitors C21, C22, Cr1, Cr2, resistors R11, R21, Rr1, Rr2 and variable resistors Rrv11, Rrv12, Rrv2.

Referring to FIG. 3, the constant current signal generation circuit 101 inputs a detection signal of the charge current I to the inverted input terminal− and the current reference value Vrefi to the non-inverted input terminal+ of the operational amplifier 1011 and connects a series circuit of the capacitor C11 and the resistor R11 between the inverted input terminal− and the output terminal to form an error amplifier circuit. Similarly, the constant power signal generation circuit 102 inputs a detection signal of the charge power P (operation signal of current×voltage) to the inverted input terminal− and the power reference value Vrefp to the non-inverted input terminal+ of the operational amplifier 1021 and connects a series circuit of the capacitor C21 and the resistor R21 between the inverted input terminal− and the output terminal to form an error amplifier circuit. An arrangement similar to that of the constant current signal generation circuit 101 can be made for the constant voltage signal generation circuit 103 and hence will not be described here any further.

The above-described reference value setting circuits can be formed by using various known circuits. For the current reference value, the stabilized bias power source +V is divided by a voltage divider circuit of the fixed resistor Rr1 and the variable resistor Rrv1 and the current reference value Vrefi is taken out from the voltage dividing connection point and adjusted to produce the predetermined voltage by means of the variable resistor Rrv1. Note that the capacitor Cr1 is connected in parallel with the variable resistor Rrv1 as an anti-noise measure. The current reference value can be switched by connecting the variable resistor Rrv2 in parallel with the variable resistor Rrv1 by way of the analog switch AS12 and turning on/off the analog switch AS12 by means of a selection signal refi2. The circuit can be made to correspond to a circuit where the analog switch AS11 is turned on and the analog switch AS12 is turned off in the embodiment of FIG. 2 by turning off the analog switch AS12, whereas the circuit can be made to correspond to a circuit where the analog switch AS11 is turned off and the analog switch AS12 is turned on in the embodiment of FIG. 2 by turning on the analog switch AS12. It may be needless to say that each of Vrefi1 and Vrefi2 of the embodiment of FIG. 2 can be formed by a voltage divider circuit of the fixed resistor Rr1 and the variable resistor Rrv1 of the embodiment of FIG. 3.

Referring to FIG. 3, the constant current signal generation circuit 101 is formed by an error amplifying circuit that takes out the voltage fall between the terminals of the current detecting resistor R inserted and connected in series to the charging apparatus as detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 101 is large when the charge current I that is input as an object of control is smaller than the current reference value Vrefi but small when the charge current I is larger than the current reference value Vrefi. As the error amplifying signal is input to the PWM signal generation circuit 1062, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi so that consequently the constant current charge operation is conducted in a control mode CC where the charge current I is controlled so as to be held to a constant level according to the current reference value Vrefi.

Similarly, the constant power signal generation circuit 102 is formed by an error amplifying circuit that inputs the charge power P as an object of control, compares it with the power reference value Vrefp set in the power reference value setting circuit as the reference value of a comparator and outputs an error amplifying signal thereof. Thus, the output value of the error amplifying signal output from the constant power signal generation circuit 102 is large when the charge power P that is the input as an object of control is smaller than the power reference value Vrefp but small when the charge power P is larger than the power reference value Vrefp. As the error amplifying signal is input to the PWM signal generation circuit 1062, the circuit controls the pulse width (duty ratio) according to the magnitude of the error amplifying signal that is input to increase the charge current I when the charge power P is smaller than the power reference value Vrefp but decrease the charge current I when the charge power P is larger than the power reference value Vrefp so that consequently the constant power charge operation is conducted in a control mode CP where the charge current I is controlled so as to hold the charge power P to a constant level according to the current reference value Vrefp.

The diodes D11, D21, D31 are connected to the input of the PWM signal generation circuit 1062 respectively from the constant current signal generation circuit 101, the constant power signal generation circuit 102 and the constant voltage signal generation circuit 103 with the opposite polarities to form a logical OR circuit that inputs the smallest error amplifying signal to the PWM signal generation circuit 1062 out of the error amplifying signals output from the constant current signal generation circuit 101, the constant power signal generation circuit 102 and the constant voltage signal generation circuit 103.

The charge mode switching control operation of the logical OR circuit will be described further below. Firstly, in the initial stages of the charge operation after the start, the diode D11 is turned on while the diodes D21, D31 are held off and a constant current charge operation is conducted in a control mode CC. In other words, when the charge voltage Vc of the capacitor storage type power source 107 is low and hence the PWM signal generation circuit 1062 is performing a constant current charge operation in a control mode CC according to the error amplifying signal output from the constant current signal generation circuit 101 in the initial stages, the object of control of the constant power signal generation circuit 102 and that of the constant voltage signal generation circuit 103 are smaller than the respective reference values to be compared. Therefore, if error amplifying signals having a large value are output from them, neither the charge current I nor the charge voltage Vc of the capacitor storage type power source 107 increases and the error amplifying signals are held close to the respective upper limit values so that the diodes D21, D31 are biased in the opposite directions and held off.

However, as the constant current charge operation is continued, the charge voltage Vc of the capacitor storage type power source 107 increases, the charge power P increases and eventually becomes larger than the power reference value Vrefp of the constant power signal generation circuit 102. Then, the error amplifying signal output from the constant power signal generation circuit 102 becomes smaller than the error amplifying signal output from the constant current signal generation circuit 101. At this moment, the diode D11 that is connected to the output of the constant current signal generation circuit 101 is turned off and the diode D21 connected to the output of the constant power signal generation circuit 102 is turned on so that a constant power charge operation is conducted in a control mode CP where the charge current I is controlled in such a way that the charge power P of the capacitor storage type power source 107 may not exceed the power reference value Vrefp.

As the constant power charge operation is continued, the charge voltage Vc of the capacitor storage type power source 107 rises and eventually becomes higher than the voltage reference value Vrefv of the constant voltage signal generation circuit 103. Then, the error amplifying signal output from the constant voltage signal generation circuit 103 becomes smaller than the error amplifying signal output from the constant power signal generation circuit 102. At this moment, the diode D21 that is connected to the output of the current diminishing signal generation circuit 2 is turned off and the diode D31 connected to the output of the constant voltage signal generation circuit 103 is turned on so that a constant voltage charge operation is conducted in a control mode CV where the charge current is controlled in such a way that the charge voltage Vc may not exceed the voltage reference value Vrefv.

In this way, with the charging apparatus 106 of this embodiment, the charge current I is detected and compared with the predetermined current reference value Vrefi that is set by the current reference value setting circuit so as to keep the charge current I to a constant level (constant current charge: CC). As the capacitor storage type power source 107 is electrically charged to show a predetermined voltage, the charge power P is computed and compared with the predetermined power reference value Vrefp that is set by the power reference value setting circuit so as to keep the charge power P to a constant level (constant power charge: CP). As the capacitor storage type power source 107 is electrically charged to a full charge voltage level, the charge voltage Vc is compared with the predetermined voltage reference value Vrefv that is set by the voltage reference value setting circuit so as to keep the charge voltage Vc to a constant level (constant voltage charge: CV). In this way, the control modes are selectively used to control the main switch circuit SW1 and the synchronous rectifier circuit SW2 by PWM (pulse width modulation) control. FIG. 4A is a graph illustrating the transition of control mode of constant current-constant power-constant voltage charge.

FIG. 4B is a graph illustrating the transition of control mode of constant current-constant power-constant voltage control, where the capacitor storage type power source 107 is charged with a charge current by referring to a large current reference value Vrefi1 that is close to the withstand current upper limit of the electric double layer capacitors 1071 and then the charge current is switched to another current reference value Vrefi2 that is smaller than the withstand current upper limit of the parallel monitors by means of detection signal F detecting a bypass operation of a parallel monitor. With this arrangement, the detection signal F of the bypass operation of any of the parallel monitors 72 of the electric double layer capacitors 1071 is taken out by way of an OR gate 73 as shown in FIG. 5. Thus, the current reference value Vrefi2 is selected when one of the parallel monitors bypasses the charge current. FIG. 4C is a graph illustrating the transition of control mode of constant current-constant power-constant voltage control, where the rated voltage (Vfu) of the capacitor storage type power source is changed by changing the voltage reference value Vrefv by means of the constant voltage signal generation circuit 103, taking the service life of the electric double layer capacitors into consideration.

Figure 6:
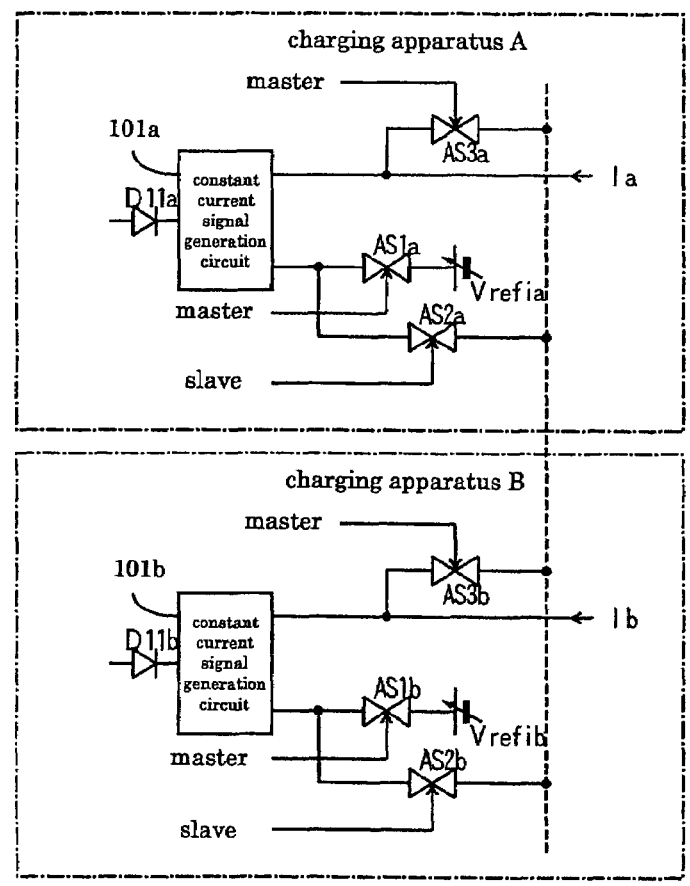
FIG. 6 is a schematic illustration of a synchronous control system where charging apparatus operate in parallel as a master charging apparatus and a slave charging apparatus.

FIG. 6 is a schematic illustration of a synchronous control system where a plurality of charging apparatus operate in parallel as master charging apparatus and slave charging apparatus. With this system, analog switches AS1$a$ through AS3$a$, AS1$b$ through AS3$b$ are selectively turned on/off by means of slave/master selection signals to select a master charging apparatus, the remaining charging apparatus being slave charging apparatus, so as to drive the charging apparatus to operate in parallel. In the case of the embodiment of FIG. 6, as the analog switches AS1$a$, AS3$a$ of the charging apparatus A are turned on by means of a master selection signal, the charging apparatus A is selected as a master charging apparatus. Then, voltage reference value Vrefia is input to the constant current signal generation circuit 101$a$ to control the charge current Ia and, at the same time, the detection signal of the charge current Ia is output to a common reference value line (broken line) so as to be used as reference value for the slave charging apparatus. On the other hand, as the analog switch AS2$b$ of the charging apparatus B is turned on by a slave selection signal, the charging apparatus B becomes a slave charging apparatus and the charge current Ia of the master charging apparatus is input as reference value to the constant current signal generation circuit 101$b$ from the common reference value line (broken line) by way of the analog switch AS2$b$ to control the charge current Ib.

Figure 7A:
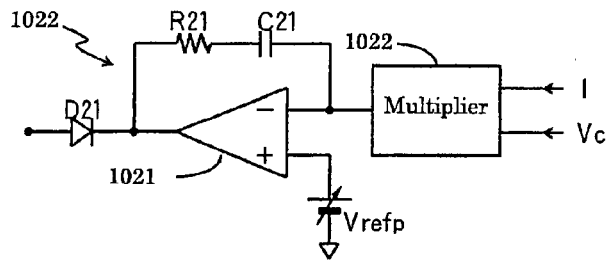
FIG. 7A is a circuit diagram of another embodiment of a constant power signal generation circuit.
Figure 7B:
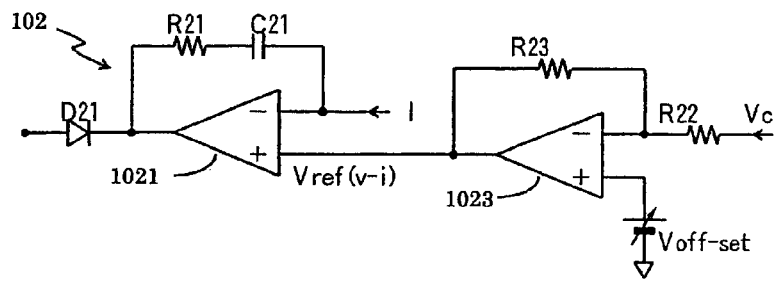
FIG. 7B is a circuit diagram of another embodiment of a constant power signal generation circuit.

FIGS. 7A through 7D are circuit diagrams of other embodiments of constant power signal generation circuit. In FIGS. 7A through 7D, there are shown a multiplier circuit 1022, an operational amplifier 1023, resistors R22, R23 and an offset value setting circuit Voff-set. Generally, the constant power signal generation circuit 102 is so arranged as to multiply the charge current I by the charge voltage Vc of the capacitor storage type power source by means of a multiplier circuit 22 to determine the charge power P and output an error amplifying signal, using the charge power P as power reference value Vrefip. However, such a multiplier is costly and requires cumbersome adjustment operations because the current value and the voltage value respectively are as large as tens to hundreds of several amperes and hundreds to thousands of several volts and the voltage changes over a wide range from near 0V to the full charge voltage in a large capacity capacitor storage type power source. Then, as a result, the apparatus itself becomes costly because of the costly parts. In view of this problem, simplified type constant power signal generation circuit for diminishing the charge current in inverse proportion to the increase of the charge voltage as shown in FIG. 7B may be used.

Figure 7C:
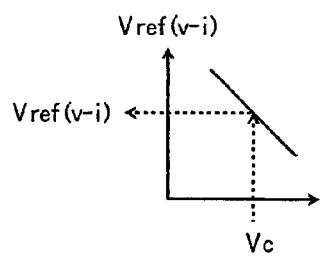
FIG. 7C is a circuit diagram of another embodiment of a constant power signal generation circuit.
Figure 7D:
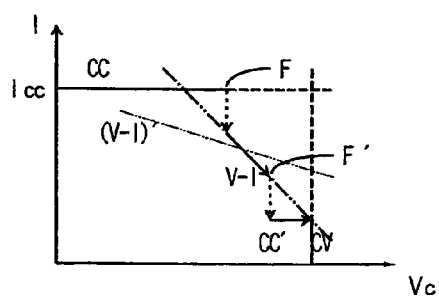
FIG. 7D is a circuit diagram of still another embodiment of a constant power signal generation circuit.

The simplified type constant power signal generation circuit 102 illustrated in FIG. 7B is a current diminishing signal generation circuit that generates a current reference value Vref(v−i) for reducing the charge current I in inverse proportion to the increase of the charge voltage Vc of the capacitor storage type power source 107, compares the current reference value Vref (V−i) with the charge current I that is the object of control and outputs an error amplifying signal for the difference. More specifically, the current reference value Vref(v−i) is generated as the output of a subtraction circuit, as shown in FIG. 7C. The subtraction circuit is formed by using an operation amplifier 23 having an inverted input terminal− where a detection signal of the charge voltage Vc of the capacitor storage type power source 107 is input by way of a resistor 22 and an non-inverted input terminal+ where an offset value Voff-set is input and a resistor R23 connected between the inverted input terminal− and the output terminal. The current reference value Vref(V−i) of Voff-set+Voff-set− Vc) R23/R22 (2Voff-set−Vc when R23=R22) is taken out from the subtraction circuit. If Voff-set is made equal to Vst of FIG. 2B, the reference value of the constant current signal generation circuit 101 and that of the current diminishing signal generation circuit 2 become equal to each other when the charge voltage Vc of the capacitor storage type power source 107 rises to Voff-set so that a control mode for diminishing the electric current is selected from this point. The ratio of R23 and R22 may be changed in the subtraction circuit to change the gradient of the curve of the current reference value Vref(v−i) as shown by V-I and (V-I)' in FIG. 7D. Additionally, the constant current charge may be switched to the constant power charge (current diminishing charge) and then the constant power charge (current diminishing charge) may be switched to another constant current charge of a small current by means of bypass operation signals F, F', as shown in FIG. 7D.

In a charge operation, if the electric double layer capacitors of the capacitor storage type power source equipped with respective parallel monitors are charged unevenly to respective charge voltages that are different from each other, the parallel monitors of the electric double layer capacitors that are charged beyond the predetermined reference voltage bypass the charge current to make the charge voltage agree with the predetermined reference voltage to limit the charge voltage to the reference voltage. Thus, once the full charge voltage of the electric double layer capacitors is defined to be equal to the reference voltage, all the electric double layer capacitors are uniformly charged to the full charge voltage.

As the parallel monitor of an electric double layer capacitor charged to the predetermined reference voltage bypasses the charge current, the parallel monitor consumes the power equal to the product of multiplication of the predetermined reference voltage and the charge current, or the voltage and the current at the start of the bypassing, as heat. Thus, the power loss, or the thermal loss, is large when both the duration of the operation of each parallel monitor and/or the number of operating parallel monitors is large for the capacitor storage type power source 107. As a result, both the capacity and the dimensions of the parallel monitors are required to be raised in order to improve the heat radiation efficiency. Then, both power and space have to be wasted to make it difficult to downsize the capacitor storage type power source 107. In view of this problem, the charging apparatus 106 of this embodiment is adapted to judge the initial stages of the bypassing operation of a parallel monitor by referring to the charge voltage of the capacitor storage type power source 107 and diminish the charge current in inverse proportion to the increase of the charge voltage or limit the charge current to below the withstand current upper limit of the parallel monitors in response to the bypassing operation of the parallel monitor as shown in FIGS. 4B and 7D. With this arrangement, it is possible to reduce the capacity and the dimensions of the parallel monitors.

Figure 8:
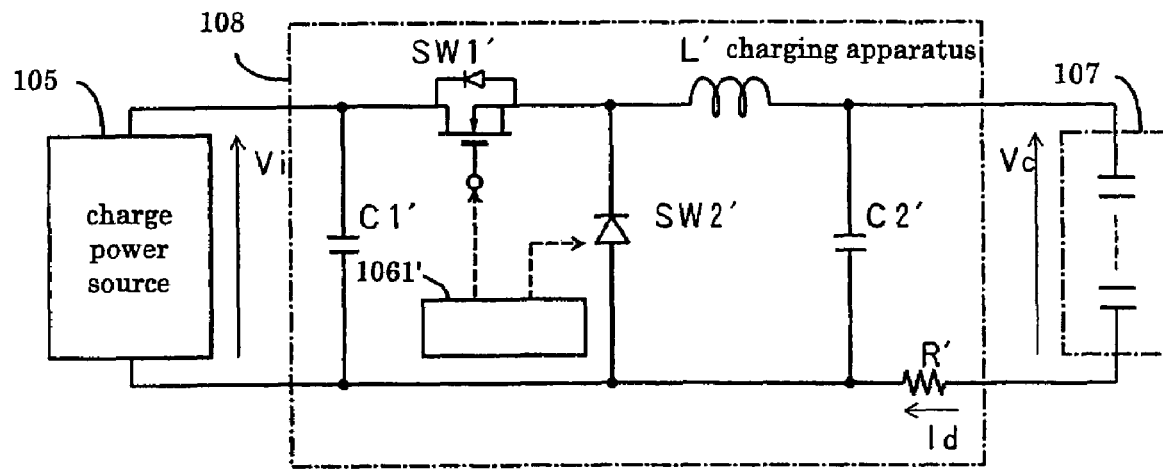
FIG. 8 is a circuit diagram of another embodiment of a main circuit of a charging apparatus for a capacitor storage type power source according to the present invention.

FIG. 8 is a circuit diagram of another embodiment of a main circuit of a charging apparatus for a capacitor storage type power source according to the present invention. In FIG. 8, there are shown a signal processing circuit 1061', capacitors C1', C2', a coil L', a current detecting resistor R' and switching circuits SW1', SW2'.

In the charging apparatus of FIG. 8, the charge control switching circuit SW1' and the choke coil L' are connected in series between the charge power source 105 and the capacitor storage type power source 107 and the synchronous rectifier circuit SW2' to the series connection point thereof in parallel, while the capacitors C1', C2' are connected in parallel respectively to the input side and the output side of the charging apparatus to realize a voltage-lowering type switching converter where, as the switching circuit SW1' is turned on/off by means of a PWM signal, the synchronous rectifier circuit SW2' is turned off/on at phases inverse relative to those of the on/off operation of the switching circuit SW1' to supply the charge current to the capacitor storage type power source 107. Note that in the embodiments of FIGS. 1 and 8, the synchronous rectifier circuits SW2, SW2' may be replaced by diodes (flywheel diodes).

Figure 9:
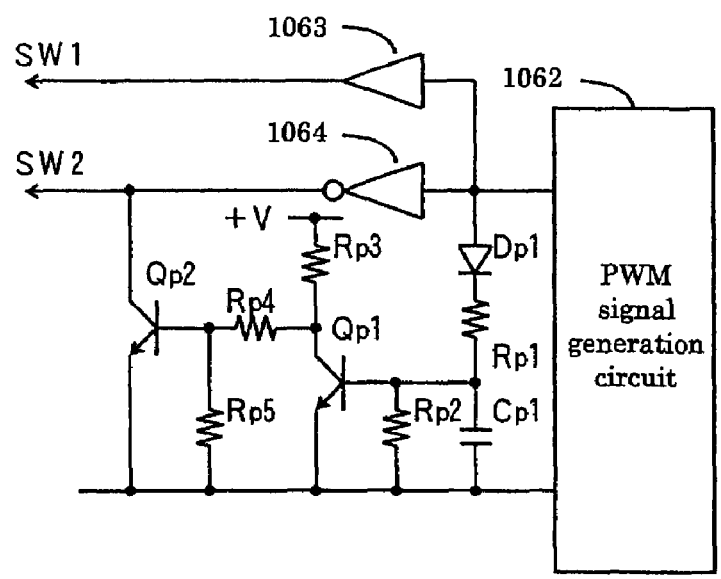
FIG. 9 is a circuit diagram of an embodiment of a circuit for limiting the operation of the synchronous rectifier circuit for the output circuit of on/off control signals.
Figure 10A:
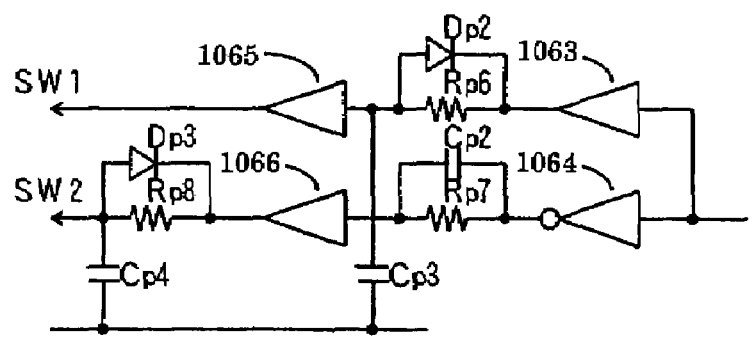
FIG. 10A is a circuit diagram of an embodiment of a circuit for preventing simultaneous on of the output circuit of on/off control signals.
Figure 10B:
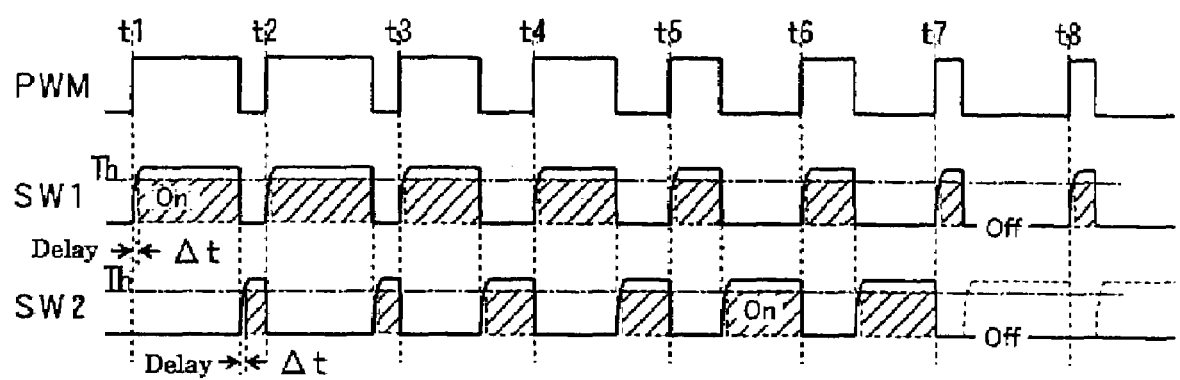
FIG. 10B is a graph illustrating the operation of an embodiment of a circuit for preventing simultaneous on of the output circuit of on/off control signals.

FIG. 9 is a circuit diagram of an embodiment of circuit for limiting the operation of the synchronous rectifier circuit for the output circuit of on/off control signals. FIG. 10A is a circuit diagram of an embodiment of circuit for preventing simultaneous on of the output circuit of on/off control signals. FIG. 10B is a graph illustrating the operation of an embodiment of circuit for preventing simultaneous on of the output circuit of on/off control signals. In these figures, there are shown amplifiers 1063, 1065, 1066, an inverting amplifier 1064, capacitors Cp1 through Cp4, diodes Dp1 through Dp3, transistors Qp1, Qp2 and resistors Rp1 through Rp8.

As for controlling the operation of turning on/off the main switching circuit SW1, the charge current is squeezed to become small when the duty ratio is reduced. In the embodiment of FIG. 9, the diode is connected in parallel with a polarity arrangement that makes the energy accumulated in the choke coil L to be discharged to the synchronous rectifier circuit SW2 so as to prevent the charge current from flowing inversely by way of the synchronous rectifier circuit when the load is light by keeping the synchronous rectifier circuit SW2 off regardless of on/off of the main switching circuit SW1 while the duty ratio is small. More specifically, the diode Dp1, the resistor Rp1 and the capacitor Cp1 are connected in series and the resistor Rp2 is connected to the capacitor Cp1 in parallel to form a rectifying/smoothing circuit for on/off control signals. Then, the rectified/smoothed output is applied to between the base and emitter of the transistor Qp1 so that the transistor Qp1 is turned on when the pulse duty ratio, or the width of the pulse that is on, is large but the transistor Qp1 is turned off as pulse width falls below a predetermined value and hence the base bias voltage is reduced. Additionally, the embodiment also comprises a signal holding circuit that short-circuits the output of the inverting amplifier 1064 for turning on/off the synchronous rectifier circuit SW2 by controlling the base bias voltage of the transistor Qp2 by means of the collector output of the transistor Qp1. Thus, this embodiment locks the synchronous rectifier circuit SW2 off only when the current is small so as to discharge the energy accumulated in the choke coil L by way of the diode but turns the synchronous rectifier circuit SW2 on to allow a large current to flow through it so that the loss at the diode can be minimized.

Additionally, the on/off control signal output circuits may be provided with respective delay circuits as shown in FIG. 10A to delay the outputs of the on/off control signals so that the main switching circuit SW1 and the synchronous rectifier circuit SW2 may not be turned on simultaneously. Referring to FIG. 10A, the resistor Rp6 and the capacitor Cp3 form a delay circuit that delays the rise of the drive pulse (at the time of being turned on) of the main switching circuit SW1 by delay time Δt and, at the same time, the resistor Rp8 and the capacitor Cp4 form a delay circuit that delays the rise of the drive pulse (at the time of being turned on) of the synchronous rectifier circuit SW2 by delay time Δt. On the other hand, the diode Dp2 that is connected to the resistor Rp6 in parallel and shows a polarity opposite to the output direction of the drive pulse signal of the main switch circuit SW1 and the diode Dp3 that is connected to the resistor Rp8 in parallel and shows a polarity opposite to the output direction of the drive pulse signal of the synchronous rectifier circuit SW2 are circuits that prevent delay time Δt from being produced at the falling edges of the respective pulses. The parallel circuit of the resistor Rp7 and the capacitor Cp2 that are connected to the output of the inverting amplifier are for removing noises. As these circuits are connected, the pulse signal output to the main switching circuit SW1 by way of the amplifiers 1063, 1065 and the pulse signal output to the synchronous rectifier circuit SW2 by way of the inverting amplifiers 1064, 1066 that are produced by inputting a PWM signal are delayed only at the rising edges as shown in FIG. 10B to prevent the main switching circuit SW1 and the synchronous rectifier circuit SW2 from being turned on simultaneously. Note that the pulse width is smaller than the predetermined value at t7, t8 so that the transistor Qp2 shown in FIG. 9 is turned on.

Figure 11:
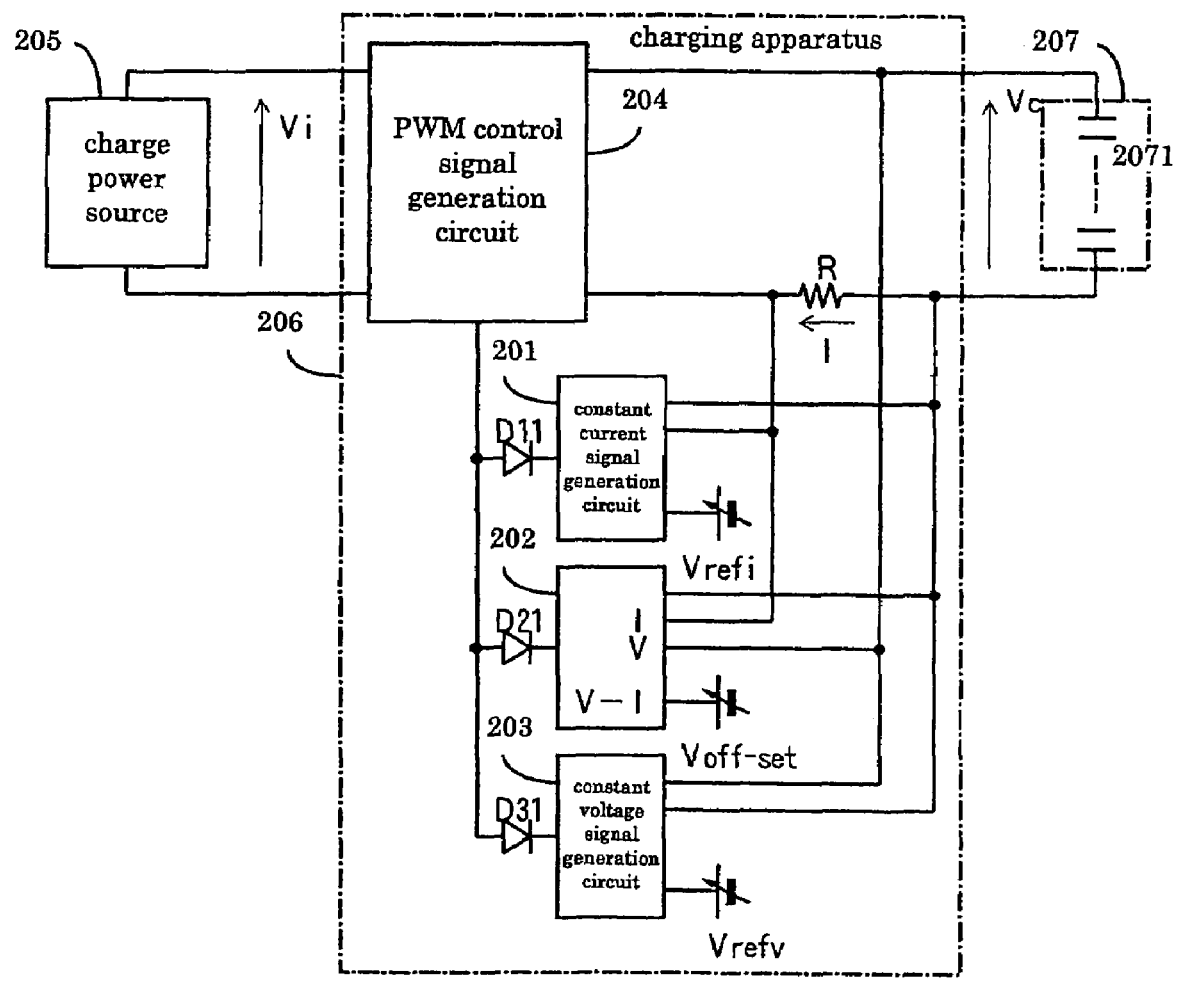
FIG. 11 is a circuit diagram of an embodiment of a charging apparatus for a capacitor storage type power source according to the present invention.
Figure 12A:
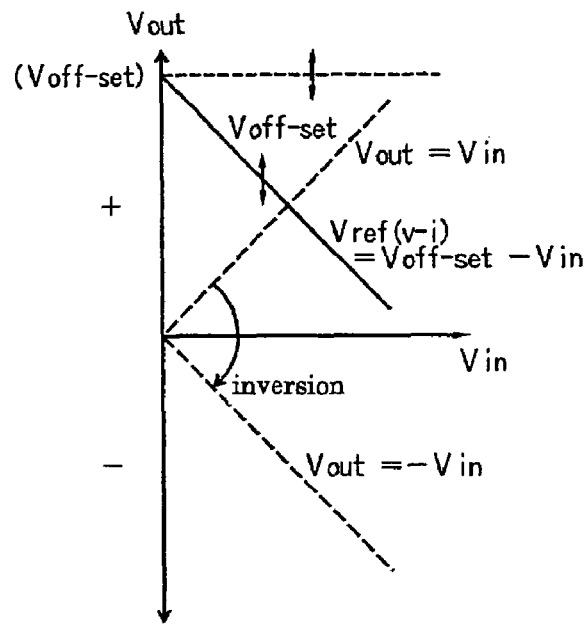
FIG. 12A is a graph illustrating a current diminishing charge (V-I control)
Figure 12B:
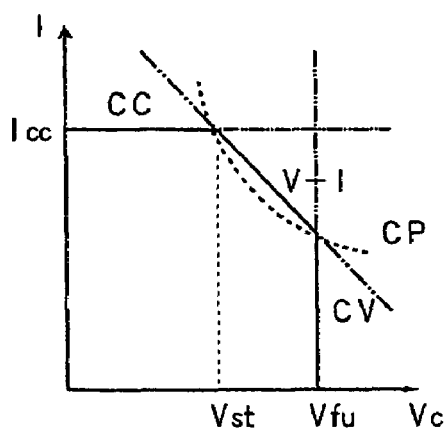
FIG. 12B is another graph illustrating a current diminishing charge (V-I control)

(A second aspect of the invention) Now, another embodiment of the present invention will be described by referring to the related drawings. FIG. 11 is a circuit diagram of an embodiment of a charging apparatus for a capacitor storage type power source according to the present invention. FIG. 12A is a graph illustrating a current diminishing charge (V-I control). FIG. 12B is another graph illustrating a current diminishing charge (V-I control). In these figures, there are shown a constant current signal generation circuit 201, a current diminishing signal generation circuit 202, a constant voltage signal generation circuit 203, a PWM control circuit 204, a charge power source 205, a charging apparatus 206, a capacitor storage type power source 207, diodes D11, D21, D31, a current detecting resistor R, a current reference value setting circuit Vrefi, a voltage reference value setting circuit Vrefv, an offset value setting circuit Voff-set, a charge current I and a charge voltage Vc.

The charging apparatus for a capacitor storage type power source of this embodiment of FIG. 11 is adapted to electrically charge a capacitor storage type power source 207 formed by connecting a plurality of electric double layer capacitors in series from a charge power source 205 by way of the charging apparatus 206 and store electric energy in them. The plurality of electric double layer capacitors of the capacitor storage type power source 207 are provided with respective parallel monitors that are connected in parallel to bypass the charge current when the charge voltage is raised and gets to a predetermined reference voltage. Therefore, as the parallel monitors are provided, if the electric double layer capacitors of the capacitor storage type power source equipped with respective parallel monitors are charged unevenly to respective charge voltages that are different from each other in a charge operation, the parallel monitors of the electric double layer capacitors that are charged beyond the predetermined reference voltage bypass the charge current to make the charge voltage agree with the predetermined reference voltage to limit the charge voltage to the reference voltage. Thus, once the full charge voltage of the electric double layer capacitors is defined to be equal to the reference voltage, all the electric double layer capacitors are uniformly charged to the full charge voltage.

As the parallel monitor of an electric double layer capacitor charged to the predetermined reference voltage bypasses the charge current, the parallel monitor consumes the power equal to the product of multiplication of the predetermined reference voltage and the charge current, or the voltage and the current at the start of the bypassing, as heat. Thus, the power loss, or the thermal loss, is large when both the duration of the operation of each parallel monitor and/or the number of operating parallel monitors is large for the capacitor storage type power source 207. As a result, both the capacity and the dimensions of the parallel monitors are required to be raised in order to improve the heat radiation efficiency. Then, both power and space have to be wasted to make it difficult to downsize the capacitor storage type power source 207. In view of this problem, the charging apparatus 206 of this embodiment is adapted to judge the initial stages of the bypassing operation of a parallel monitor by referring to the charge voltage of the capacitor storage type power source 207 and diminish the charge current in inverse proportion to the increase of the charge voltage. With this arrangement, it is possible to reduce the capacity and the dimensions of the parallel monitors.

The charging apparatus 206 detects the charge current I and compares it with the predetermined current reference value Vrefi set by the current reference value setting circuit. Then, when the charge current I gets to a constant level (constant current charge) and the capacitor storage type power source 207 is charged to a predetermined voltage level, the charging apparatus 206 performs a PWM (pulse width modulation) control operation of diminishing the charge current (current diminishing control: V-I control) in inverse proportion to the increase of the charge voltage so as to make the charge current I to show a constant level (constant current charge). As a specific circuit configuration, the charging apparatus 206 is equipped with a PWM control circuit 204, a constant current signal generation circuit 201, a current diminishing signal generation circuit 202, a constant voltage signal generation circuit 203 and a logical OR circuit formed by diodes D11, D21, D31 for selectively inputting the error amplifying signals from these signal generation circuits to the PWM control circuit 204.

The constant current signal generation circuit 201 is formed by an error amplifying circuit that takes out the voltage fall between the terminals of the current detecting resistor R inserted and connected in series to the charging apparatus as a detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 201 is large when the charge current I that is input as an object of control is smaller than the current reference value Vrefi but small when the charge current I is larger than the current reference value Vrefi. As the error amplifying signal is input to the PWM control circuit 204, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi so that consequently, a constant current charge operation is conducted in a control mode CC where the charge current I is controlled so as to be held to a constant level according to the current reference value Vrefi.

As shown in FIG. 12A, the current diminishing signal generation circuit 202 generates a current reference value Vref(v–i) that diminishes the charge current I in inverse proportion to the increase of the charge voltage Vc of the capacitor storage type power source 207, compares the current reference value Vref(v–i) with the charge current I that is the object of control and outputs a corresponding error amplifying signal. The current reference value Vref(v–i) is generated by inverting the charge voltage Vc of the capacitor storage type power source 207 (Vout=−Vin) and turning it into a positive value by means of an offset value Voff-set (=Voff-set−Vin), as shown in FIG. 12A. Therefore, the PWM control circuit 204 operates in a control mode V-I for diminishing the current, where, as the PWM control circuit 204 receives the error amplifying signal as input, it increases the charge current I if the charge voltage Vc of the capacitor storage type power source 207 is small but then, as the charge voltage Vc of the capacitor storage type power source 207 increases, the PWM control circuit 204 so controls the charge current that the charge current I becomes small in inverse proportion to the increase of the charge voltage V.

The constant voltage signal generation circuit 203 is formed by an error amplifying circuit that detects the charge voltage Vc of the capacitor storage type power source 207, inputs it as an object of control, compares it with the voltage reference value Vrefv set in advance by the voltage reference value setting circuit and outputs an error amplifying signal thereof. Thus, the output value of the error amplifying signal output from the constant voltage signal generation circuit 203 is large when the charge voltage Vc that is input as an object of control is smaller than the voltage reference value Vrefv but small when the charge voltage Vc is larger than the voltage reference value Vrefv. As the error amplifying signal is input to the PWM control circuit 204, a constant voltage charge operation is conducted in a control mode CV where the charge current I is controlled so as to be increased when the charge voltage Vc is smaller than the voltage reference value Vrefv but decreased when the charge voltage Vc is larger than voltage reference value Vrefv.

The diodes D11, D21, D31 are connected to the input of the PWM control circuit 204 respectively from the constant current signal generation circuit 201, the current diminishing signal generation circuit 202 and the constant voltage signal generation circuit 203 with the opposite polarities to form a logical OR circuit that inputs the smallest error amplifying signal to the PWM control circuit 204 out of the error amplifying signals output from the constant current signal generation circuit 201, the current diminishing signal generation circuit 202 and the constant voltage signal generation circuit 203. Now, the charge mode switching control (CC→V-I→CV) of the logical OR circuit will be described by referring to FIG. 12B.

First, in the initial stages of the charge operation after the start, the diode D11 is turned on while the diodes D21, D31 are held off and a constant current charge operation is conducted in a control mode CC. In other words, when the charge voltage Vc of the capacitor storage type power source 207 is low in the initial states, and hence the PWM control circuit 204 is performing a constant current charge operation in a control mode CC according to the error amplifying signal output from the constant current signal generation circuit 201, the object of control of the current diminishing signal generation circuit 202 and that of the constant voltage signal generation circuit 203 are smaller than the respective reference values to be compared. Therefore, if error amplifying signals having a large value are output from them, neither the charge current I nor the charge voltage Vc of the capacitor storage type power source 207 increases and the error amplifying signals are held close to the respective upper limit values so that the diodes D21, D31 are biased in the opposite directions and held off.

However, as the constant current charge operation is continued, the charge voltage Vc of the capacitor storage type power source 207 increases while the current reference value Vref(v–i) of the current diminishing signal generation circuit 202 gradually decreases until it becomes smaller than the current reference value Vrefi of the constant current signal generation circuit 201. Then, the error amplifying signal output from the current diminishing signal generation circuit 202 becomes smaller than the error amplifying signal output from the constant current signal generation circuit 201. At this moment, the diode D11 that is connected to the output of the constant current signal generation circuit 201 is turned off and the diode D21 connected to the output of the current diminishing signal generation circuit 202 is turned on so that a current diminishing operation is conducted in a control mode V-I where the charge current is controlled in such a way that the charge voltage Vc of the capacitor storage type power source 207 increases and the charge current I decreases in inverse proportion to the increase of the charge voltage Vc. In FIG. 12B, the switch point is indicated by the point where the charge voltage Vc of the capacitor storage type power source 207 becomes equal to Vst.

As the charge voltage Vc of the capacitor storage type power source 207 increases further and becomes larger than the voltage reference value Vrefv of the constant voltage signal generation circuit 203, the error amplifying signal output from the constant voltage signal generation circuit 203 becomes smaller than the error amplifying signal output from the current diminishing signal generation circuit 202 so that the diode D21 connected to the output of the current diminishing signal generation circuit 202 is turned off and the diode D31 connected to the output of the constant voltage signal generation circuit 203 is turned on so that a constant voltage charge operation is conducted in a control mode CV where the charge current is so controlled as to make the charge voltage Vc smaller than the voltage reference value Vrefv. In FIG. 12B, the switch point is indicated by the point where the charge voltage Vc of the capacitor storage type power source 207 becomes equal to Vfu.

Figure 13A:
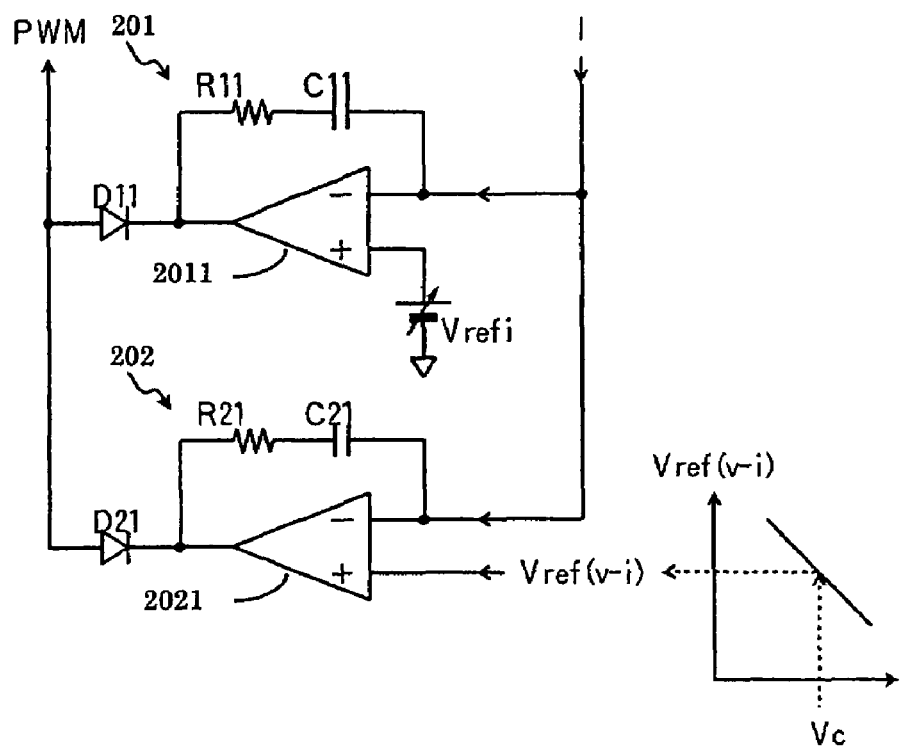
FIG. 13A is a circuit diagram of an embodiment of a constant current signal generation circuit and current diminishing signal generation circuit.
Figure 13B:
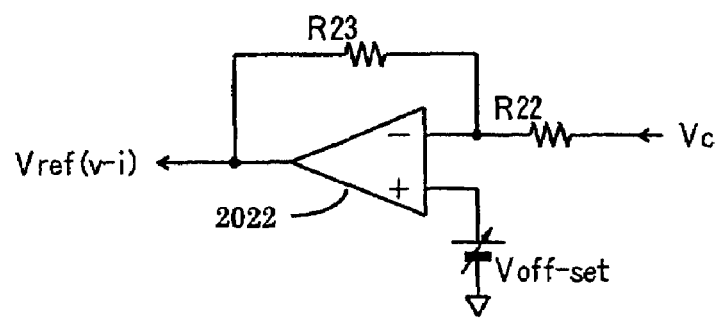
FIG. 13B is a circuit diagram of an embodiment of a constant current signal generation circuit and current diminishing signal generation circuit.
Figure 14A:
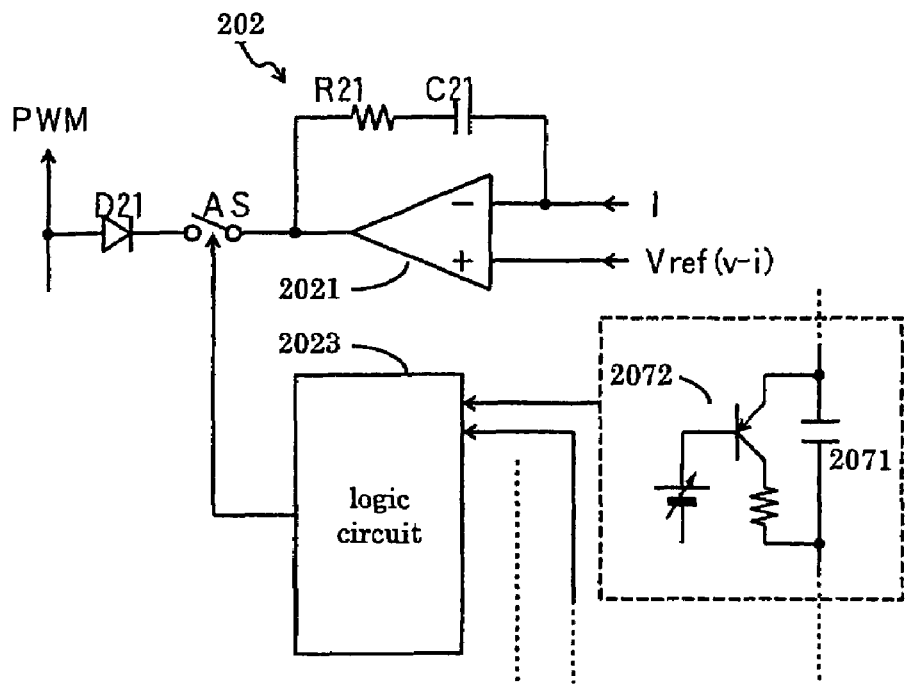
FIG. 14A is a circuit diagram of another embodiment of a current diminishing signal generation circuit.
Figure 14B:
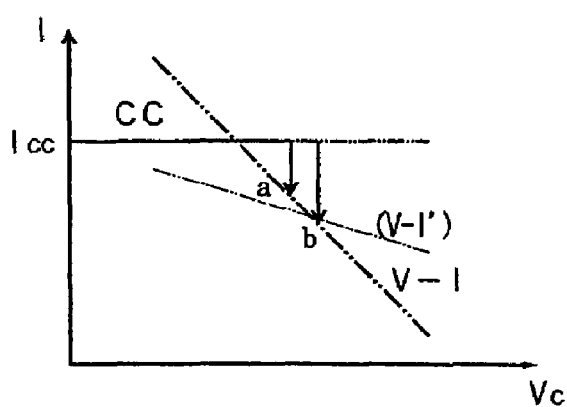
FIG. 14B is a graph illustrating the operation of the embodiment of a current diminishing signal generation circuit of FIG. 14A.
Figure 15A:
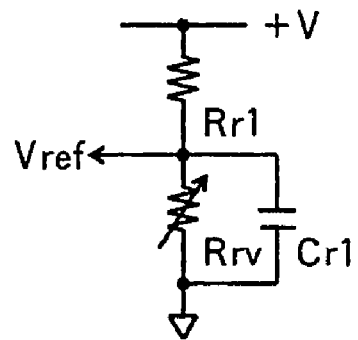
FIG. 15A is a circuit diagram of an embodiment of a reference value setting circuit.
Figure 15B:
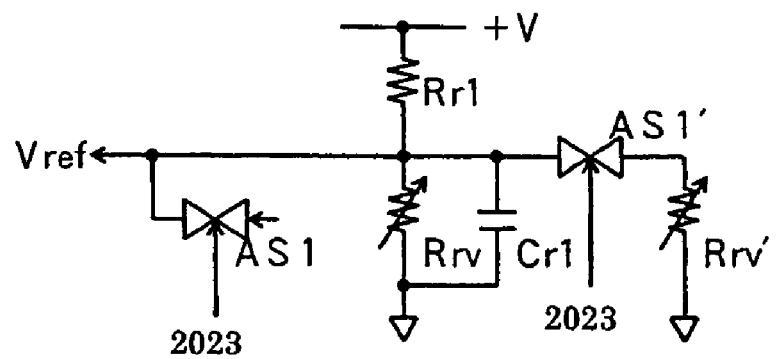
FIG. 15B is a circuit diagram of an embodiment of a reference value setting circuit.

Now, specific configurations of the signal generation circuits will be described below. FIG. 13A is a circuit diagram of an embodiment of constant current signal generation circuit and current diminishing signal generation circuit. FIG. 13B is a circuit diagram of an embodiment of constant current signal generation circuit and current diminishing signal generation circuit. FIG. 14A is a circuit diagram of another embodiment of current diminishing signal generation circuit. FIG. 14B is a graph illustrating the operation of the embodiment of current diminishing signal generation circuit of FIG. 14A. FIG. 15A is a circuit diagram of an embodiment of reference value setting circuit. FIG. 15B is a circuit diagram of an embodiment of reference value setting circuit. In these figures, there are shown operational amplifiers 2011, 2021, 2022, a logic processing circuit 2023, an electric double layer capacitor 2071, a parallel monitor 2072, analog switches AS, AS1, AS1', capacitors C11, C21, Cr1, resistors R11, R21, R22, R23, Rr1, variable resistors Rrv, Rrv' and a bias power source +V.

Referring to FIGS. 13A and 13B, the constant current signal generation circuit 201 inputs a detection signal of the charge current I to the inverted input terminal− and the current reference value Vrefi to the non-inverted input terminal+ of the operational amplifier 2011 and connects a series circuit of the capacitor C11 and the resistor R11 between the inverted input terminal− and the output terminal to form an error amplifier circuit. Similarly, the current diminishing signal generation circuit 202 inputs a detection signal of the charge current I to the inverted input terminal− and the power reference value Vref(v−i) to the non-inverted input terminal+ of the operational amplifier 2021 and connects a series circuit of the capacitor C21 and the resistor R21 between the inverted input terminal− and the output terminal to form an error amplifier circuit.

As pointed out above, the current reference value Vref(v−i) shows a value that is inversely proportional to the increase of the charge voltage Vc of the capacitor storage type power source 207. More specifically, as shown in FIG. 13B, a subtraction circuit is formed by using an operation amplifier 2022 having an inverted input terminal− where a detection signal of the charge voltage Vc of the capacitor storage type power source 207 is input by way of a resistor 22 and a non-inverted input terminal+ where an offset value Voff-set is input and a resistor R23 connected between the inverted input terminal− and the output terminal. The current reference value Vref(V−i) of Voff-set+(Voff-set−Vc) R23/R22 (2Voff-set−Vc when R23=R22) is taken out from the subtraction circuit. If Voff-set is made equal to Vst of FIG. 12B, the reference value of the constant current signal generation circuit 201 and that of the current diminishing signal generation circuit 202 become equal to each other when the charge voltage Vc of the capacitor storage type power source 207 rises to Voff-set so that a control mode for diminishing the electric current is selected from this point.

The embodiments of FIGS. 13A and 13B automatically switch the signal from the constant current signal generation circuit 201 that controls the charge current so as to keep it to a constant level and the signal from the current diminishing signal generation circuit 202 that controls the charge current so as to decrease the charge current in reverse proportion to the increase of the charge voltage Vc of the capacitor storage type power source 207 by means of a logical OR circuit formed by diodes D11, D21. On the other hand, FIGS. 14A and 14B illustrate an embodiment adapted to switch the control mode in response to an operation of the parallel monitors connected to the respective electric double layer capacitors of the capacitor storage type power source 207.

In the embodiment of FIGS. 14A and 14B, an analog switch AS is connected in series between the output of the operational amplifier 2021 and the diode D21 of the logical OR circuit of the current diminishing signal generation circuit 202 and the analog switch AS is controlled by the output of logical processing circuit 2023. The logical processing circuit 2023 executes a logical process on the operation signal of the parallel monitors 2072 connected to the respective electric double layer capacitors 2071 of the capacitor storage type power source 207. For example, the logical processing circuit 2023 may execute a logical OR process so as to turn on the analog switch AS when one of the parallel monitors 2072 is turned on. The ratio of R23 and R22 may be changed in the subtraction circuit to change the gradient of the curve of the current reference value Vref(v−i) in FIG. 13B. With this arrangement, the constant current charge operation is continued until one of the parallel monitors 2072 is turned on and, once one of the parallel monitors 2072 is turned on, the charge current is reduced and the mode of operation is switched to a control mode V-I for diminishing the current as shown in FIG. 14B. When the point (offset value Voff-set) of Vst shown in FIG. 12B is made to have a relatively small value in addition to the above arrangement, the control mode is switched at the timing (a) in FIG. 14B if the charge voltage of the electric double layer capacitors 2071 of the capacitor storage type power source 207 shows large variances and the first parallel monitor starts a bypass operation although the charge voltage Vc of the capacitor storage type power source 207 is relatively low but the control mode is switched at a delayed timing, or at the timing (b) in FIG. 14B, if the charge voltage of the electric double layer capacitors 2071 of the capacitor storage type power source 207 shows only small variances and the first parallel monitor does not start a bypass operation until the charge voltage Vc of the capacitor storage type power source 207 becomes relatively high. The net result will be an improved charge efficiency. Alternatively, the logical processing circuit 2023 may be so arranged that it turns on the analog switch AS when the number of parallel monitors 2072 that are turned on gets to a predetermined number.

The above-described reference value setting circuits can be formed by using various known circuits. FIGS. 15A and 15B illustrate examples of reference value setting circuit. Referring to FIG. 15A, the stabilized bias power source +V is divided by a voltage divider circuit of the fixed resistor Rr1 and the variable resistor Rrv and the reference value Vref is taken out from the voltage dividing connection point and adjusted to produce the predetermined voltage by means of the variable resistor Rrv. Note that the capacitor Cr1 is connected in parallel with the variable resistor Rrv1 as an anti-noise measure. As shown in FIG. 15B, similar circuits may be connected in parallel by way of an analog switch AS1 so that the reference value can be switched by turning on/off the analog switch AS1. Still alternatively, a variable resistor Rrv' may be connected in parallel with the variable resistor Rrv by way of an analog switch AS1' to switch the reference value. When the circuit is arranged so as to switch the reference value by means of analog switches AS1, AS1', the value of the constant current charge can be switched stepwise under predetermined conditions if the circuit is employed for the current reference value setting circuit Vrefi. Then, the charge current of a constant current charge operation can be switched according to the operation of the parallel monitors 2072 by using the output signal of the above described logical processing circuit 2023 as a switching signal.

Figure 16A:
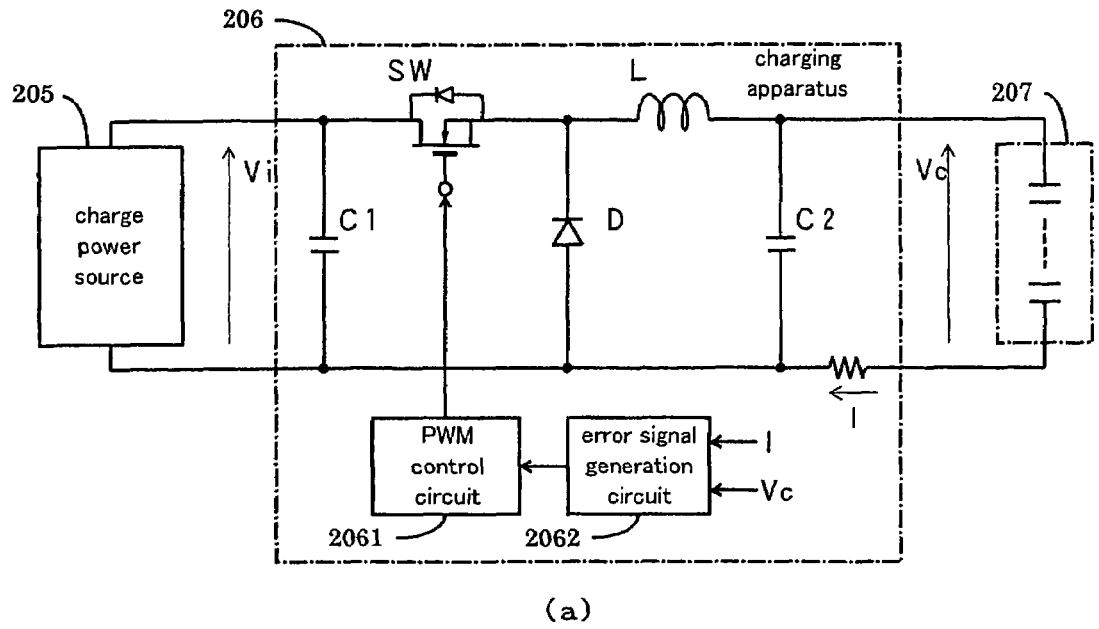
FIG. 16A is a circuit diagram of an embodiment of a charging apparatus including a PWM controlled switching converter.
Figure 16B:
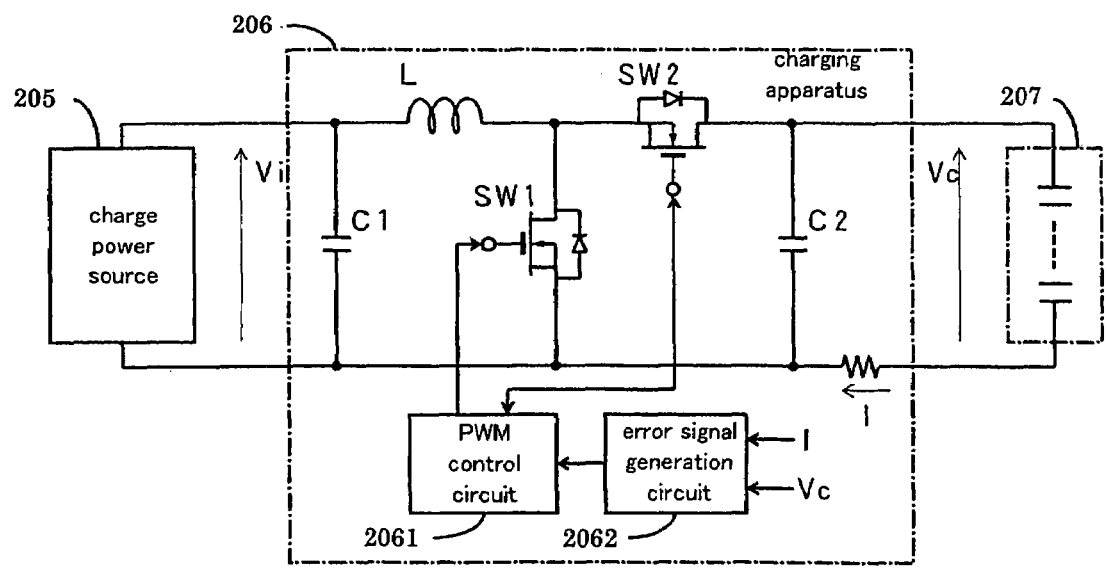
FIG. 16B is a circuit diagram of an embodiment of a charging apparatus including a PWM controlled switching converter.

FIG. 16A is a circuit diagram of an embodiment of a charging apparatus including a PWM controlled switching converter. FIG. 16B is a circuit diagram of another embodiment of a charging apparatus including a PWM controlled switching converter. FIGS. 16A and 16B show a control circuit 2061, an error signal generation circuit 2062, capacitors C1, C2, a diode D, a coil L, a current detecting resistor R, switching circuits SW1, SW2, a charge current I, a charge voltage Vc and a supply voltage Vi.

The charging apparatus illustrated in FIG. 16A comprises a voltage-lowering type switching converter that turns on/off the switching circuit SW by means of a PWM signal to supply a charge current that is formed by connecting a charge controlling switch circuit SW and a choke coil L in series between the charge power source 205 and the capacitor storage type power source 207 and connecting a diode D (synchronous rectifier circuit) to the series connection point in parallel and then connecting capacitors C1, C2 in parallel between the input side and the output side. Additionally, a current detecting resistor R is inserted and connected in series in order to detect the charge current. On the other hand, the charging apparatus illustrated in FIG. 16B comprises a voltage-boosting type switching converter that turns on/off the switching circuit SW1 by means of a PWM signal and turns on/off the switching circuit SW2 that operates as a synchronous rectifier circuit at phases inverse relative to the switching circuit SW1 to supply a charge current, the switching converter being formed by connecting a charge controlling choke coil L and a switching circuit SW2 in series between the charge power source 205 and the capacitor storage type power source 207 and connecting a switching circuit SW1 to the series connection point in parallel and then connecting capacitors C1, C2 in parallel between the input side and the output side. Additionally, a current detecting resistor R is inserted and connected in series in order to detect the charge current. The PWM control circuit 2061 supplies a PWM signal to the switching circuits SW, SW1, SW2 and the error signal generation circuit 2062 supplies an error amplifying signal according to the charge current I, the charge voltage Vc, the reference value and the offset value of the capacitor storage type power source 207 in a manner as described earlier.

The present invention is by no means limited to the above described embodiment, which may be modified in various different ways without departing from the spirit and scope of the present invention. For example, the above-described embodiment is adapted to operate in different control modes including a constant current mode CC, a current diminishing mode V-I and a constant voltage mode CV, which modes are selected under predetermined conditions, it may alternatively be so arranged that only a constant current mode CC and a current diminishing mode V-I are provided as control modes and the capacitor storage type power source is charged to a full charge condition in a current diminishing mode V-I or the charge operation may be terminated at the full charge voltage. Additionally, the constant current signal generation circuit and the current diminishing signal generation circuit are not limited to those illustrated in FIGS. 13A and 13B and each of them may be replaced by an appropriately designed alternative circuit that is equivalent to it. While the electric double layer capacitors of the capacitor storage type power source are equipped with respective parallel monitors in the above description, they may not necessarily be provided with parallel monitors.

Figure 17:
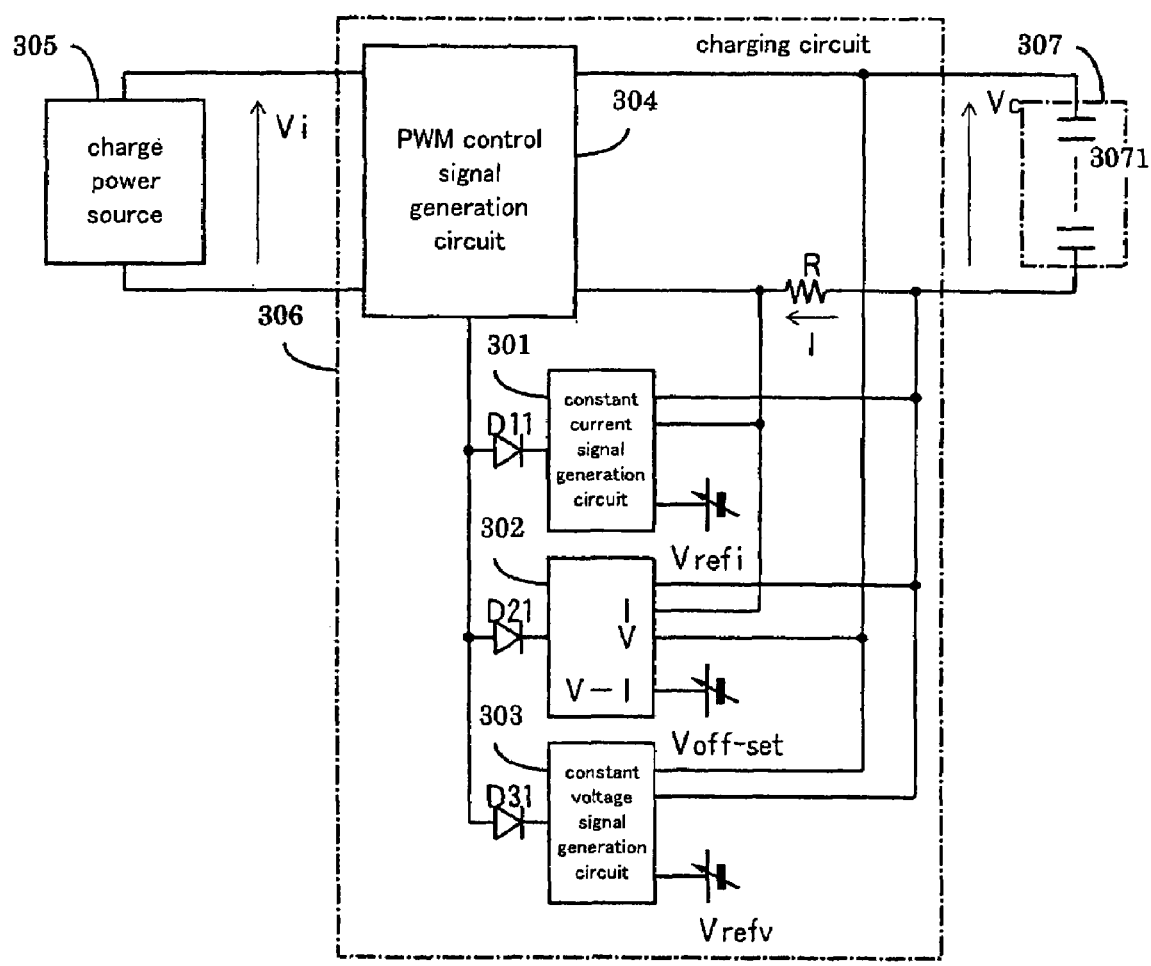
FIG. 17 is a circuit diagram of an embodiment of a charging apparatus for capacitor storage type power source according to the present invention.
Figure 18A:
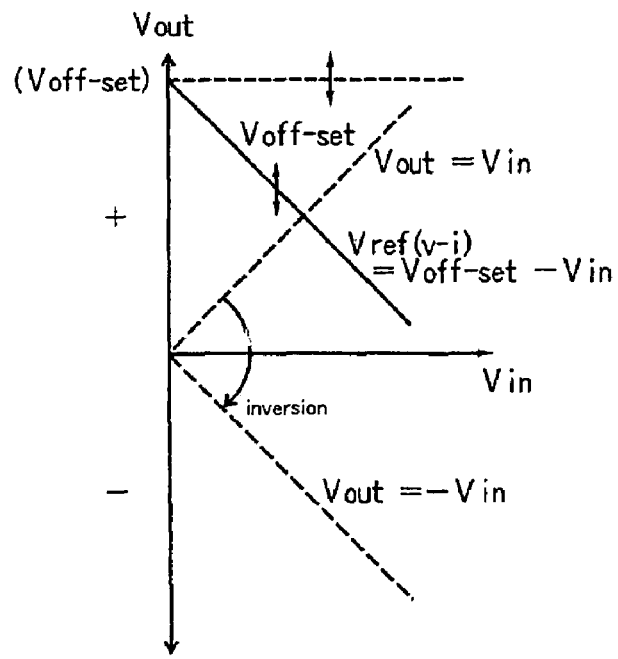
FIG. 18A is a graph illustrating a current diminishing charge (V-I control)
Figure 18B:
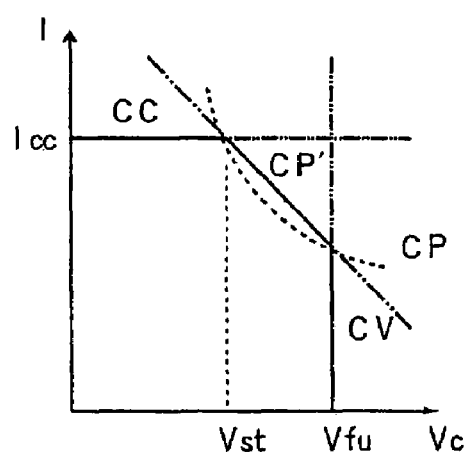
FIG. 18B is another graph illustrating a current diminishing charge (V-I control)

(A third aspect of the Invention) Now, another embodiment of the present invention will be described by referring to the related drawings. FIG. 17 is a circuit diagram of an embodiment of capacitor storage type power source according to the present invention. FIG. 18A is a graph illustrating a current diminishing charge (V-I control). FIG. 18B is another graph illustrating a current diminishing charge (V-I control). In these figures there are shown a constant current signal generation circuit 301, a current diminishing signal generation circuit 302, a constant voltage signal generation circuit 303, a PWM signal generation circuit 304, a charge power source 305, a charging apparatus 306, a capacitor storage type power source 307, diodes D11, D21, D31, a current detecting resistor R, a current reference value setting circuit Vrefi, a voltage reference value setting circuit Vrefv, an offset value setting circuit Voff-set, a charge current I and a charge voltage Vc.

The charging apparatus for a capacitor storage type power source of this embodiment of FIG. 17 is adapted to electrically charge a capacitor storage type power source 307 formed by connecting a plurality of electric double layer capacitors in series from a charge power source 305 by way of the charging apparatus 306 and store electric energy in them. The plurality of electric double layer capacitors of the capacitor storage type power source 307 are provided with respective parallel monitors that are connected in parallel to bypass the charge current when the charge voltage is raised and gets to a predetermined reference voltage. Therefore, as the parallel monitors are provided, if the electric double layer capacitors of the capacitor storage type power source equipped with respective parallel monitors are charged unevenly to respective charge voltages that are different from each other in a charge operation, the parallel monitors of the electric double layer capacitors that are charged beyond the predetermined reference voltage bypass the charge current to make the charge voltage agree with the predetermined reference voltage to limit the charge voltage to the reference voltage. Thus, once the full charge voltage of the electric double layer capacitors is defined to be equal to the reference voltage, all the electric double layer capacitors are uniformly charged to the full charge voltage.

As the parallel monitor of an electric double layer capacitor charged to the predetermined reference voltage bypasses the charge current, the parallel monitor consumes the power equal to the product of multiplication of the predetermined reference voltage and the charge current, or the voltage and the current at the start of the bypassing, as heat. Thus, the power loss, or the thermal loss, is large when both the duration of the operation of each parallel monitor and/or the number of operating parallel monitors is large for the capacitor storage type power source 307. As a result, both the capacity and the dimensions of the parallel monitors are required to be raised in order to improve the heat radiation efficiency. Then, both power and space have to be wasted to make it difficult to downsize the capacitor storage type power source 307. In view of this problem, the charging apparatus 306 of this embodiment is adapted to judge the initial stages of the bypassing operation of a parallel monitor by referring to the charge voltage of the capacitor storage type power source 307 and diminish the charge current in inverse proportion to the increase of the charge voltage. With this arrangement, it is possible to reduce the capacity and the dimensions of the parallel monitors.

The charging apparatus 306 detects the charge current I and compares it with the predetermined current reference value Vrefi set by the current reference value setting circuit. Then, when the charge current I gets to a constant level (constant current charge) and the capacitor storage type power source 307 is charged to a predetermined voltage level, the charging apparatus 306 performs a PWM (pulse width modulation) control operation of diminishing the charge current (current diminishing control: V-I control) in inverse proportion to the increase of the charge voltage. For a specific circuit configuration, the charging apparatus 306 is equipped with a PWM control circuit 304, a constant current signal generation circuit 301, a current diminishing signal generation circuit 302, a constant voltage signal generation circuit 303 and a logical OR circuit formed by diodes D11, D21, D31 for selectively inputting the error amplifying signals from these signal generation circuit to the PWM control circuit 304.

The constant current signal generation circuit 301 is formed by an error amplifying circuit that takes out the voltage fall between the terminals of the current detecting resistor R inserted and connected in series to the charging apparatus as detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 301 is large when the charge current I that is input as an object of control is smaller than the current reference value Vrefi but small when the charge current I is larger than the current reference value Vrefi. As the error amplifying signal is input to the PWM control circuit 304, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi so that consequently a constant current charge operation is conducted in a control mode CC where the charge current I is controlled so as to be held to a constant level according to the current reference value Vrefi.

As shown in FIG. 18A, the current diminishing signal generation circuit 302 generates a current reference value Vref(v-i) that diminishes the charge current I in inverse proportion to the increase of the charge voltage Vc of the capacitor storage type power source 307 for the constant current signal generation circuit 301, compares the current reference value Vref(v-i) with the charge current I that is the object of control and outputs a corresponding error amplifying signal. The current reference value Vref(v-i) is generated by inverting the charge voltage Vc of the capacitor storage type power source 307 (Vout=−Vin) and turning it into a positive value by means of an offset value Voff-set (=Voff-set−Vin), as shown in FIG. 18A. Therefore, the PWM control circuit 304 operates in a control mode CP' for diminishing the charge current (V-I), where as the PWM control circuit 304 receives the error amplifying signal as input, it increases the charge current I if the charge voltage Vc of the capacitor storage type power source 307 is small but then as the charge voltage Vc of the capacitor storage type power source 307 increases, the PWM control circuit 304 so controls the charge current that the charge current I becomes small in inverse proportion to the increase of the charge voltage Vc.

The constant voltage signal generation circuit 303 is formed by an error amplifying circuit that detects the charge voltage Vc of the capacitor storage type power source 307, inputs it as an object of control, compares it with the voltage reference value Vrefv set in advance by the voltage reference value setting circuit and outputs an error amplifying signal thereof. Thus, the output value of the error amplifying signal output from the constant voltage signal generation circuit 303 is large when the charge voltage Vc that is input as an object of control is smaller than the voltage reference value Vrefv but small when the charge voltage Vc is larger than the voltage reference value Vrefv. As the error amplifying signal is input to the PWM control circuit 304, a constant voltage charge operation is conducted in a control mode CV where the charge current I is controlled so as to be increased when the charge voltage Vc is smaller than the voltage reference value Vrefv but decreased when the charge voltage Vc is larger than voltage reference value Vrefv.

The diodes D11, D21, D31 are connected to the input of the PWM control circuit 304 respectively from the constant current signal generation circuit 301, the current diminishing signal generation circuit 302 and the constant voltage signal generation circuit 303 with the opposite polarities to form a logical OR circuit that inputs the smallest error amplifying signal to the PWM control circuit 304 out of the error amplifying signals output from the constant current signal generation circuit 301, the current diminishing signal generation circuit 302 and the constant voltage signal generation circuit 303. Now, the charge mode switching control (CC→Cp'→CV) of the logical OR circuit will be described by referring to FIG. 18B.

Firstly, in the initial stages of the charge operation after the start, the diode D11 is turned on while the diodes D21, D31 are held off and a constant current charge operation is conducted in a control mode CC. In other words, when the charge voltage Vc of the capacitor storage type power source 307 is low and hence the PWM control circuit 304 is performing a constant current charge operation in a control mode CC according to the error amplifying signal output from the constant current signal generation circuit 301, the object of control of the current diminishing signal generation circuit 302 and that of the constant voltage signal generation circuit 303 are smaller than the respective reference values to be compared. Therefore, if error amplifying signals having a large value are output from them, neither the charge current I nor the charge voltage Vc of the capacitor storage type power source 307 increases and the error amplifying signals are held close to the respective upper limit values so that the diodes D21, D31 are biased in the opposite directions and held off.

However, as the constant current charge operation is continued, the charge voltage Vc of the capacitor storage type power source 307 increases while the current reference value Vref(v–i) of the constant power signal generation circuit 302 gradually decreases until it becomes smaller than the current reference value Vrefi of the constant current signal generation circuit 301. Then, the error amplifying signal output from the current diminishing signal generation circuit 302 becomes smaller than the error amplifying signal output from the constant current signal generation circuit 301. At this moment, the diode D11 that is connected to the output of the constant current signal generation circuit 301 is turned off and the diode D21 connected to the output of the current diminishing signal generation circuit 302 is turned on so that a current diminishing operation (V-I) is conducted in a control mode CP' where the charge current I is controlled in such a way that the charge voltage Vc of the capacitor storage type power source 307 increases and the charge current I decreases in inverse proportion to the increase of the charge voltage Vc. In FIG. 18B, the switch point is indicated by the point where the charge voltage Vc of the capacitor storage type power source 307 becomes equal to Vst.

As the charge voltage Vc of the capacitor storage type power source 307 increases further and becomes larger than the voltage reference value Vrefv of the constant voltage signal generation circuit 303, the error amplifying signal output from the constant voltage signal generation circuit 303 becomes smaller than the error amplifying signal output from the current diminishing signal generation circuit 302 so that the diode D21 connected to the output of the current diminishing signal generation circuit 302 is turned off and the diode D31 connected to the output of the constant voltage signal generation circuit 303 is turned on so that a constant voltage charge operation is conducted in a control mode CV where the charge current is so controlled as to make the charge voltage Vc smaller than the voltage reference value Vrefv. In FIG. 18B, the switch point is indicated by the point where the charge voltage Vc of the capacitor storage type power source 307 becomes equal to Vfu.

Figure 19A:
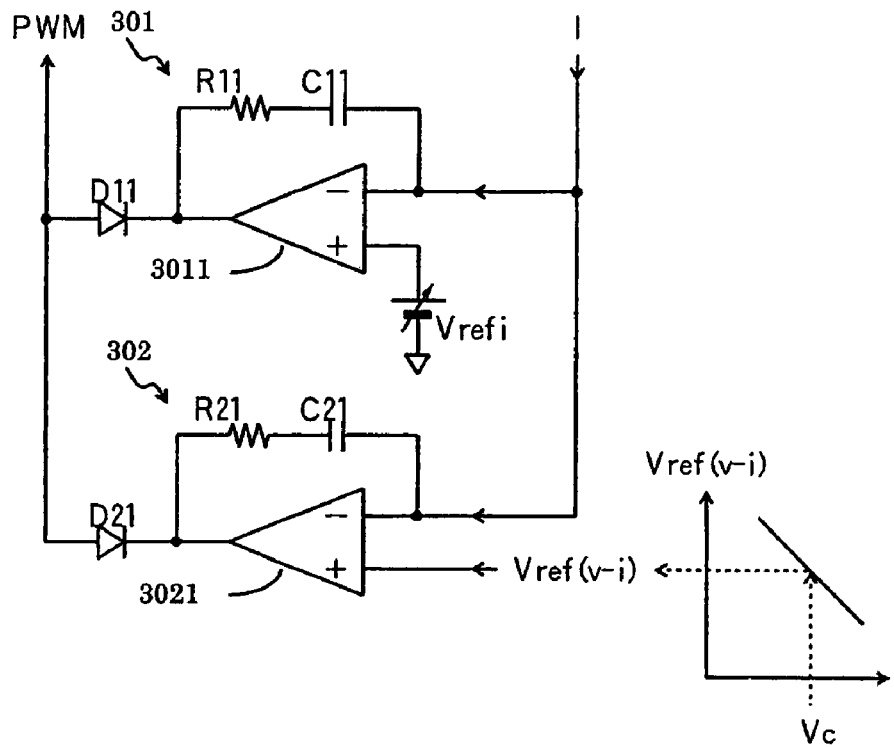
FIG. 19A is a circuit diagram of an embodiment of a constant current signal generation circuit and a current diminishing signal generation circuit.
Figure 19B:
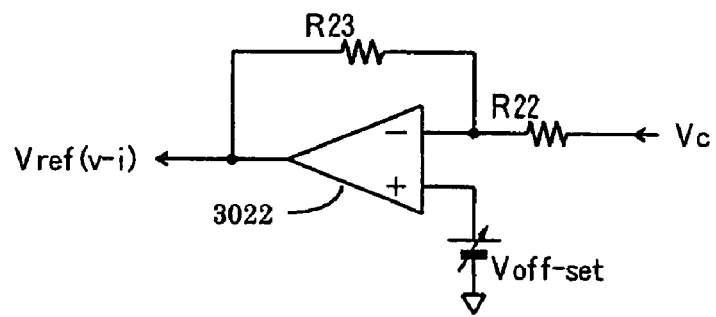
FIG. 19B is a circuit diagram of an embodiment of a constant current signal generation circuit and a current diminishing signal generation circuit.
Figure 20A:
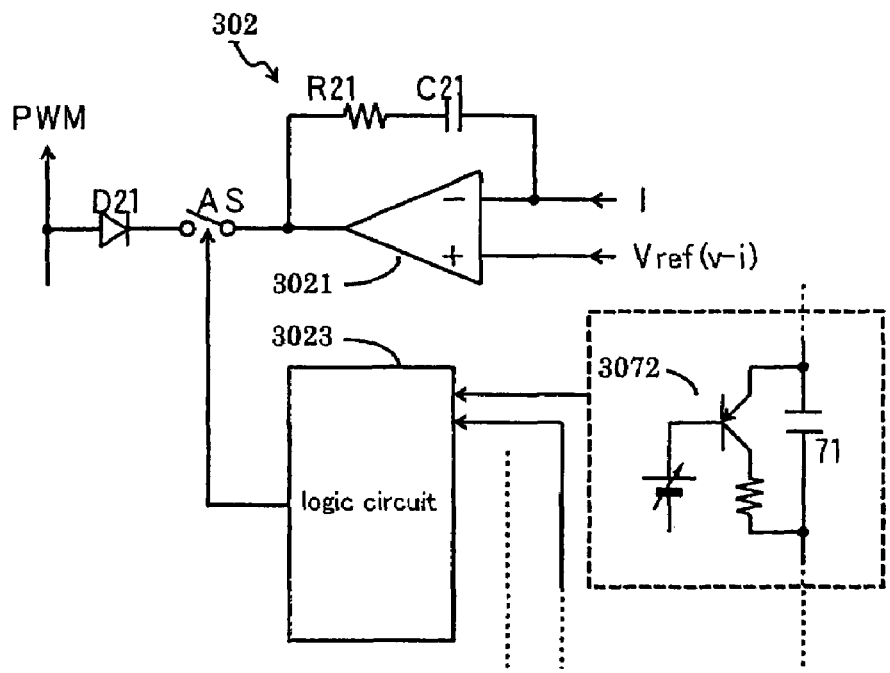
FIG. 20A is a circuit diagram of another embodiment of a current diminishing signal generation circuit.
Figure 20B:
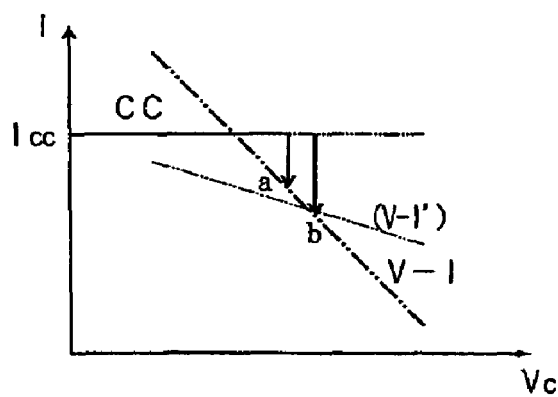
FIG. 20B is a graph of another embodiment of a current diminishing signal generation circuit.
Figure 21A:
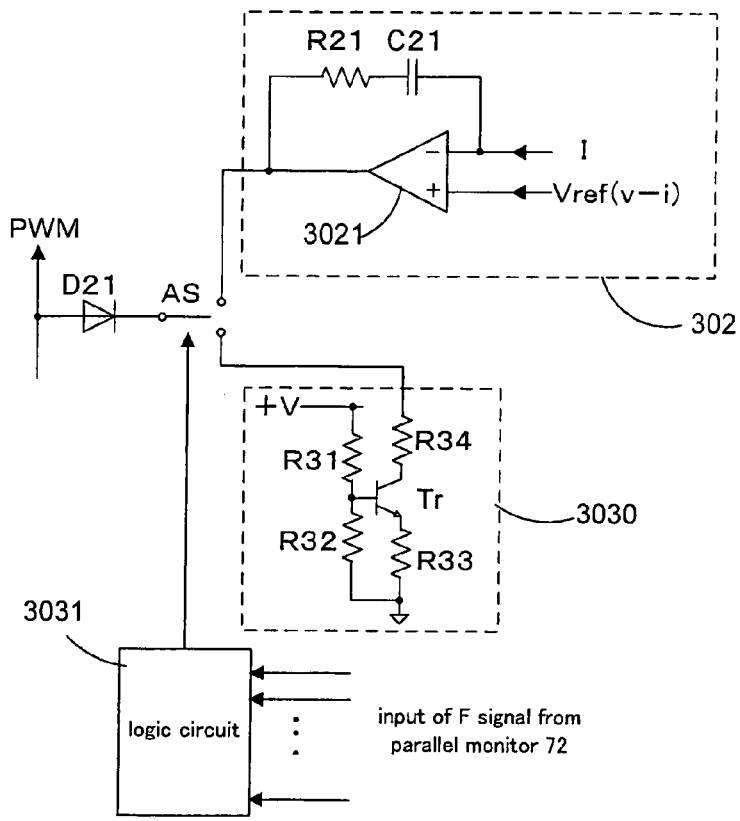
FIG. 21A is a circuit diagram of an embodiment of a current diminishing signal generation circuit equipped with a current limiting circuit.
Figure 21B:
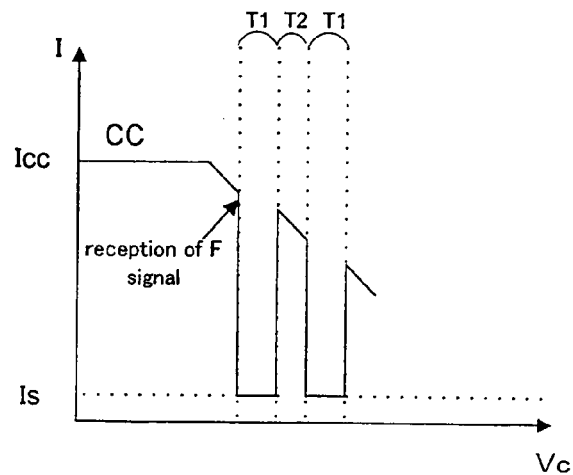
FIG. 21B is a circuit diagram of an embodiment of a current diminishing signal generation circuit equipped with a current limiting circuit.

Now, specific configurations of the signal generation circuits will be described below. FIG. 19A is a circuit diagram of an embodiment of constant current signal generation circuit and current diminishing signal generation circuit. FIG. 19B is a circuit diagram of an embodiment of constant current signal generation circuit and current diminishing signal generation circuit. FIG. 20A is a circuit diagram of another embodiment of current diminishing signal generation circuit. FIG. 20B is a graph illustrating the operation of the embodiment of current diminishing signal generation circuit of FIG. 20A. FIG. 21A is a circuit diagram of an embodiment of reference value setting circuit. FIG. 21B is a circuit diagram of another embodiment of reference value setting circuit. In these figures, there are shown operational amplifiers 3011, 3021, 3022, a logic processing circuit 3023, an electric double layer capacitor 3071, a parallel monitor 3072, analog switches AS, AS1, AS1', capacitors C11, C21, Cr1, resistors R11, R21, R22, R23, Rr1, variable resistors Rrv, Rrv' and a bias power source +V.

Referring to FIGS. 19A and 19B, the constant current signal generation circuit 301 inputs a detection signal of the charge current I to the inverted input terminal– and the current reference value Vrefi to the non-inverted input terminal+ of the operational amplifier 3011 and connects a series circuit of the capacitor C11 and the resistor R11 between the inverted input terminal– and the output terminal to form an error amplifier circuit. Similarly, the current diminishing signal generation circuit 302 inputs a detection signal of the charge current I to the inverted input terminal– and the current reference value Vref(v–i) to the non-inverted input terminal+ of the operational amplifier 3021 and connects a series circuit of the capacitor C21 and the resistor R21 between the inverted input terminal– and the output terminal to form an error amplifier circuit.

As pointed out above, the current reference value Vref(v–i) shows a value that is inversely proportional to the increase of the charge voltage Vc of the capacitor storage type power source 307. More specifically, as shown in FIG. 19B, a subtraction circuit is formed by using an operational amplifier 3022 having an inverted input terminal– where a detection signal of the charge voltage Vc of the capacitor storage type power source 307 is input by way of a resistor R22 and an non-inverted input terminal+ where an offset value Voff-set is input and a resistor R23 connected between the inverted input terminal– and the output terminal. The current reference value Vref(V–i) of Voff-set+(Voff-set–Vc) R23/R22 (2Voff-set–Vc when R23=R22) is taken out from the subtraction circuit. If Voff-set is made equal to Vst of FIG. 18B, the reference value of the constant current signal generation circuit 301 and that of the current diminishing signal generation circuit 302 become equal to each other when the charge voltage Vc of the capacitor storage type power source 307 rises to Voff-set so that a control mode for diminishing the electric current is selected from this point.

The embodiments of FIGS. 19A and 19B automatically switch the signal from the constant current signal generation circuit 301 that controls the charge current so as to keep it to a constant level and the signal from the current diminishing signal generation circuit 302 that controls the charge current so as to decrease the charge current in reverse proportion to the increase of the charge voltage Vc of the capacitor storage type power source 307 by means of a logical OR circuit formed by diodes D11, D21. On the other hand, FIGS. 20A and 20B illustrate an embodiment adapted to switch the control mode in response to an operation of the parallel monitors connected to the respective electric double layer capacitors of the capacitor storage type power source 307.

In the embodiment of FIGS. 20A and 20B, an analog switch AS is connected in series between the output of the operational amplifier 3021 and the diode D21 of the logical OR circuit of the current diminishing signal generation circuit 302 and the analog switch AS is controlled by the output of logical processing circuit 3023. The logical processing circuit 3023 executes a logical process on the full charge signal F of the parallel monitors 72 connected to the respective electric double layer capacitors 3071 of the capacitor storage type power source 307. For example, the logical processing circuit 3023 may execute a logical OR process so as to turn on the analog switch AS when one of the parallel monitors 3072 is turned on. The parallel monitors 3072 are connected to the respective capacitors in parallel and, as any of them detects a full charge condition of the corresponding capacitor, it suppresses the rise of the voltage and initializes by bypassing the charge current and sends out a full charge signal F on the basis of the full charge voltage. As a result of executing a logical OR process on the full charge signal F, the constant current charge operation is continued until one of the parallel monitors 72 is turned on but, when one of the parallel monitors 3072 is turned on, the charge current is reduced and the control mode is switched to that of diminishing the current (V-I) as shown in FIG. 20B. When the point (offset value Voff-set) of Vst shown in FIG. 18B is made to have a relatively small value in addition to the above arrangement, the control mode is switched at the timing (a) in FIG. 20B if the charge voltage of the electric double layer capacitors 3071 of the capacitor storage type power source 307 shows large variances and the first parallel monitor starts a bypass operation although the charge voltage Vc of the capacitor storage type power source 307 is relatively low but the control mode is switched at a delayed timing, or at the timing (b) in FIG. 20B, if the charge voltage of the electric double layer capacitors 3071 of the capacitor storage type power source 307 shows only small variances and the first parallel monitor does not start a bypass operation until the charge voltage Vc of the capacitor storage type power source 307 becomes relatively high. The net result will be an improved charge efficiency. Alternatively, the logical processing circuit 3023 may be so arranged that it turns on the analog switch AS when the number of parallel monitors 3072 that are turned on gets to a predetermined number.

An embodiment for controlling the charge current so as to make it drop to the withstand current value of a parallel monitor 3072 when a full charge signal F is output from the parallel monitor will be described below. FIG. 21A is a circuit diagram of an embodiment of current diminishing signal generation circuit equipped with a current limiting circuit. FIG. 21B is a circuit diagram of another embodiment of current diminishing signal generation circuit equipped with a current limiting circuit. In the embodiment of FIG. 21A, the output of the operational amplifier 3021 of the above described current diminishing signal generation circuit 302 or the output of the constant current circuit 3030 formed by resistors R31, R32, R33, R34 and a transistor Tr is selectively connected to the diode D21 by means of an analog switch AS that is controlled by the signal from the logic circuit 3031. The values of the resistors R31, R32, R32, R33, R34 and the transistor Tr of the constant current circuit 3030 are so selected that they are minimized when the diodes D1, D21, D31 are logically ORed. Additionally, the PWM control circuit 304 is so designed as to generate Is that is the withstand current value of the parallel monitors 72 in response to the input from the diode D21 with the polarity of the inverse direction at this time. When the logic circuit 3031 receives a full charge signal F from one of the parallel monitors 3072 connected to the respective capacitors, it repeats an operation of turning the analog switch AS to the side of the constant current circuit 3030 for time T1 and then to the side of the current diminishing signal generation circuit 302 for time T2. With this arrangement, the charge voltage Vc and the charge current I show a relationship as shown in FIG. 21B. Referring to FIG. 21B, as the logic circuit 3031 receives a full charge signal F, a current Is flows for time T1 and then the charge current I that is controlled by the current diminishing signal generation circuit 302 flows for time T2 and is followed by a current Is that flows for time T1. Thereafter, this sequence is repeated. Thus, with this embodiment showing the above described profile of the charge current, it is possible to avoid a situation where a capacitor that apparently gets to the full charge voltage due to its internal resistance component is subsequently charged with the withstand current Is of the parallel monitor 3072 that is far smaller than the ordinary charge current so that the capacitor can be electrically charged very efficiently.

Figure 22A:
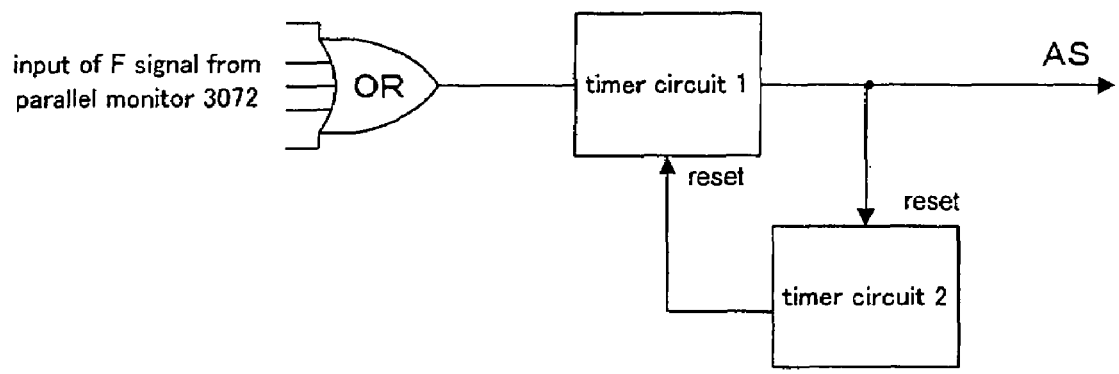
FIG. 22A is a circuit diagram of an embodiment of logic circuit 31 of a current diminishing signal generation circuit equipped with a current limiting circuit.
Figure 22B:
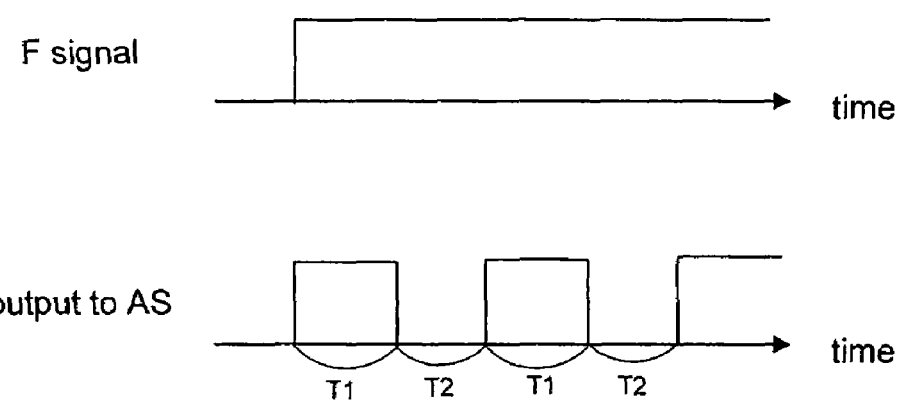
FIG. 22B is a graph illustrating the operation of the embodiment of logic circuit 31 of FIG. 22A.

FIG. 22A is a circuit diagram of an embodiment of logic circuit 3031 of a current diminishing signal generation circuit equipped with a current limiting circuit. FIG. 22B is a graph illustrating the operation of the embodiment of logic circuit 31 of FIG. 22A. Referring to FIGS. 22A and 22B, the logic circuit 3031 executes a logical OR process on the full charge signal F from a parallel monitor 3072 and drives the timer circuit 301 by the output of the logical OR circuit. Then, the timer circuit 301 outputs a High signal to the analog switch AS for time T1 and resets the timer circuit 302. The timer circuit 302 is arranged to reset the timer circuit 301 when the time of T1+T2 elapses. Thus, the timer circuit 301 outputs a High signal to the analog switch AS again for time T1 and resets the timer circuit 302. The analog switch AS turns the switch to the side of the constant current circuit 3030 when it receives a High signal, whereas it turns the switch to the side of the current diminishing signal generation circuit 302 when it receives a Low signal. Thus, when the logic circuit 3031 receives a full charge signal F from the parallel monitor 3072, it repeats a sequence of outputting a High signal for time T1 and subsequently a Low signal for time T2 to the analog switch AS, as shown in FIG. 22B.

Figure 23A:
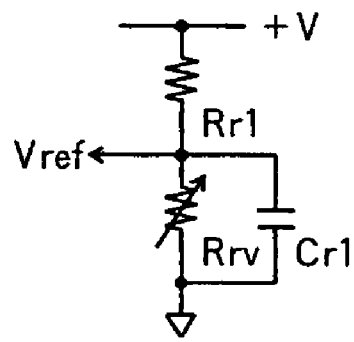
FIG. 23A is a circuit diagram of an embodiment of a reference value setting circuit.
Figure 23B:
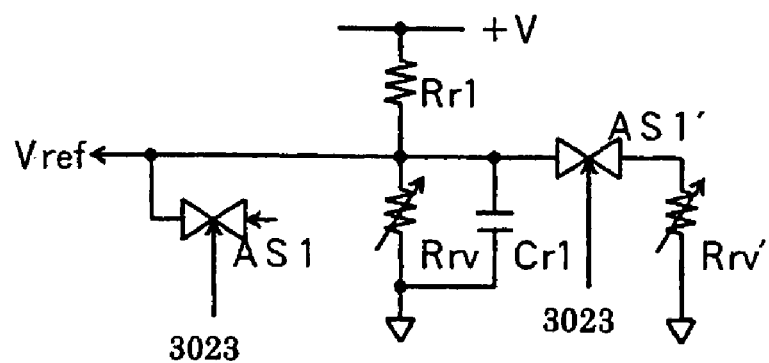
FIG. 23B is a circuit diagram of an embodiment of a reference value setting circuit.

The above-described reference value setting circuits can be formed by using various known circuits. FIGS. 23A and 23B illustrate examples of reference value setting circuit. Referring to FIG. 23A, the stabilized bias power source +V is divided by a voltage divider circuit of the fixed resistor Rr1 and the variable resistor Rrv and the reference value Vref is taken out from the voltage dividing connection point and adjusted to produce the predetermined voltage by means of the variable resistor Rrv. Note that the capacitor Cr1 is connected in parallel with the variable resistor Rrv as an antinoise measure. As shown in FIG. 23B, similar circuits may be connected in parallel by way of an analog switch AS1 so that the reference value can be switched by turning on/off the analog switch AS1. Still alternatively, a variable resistor Rrv' may be connected in parallel with the variable resistor Rrv by way of an analog switch AS1' to switch the reference value. When the circuit is arranged so as to switch the reference value by means of analog switches AS1, AS1', the value of the constant current charge can be switched stepwise under predetermined conditions if, for example, the circuit is employed for the current reference value setting circuit Vrefi. Then, the charge current of a constant current charge operation can be switched according to the operation of the parallel monitors 3072 by using the output signal of the above described logical processing circuit 23 as switching signal.

Figure 24A:
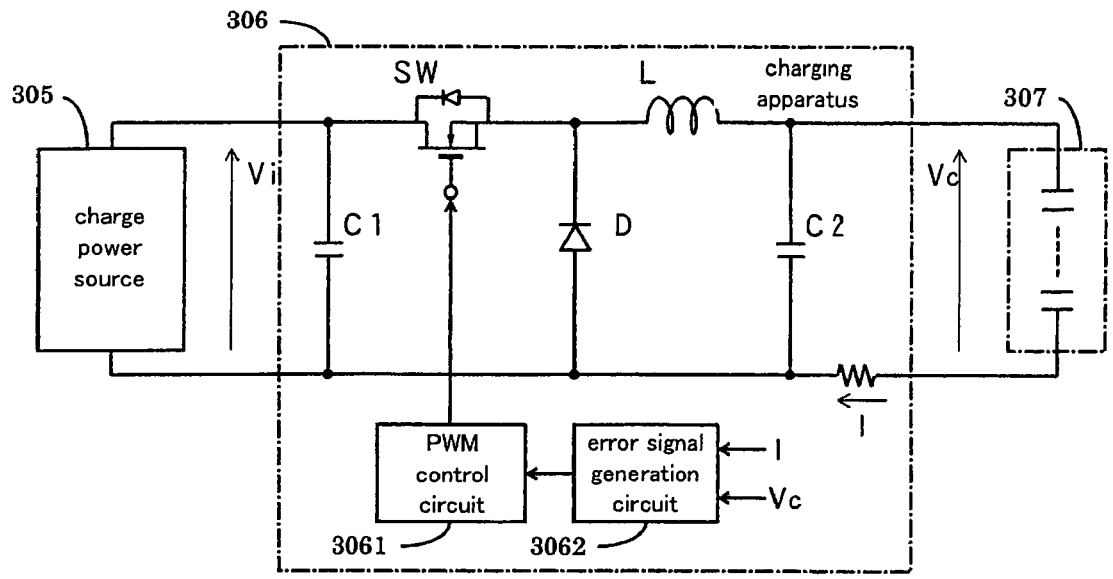
FIG. 24A is a circuit diagram of an embodiment of a charging apparatus equipped with a PWM controlled switching converter.
Figure 24B:
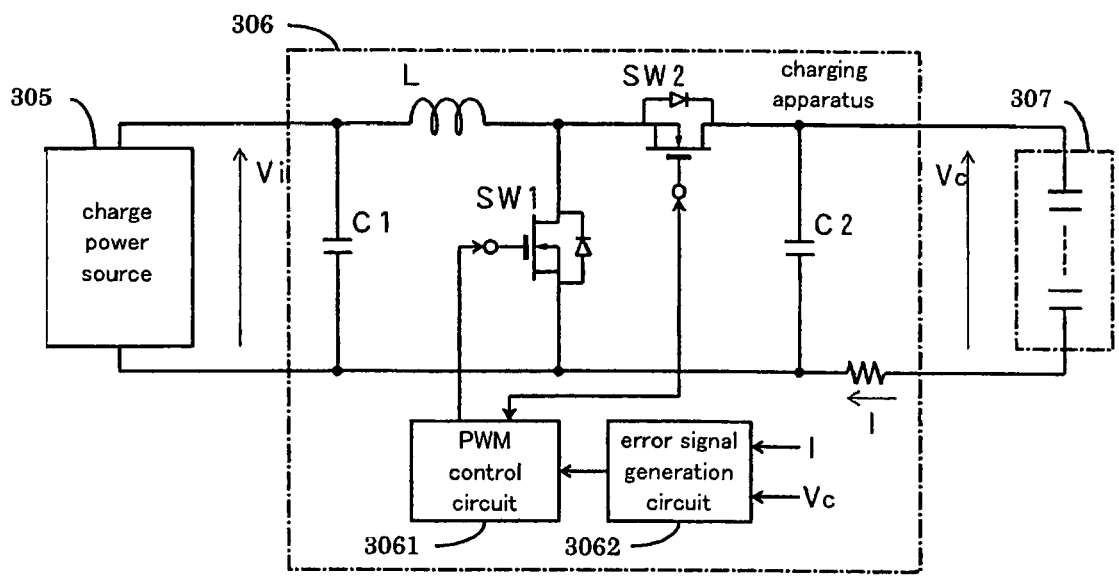
FIG. 24B is a circuit diagram of an embodiment of a charging apparatus equipped with a PWM controlled switching converter.
Figure 25:
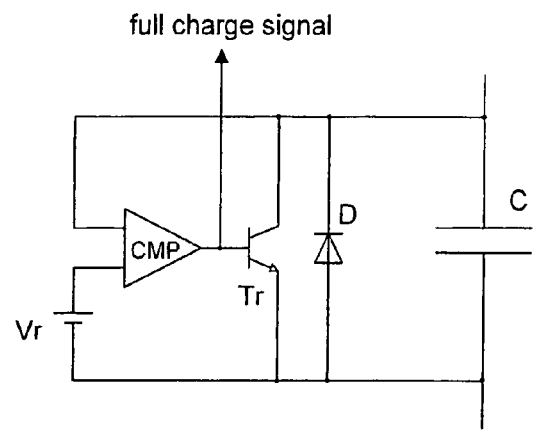
FIG. 25 is a circuit diagram of a parallel monitor.
Figure 26:
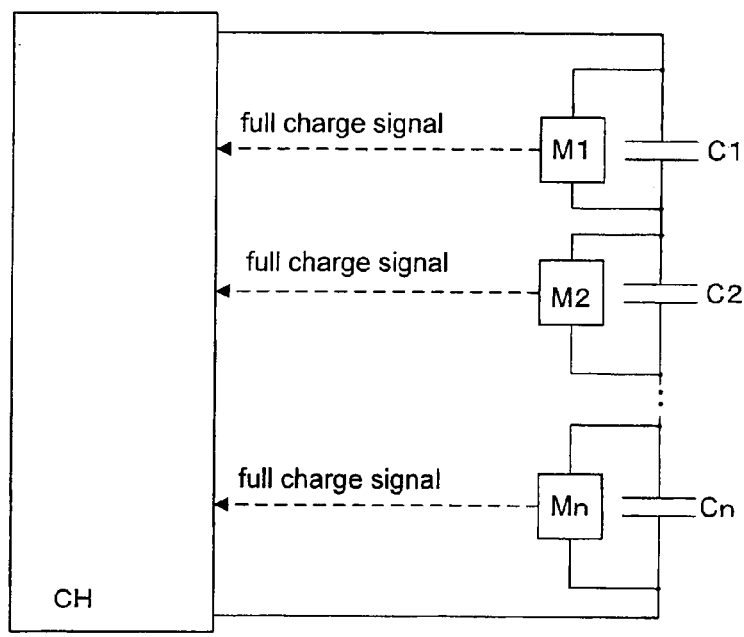
FIG. 26 is a circuit diagram of a charging apparatus of a plurality of electric double layer capacitors equipped with parallel monitors.
Figure 27:
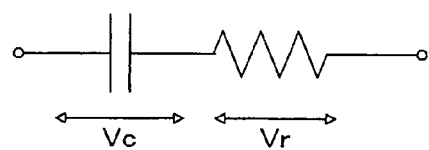
FIG. 27 is a circuit diagram of an equivalent circuit of an electric double layer capacitor including the internal resistance component.

FIG. 24A is a circuit diagram of an embodiment of a charging apparatus including a PWM controlled switching converter. FIG. 24B is a circuit diagram of another embodiment of a charging apparatus including a PWM controlled switching converter. FIGS. 24A and 24B show a control circuit 3061, an error signal generation circuit 3062, capacitors C1, C2, a diode D, a coil L, a current detecting resistor R, switching elements SW1, SW2, a charge current I, a charge voltage Vc and a supply voltage Vi.

The charging apparatus illustrated in FIG. 24A comprises a voltage-lowering type switching converter that turns on/off the switching element SW by means of a PWM signal to supply a charge current, the switching converter being formed by connecting a charge controlling switch element SW and a choke coil L in series between the charge power source 305 and the capacitor storage type power source 307 and connecting a diode D to the series connection point in parallel at phases inverse relative to each other and then connecting capacitors C1, C2 in parallel between the input side and the output side. Additionally, a current detecting resistor R is inserted and connected in series in order to detect the charge current. On the other hand, the charging apparatus illustrated in FIG. 24B comprises a voltage-boosting type switching converter that turns on/off the switching element SW1 by means of a PWM signal and turns on/off the switching element SW2 at phases inverse relative to the switching element SW1 to supply a charge current, the switching converter being formed by connecting a charge controlling choke coil L and a switching element SW2 in series between the charge power source 305 and the capacitor storage type power source 307 and connecting a switching element SW1 to the series connection point in parallel and then connecting capacitors C1, C2 in parallel between the input side and the output side. Additionally, a current detecting resistor R is inserted and connected in series in order to detect the charge current. The PWM control circuit 3061 supplies a PWM signal to the switching elements SW, SW1, SW2 and the error signal generation circuit 3062 supplies an error amplifying signal according to the charge current I of the charge voltage Vc, the reference value and the offset value of the capacitor storage type power source 307 in a manner as described earlier.

The present invention is by no means limited to the above-described embodiment, which may be modified in various different ways without departing from the spirit and scope of the present invention. For example, the above described embodiment is adapted to operate in different control modes including a constant current mode CC, a current diminishing mode CP' and a constant voltage mode CV, which modes are selected under predetermined conditions, it may alternatively be so arranged that only a constant current mode CC and a current diminishing mode CP' are provided as control modes and the capacitor storage type power source is charged to a full charge condition in a current diminishing mode CP' or the charge operation may be terminated at the full charge voltage. Additionally, the constant current signal generation circuit and the current diminishing signal generation circuit are not limited to those illustrated in FIGS. 19A and 19B and each of them may be replaced by an appropriately designed alternative circuit that is equivalent to it.

Figure 28:
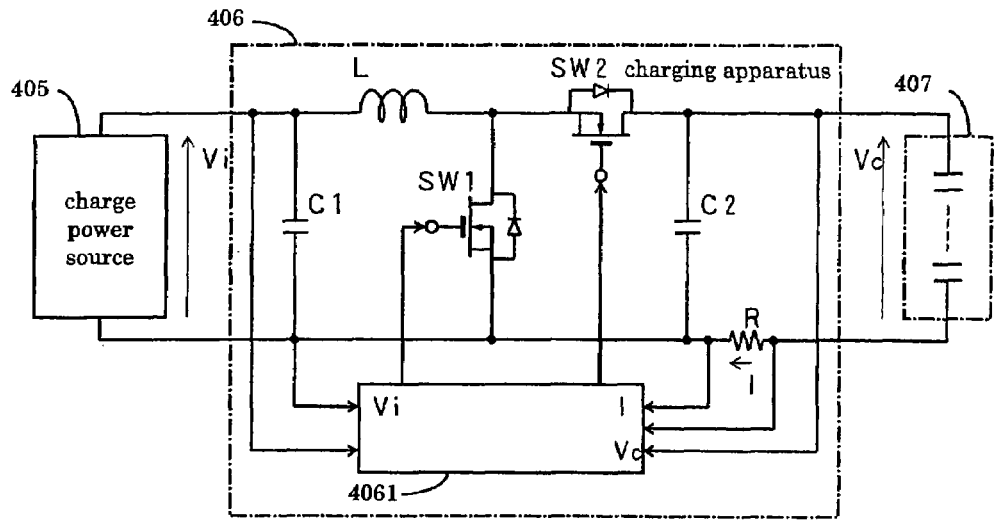
FIG. 28 is a circuit diagram of an embodiment of a charging apparatus for a capacitor storage type power source according to the present invention.
Figure 29:
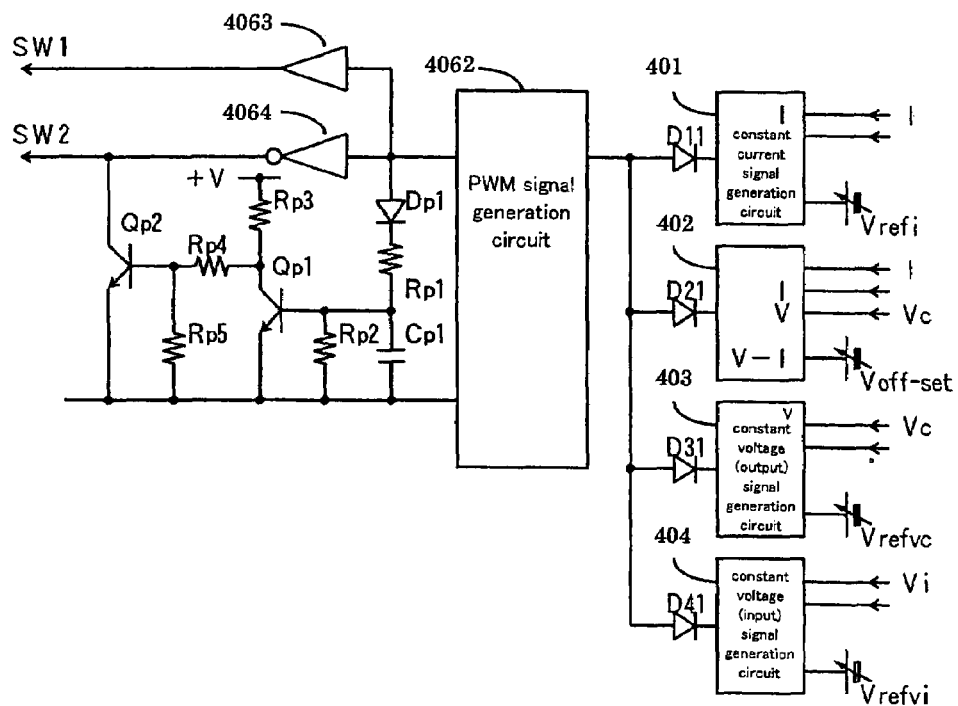
FIG. 29 is a circuit diagram of the signal processing circuit of an embodiment of a charging apparatus for a capacitor storage type power source according to the present invention.
Figure 30A:
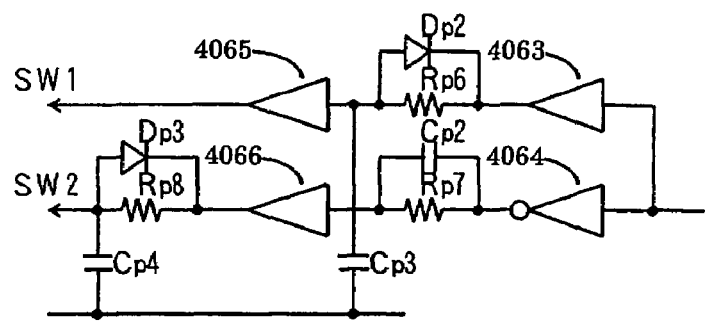
FIG. 30A is a circuit diagram of an embodiment of an on/off control signal output circuit.
Figure 30B:
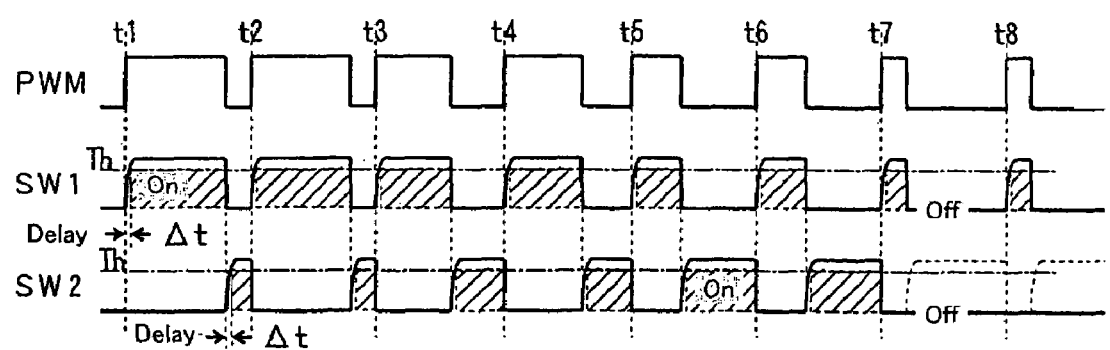
FIG. 30B is a graph illustrating the operation of an embodiment of an on/off control signal output circuit.
Figure 31A:
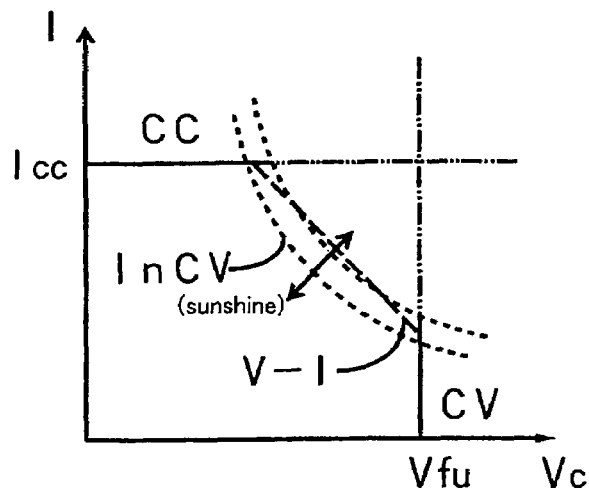
FIG. 31A is a graph illustrating control modes and the characteristics of a solar cell.
Figure 31B:
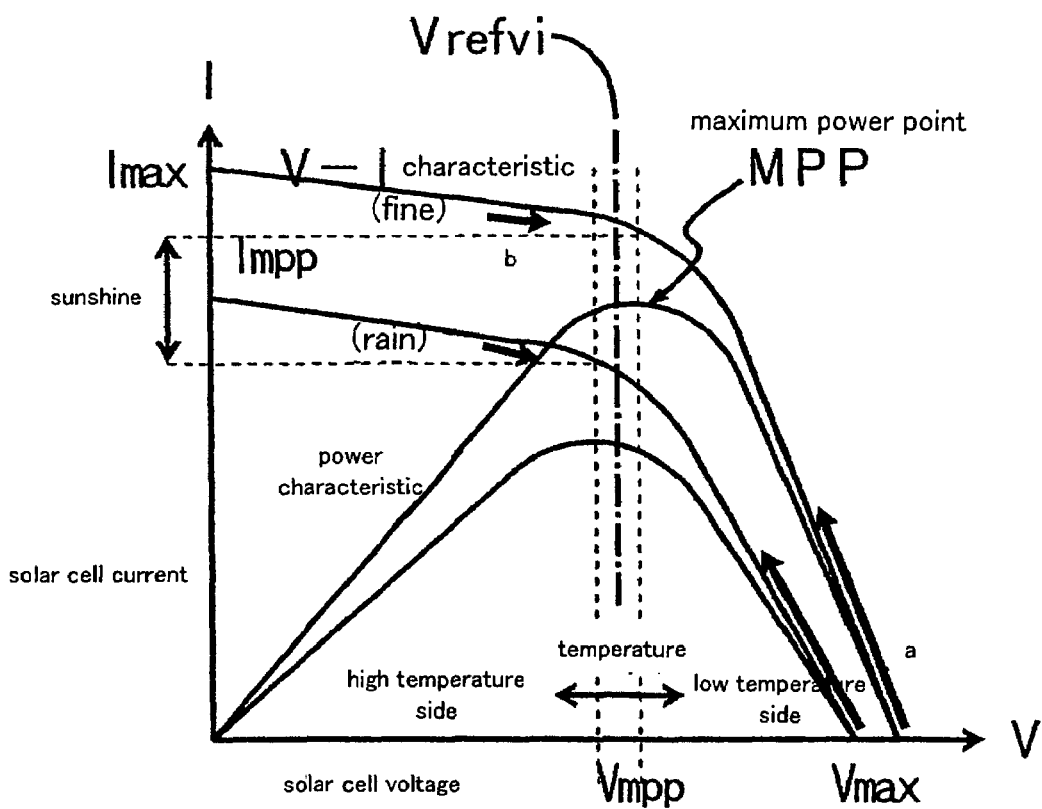
FIG. 31B is a graph illustrating control modes and the characteristics of a solar cell.

(A fourth aspect of the invention) Now, another embodiment of the present invention will be described by referring to the related drawings. FIG. 28 is a circuit diagram of the main circuit of an embodiment of a charging apparatus for a capacitor storage type power source according to the present invention. FIG. 29 is a circuit diagram of the signal processing circuit of an embodiment of a charging circuit for a capacitor storage type power source according to the present invention. FIG. 30A is a circuit diagram of an embodiment of on/off control signal output circuit. FIG. 30B is a graph illustrating the operation of an embodiment of an on/off control signal output circuit, FIG. 31A is a graph illustrating control modes and the characteristics of a solar cell. FIG. 31B is another graph illustrating control modes and the characteristics of a solar cell. The discharging apparatus has substantially same configuration as the charging apparatus except that the charge power source of the charging apparatus is replaced by the capacitor storage type power source and the capacitor storage type power source is replaced by the load. Thus, the description is made by using the charging apparatus. Referring to the drawings, there are shown a constant current signal generation circuit 401, a current diminishing signal generation 402, a constant voltage signal generation circuit 403, an input constant voltage signal generation circuit 404, a charge power source 405, a charging apparatus 406, a capacitor storage type power source 407, a signal processing circuit 4061, a PWM signal generation circuit 4062, amplifiers 4063, 4065, 4066, an inverting amplifier 4064, capacitors C1, C2, Cp1 through Cp4, diodes D11, D21, D31, D41, Dp1 through Dp3, a coil L, transistors Qp1, Qp2, a current detecting resistor R, resistors Rp1 through Rp8, a main switching circuit SW1, a synchronous rectifier circuit SW2, a current reference value setting circuit Vrefi, a charge voltage reference value setting circuit Vrefvc, an input voltage reference value setting circuit Vrefvi, an offset value setting circuit Voff-set, a charge current I, a charge voltage Vc and an input voltage Vi.

The charging apparatus for a capacitor storage type power source of this embodiment shown in FIG. 28 is adapted to electrically charge a capacitor storage type power source 407 formed by connecting a plurality of electric double layer capacitors in series from a charge power source 405 by way of the charging apparatus 406 and store electric energy in them. The plurality of electric double layer capacitors of the capacitor storage type power source 407 are provided with respective parallel monitors that are connected in parallel to bypass the charge current when the charge voltage is raised and gets to a predetermined reference voltage. The charging apparatus 406 is realized by connecting a choke coil L for charge control and a synchronous rectifier circuit SW2 in series between the charge power source 405 and the capacitor storage type power source 407, then a main switch circuit SW1 to the series connection point in parallel and then smoothing capacitors C1, C2 in parallel between the input side and the output side to form a voltage boosting switching converter and subsequently inserting and connecting a current detecting resistor R in series in order to detect the charge current.

The signal processing circuit 4061 is to control the charge current by turning on/off the main switch circuit SW1 and the synchronous rectifier circuit SW2 at phases inverse relative to each other according to on/off control signals. For this purpose, the signal processing circuit 4061 detects the charge current I, the charge voltage V and the input voltage Vi, compares them as objects of control with respective reference values defined for control purposes and generates and outputs on/off control signals according to the error amplifying signals produced as a result of the comparisons. The on/off control signals are modulated for the pulse width depending on the charge mode in effect, which may be a constant current mode, a current diminishing mode or a constant voltage mode. More specifically, as shown in FIG. 29, the signal processing circuit 4061 includes a constant current signal generation circuit 401, a current diminishing signal generation circuit 402, a constant voltage signal generation circuit 403, an input constant voltage signal generation circuit 404, and a PWM signal generation circuit 4062. The circuits (1 through 4) for generating error amplifying signals respectively compare the reference values set by the current reference value setting circuit Vrefi, the charge voltage reference value setting circuit Vrefvc, the input voltage reference value setting circuit Vrefvi and the offset value setting circuit Voffset and the charge voltage Vc with the detection signals of the charge current I, the charge voltage Vc and the input voltage Vi to output error amplifying signals. Then, the output error amplifying signals are input to the PWM signal generation circuit 4062 by way of a logical OR circuit having diodes D11, D21, D31 and D41. The PWM signal generation circuit 4062 outputs an on/off control signal (PWM signal) that is modulated for the pulse width to the main switching circuit SW1 and the synchronous rectifier circuit SW2 respectively by way of the amplifier 4063 and the inverting amplifier 4064.

As for controlling the operation of turning on/off the main switching circuit SW1, the charge current is squeezed to become small when the duty ratio is reduced. In this embodiment, the diode is connected in parallel with a polarity arrangement that makes the energy accumulated in the choke coil L to be discharged to the synchronous rectifier circuit SW2 so as to prevent the charge/discharge current from flowing inversely by way of the synchronous rectifier circuit when the load is light by keeping the synchronous rectifier circuit SW2 off regardless of the main switching circuit SW1 being on/off while the duty ratio is small. FIG. 29 illustrates a specific circuit configuration of such a signal processing circuit. Referring to FIG. 29, the diode Dp1, the resistor Rp1 and the capacitor Cp1 are connected in series and the resistor Rp2 is connected to the capacitor Cp1 in parallel to form a rectifying/smoothing circuit for on/off control signals. Then, the rectified/smoothed output is applied to between the base and emitter of the transistor Qp1 so that the transistor Qp1 is turned on when the pulse duty ratio, or the width of the pulse that is on, is larger than a predetermined value but the transistor Qp1 is turned off as the pulse width falls below the predetermined value and hence the base bias voltage is reduced. Additionally, the embodiment also comprises a signal holding circuit that short-circuits the output of the inverting amplifier 64 for turning on/off the synchronous rectifier circuit SW2 by controlling the base bias voltage of the transistor Qp2 by means of the collector output of the transistor Qp1. Thus, this embodiment locks the synchronous rectifier circuit SW2 off only when the current is small so as to discharge the energy accumulated in the choke coil L by way of the diode but turns the synchronous rectifier circuit SW2 on to allow a large current to flow through it so that the loss at the diode can be minimized.

Additionally, the on/off control signal output circuits may be provided with respective delay circuits, as shown in FIG. 30A, to delay the outputs of the on/off control signals so that the main switching circuit SW1 and the synchronous rectifier circuit SW2 may not be turned on simultaneously. Referring to FIG. 30A, the resistor Rp6 and the capacitor Cp3 form a delay circuit that delays the rise of the drive pulse (at the time of being turned on) of the main switching circuit SW1 by delay time Δt and, at the same time, the resistor Rp8 and the capacitor Cp4 form a delay circuit that delays the rise of the drive pulse (at the time of being turned on) of the synchronous rectifier circuit SW2 by delay time Δt. On the other hand, the diode Dp2 that is connected to the resistor Rp6 in parallel and shows a polarity opposite to the output direction of the drive pulse signal of the main switch circuit SW1 and the diode Dp3 that is connected to the resistor Rp8 in parallel and shows a polarity opposite to the output direction of the drive pulse signal of the synchronous rectifier circuit SW2 are circuits that prevent delay time Δt from being produced at the falling edges of the respective pulses. The parallel circuit of the resistor Rp7 and the capacitor Cp2 that are connected to the output of the inverting amplifier are for removing noises. As these circuits are connected, the pulse signal output to the main switching circuit SW1 by way of the amplifiers 4063, 4065 and the pulse signal output to the synchronous rectifier circuit SW2 by way of the inverting amplifiers 4064, 4066 that are produced by inputting a PWM signal are delayed only at the rising edges, as shown in FIG. 30B, to prevent the main switching circuit SW1 and the synchronous rectifier circuit SW2 from being turned on simultaneously. Note that, in FIG. 30B, the pulse width is smaller than the predetermined value at t7, t8 so that the transistor Qp2 shown in FIG. 29 is turned on.

In a charge operation, if the electric double layer capacitors of the capacitor storage type power source equipped with respective parallel monitors are charged unevenly to respective charge voltages that are different from each other, the parallel monitors of the electric double layer capacitors that are charged beyond the predetermined reference voltage bypass the charge current to make the charge voltage agree with the predetermined reference voltage to limit the charge voltage to the reference voltage. Thus, once the full charge voltage of the electric double layer capacitors is defined to be equal to the reference voltage, all the electric double layer capacitors are uniformly charged to the full charge voltage.

As the parallel monitor of an electric double layer capacitor charged to the predetermined reference voltage bypasses the charge current, the parallel monitor consumes the power equal to the product of multiplication of the predetermined reference voltage and the charge current, or the voltage and the current at the start of the bypassing, as heat. Thus, the power loss, or the thermal loss, is large when both the duration of the operation of each parallel monitor and/or the number of operating parallel monitors is large for the capacitor storage type power source 407. As a result, both the capacity and the dimensions of the parallel monitors are required to be raised in order to improve the heat radiation efficiency. Then, both power and space have to be wasted to make it difficult to downsize the capacitor storage type power source 407. In view of this problem, the charging apparatus 406 of this embodiment is adapted to judge the initial stages of the bypassing operation of a parallel monitor by referring to the charge voltage of the capacitor storage type power source 407 and diminish the charge current in inverse proportion to the increase of the charge voltage. With this arrangement, it is possible to reduce the capacity and the dimensions of the parallel monitors.

The charging apparatus 406 detects the charge current I and compares it with the predetermined current reference value Vrefi set by the current reference value setting circuit, as shown in FIG. 31A. Then, when the charge current I gets to a constant level (constant current charge) and the capacitor storage type power source 307 is charged to a predetermined voltage level, the charging apparatus 406 performs a PWM (pulse width modulation) control operation on the main switching circuit SW1 and the synchronous rectifier circuit SW2 by switching the control mode such that the charge current is diminished (current diminishing control: V-I control) in inverse proportion to the increase of the charge voltage Vc or the charge voltage Vc is compared with the predetermined voltage reference value Vrefvc set by the voltage reference value setting circuit so as not to exceed a voltage equivalent to the full charge voltage (constant voltage charge) when the voltage Vc gets to the equivalent voltage. Additionally, the charging apparatus 406 compares the input voltage Vi with the predetermined voltage reference value Vrefvi set by the voltage reference value setting circuit and performs a PWM control operation on the main switching circuit SW1 and the synchronous rectifier circuit SW2 so as not to make the input voltage Vi smaller than the voltage reference value Vrefvi (input constant voltage charge). FIG. 29 illustrates a specific circuit configuration of a signal processing circuit 4061 for automatically selecting a control mode according to the level of the error amplifying signal. Referring to FIG. 29, the charging apparatus 406 is equipped with a logical OR circuit that is formed by diodes D11, D21, D31, D41 for selectively inputting the error amplifying signals from the constant current signal generation circuit 401, the current diminishing signal generation circuit 402, the constant voltage signal generation circuit 403 and the input constant voltage signal generation circuit 404 to the PWM control circuit 4062.

Of these control modes, the input constant voltage charge control mode realizes a functional feature that corresponds to that of a maximum power point tracker (MPPT) effective for preventing the charge voltage from falling below the maximum power point (MPP), or the input voltage of the maximum power point (MPP), to reduce the charge efficiency when solar cells are employed as a charge power source. As shown in FIG. 31B, solar cells have specific characteristics including a hill-shaped power characteristic having its peak at the maximum power point MPP and a voltage-current characteristic that the electric current decreases from a maximum current Imax to 0 as the voltage rises until the maximum voltage Vmax is reached while the electric current steeply falls when the voltage passes the maximum power point MPP. These characteristics fluctuate depending on sun light and the ambient temperature. When a capacitor storage type power source that is in a discharged condition is charged with electricity by PWM control, using solar cells having such characteristics as a charge power source, the level of the solar cell current is shifted in the direction of "arrow a" in FIG. 31B and the output of the solar cells rises toward the maximum power point MPP as the charge voltage rises but the solar cell voltage falls.

Referring back to FIG. 29, the constant current signal generation circuit 401 is formed by an error amplifying circuit that takes out the voltage fall between the terminals of the current detecting resistor R inserted and connected in series to the charging apparatus as a detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 401 is large when the charge current I that is input as an object of control is smaller than the current reference value Vrefi but small when the charge current I is larger than the current reference value Vrefi. As the error amplifying signal is input to the PWM signal generation circuit 4062, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi so that consequently a constant current charge operation is conducted in a control mode CC where the charge current I is controlled so as to be held to a constant level according to the current reference value Vrefi.

The current diminishing signal generation circuit 402 generates a current reference value Vref(v–i) that diminishes the charge current I in inverse proportion to the increase of the charge voltage Vc of the capacitor storage type power source 407 for the constant current signal generation circuit 401, compares the current reference value Vref(v–i) with the charge current I that is the object of control and outputs a corresponding error amplifying signal. The current reference value Vref(v–i) is generated by inverting the charge voltage Vc of the capacitor storage type power source 407 (Vout=–Vin) and turning it into a positive value by means of an offset value Voff-set (=Voff-set-Vin). Therefore, the PWM signal generation circuit 4062 operates in a control mode V-I diminishing the charge current, where as the PWM signal generation circuit 4062 receives the error amplifying signal as input, it increases the charge current I if the charge voltage Vc of the capacitor storage type power source 407 is small but then as the charge voltage Vc of the capacitor storage type power source 407 increases, the PWM signal generation circuit 4062 controls the charge current such that the charge current I becomes small in inverse proportion to the increase of the charge voltage V.

The constant voltage signal generation circuit 403 is formed by an error amplifying circuit that detects the charge voltage Vc of the capacitor storage type power source 407, inputs it as an object of control, compares it with the voltage reference value Vrefvc set in advance by the voltage reference value setting circuit and outputs an error amplifying signal thereof. Thus, the output value of the error amplifying signal output from the constant voltage signal generation circuit 403 is large when the charge voltage Vc that is input as an object of control is smaller than the voltage reference value Vrefvc but small when the charge voltage Vc is larger than the voltage reference value Vrefvc. As the error amplifying signal is input to the PWM signal generation circuit 4062, a constant voltage charge operation is conducted in a control mode CV where the charge current I is controlled so as to be increased when the charge voltage Vc is smaller than the voltage reference value Vrefvc but decreased when the charge voltage Vc is larger than the voltage reference value Vrefvc.

The input constant voltage signal generation circuit 404 is formed by an error amplifying circuit that detects the voltage of the charge power source 405, or the input voltage Vi, inputs it as an object of control, compares it with the voltage reference value Vrefvi set in advance by the voltage reference value setting circuit and outputs an error amplifying signal thereof. Thus, the output value of the error amplifying signal output from the input constant voltage signal generation circuit 404 is small when the input voltage Vi that is input as an object of control is smaller than the input voltage reference value Vrefvi but large when the input voltage Vi is larger than the voltage reference value Vrefvi. As the error amplifying signal is input to the PWM signal generation circuit 4062, an input constant voltage charge operation is conducted in a control mode InCV where the charge current I is controlled so as to be decreased when the input voltage Vi is smaller than the input voltage reference value Vrefvi but increased when the input voltage Vi is larger than the input voltage reference value Vrefvi, as indicated by "arrow a" and "arrow b" in FIG. 31B.

The diodes D11, D21, D31, D41 are connected to the input of the PWM signal generation circuit 4062 respectively from the constant current signal generation circuit 401, the current diminishing signal generation circuit 402, the constant voltage signal generation circuit 403 and the input constant voltage signal generation circuit 404 with the opposite polarities to form a logical OR circuit that inputs the smallest error amplifying signal to the PWM signal generation circuit 4062 out of the error amplifying signals output from the constant current signal generation circuit 401, the current diminishing signal generation circuit 402, the constant voltage signal generation circuit 403 and the input constant voltage signal generation circuit 404.

The charge mode switching control of the logical OR circuit will be described further below. First, the charge operation is conducted in a constant current charge control mode CC in the initial stages under the condition where the diode D11 is turned on while the diodes D21, D31, D41 are held off. In other words, when the charge voltage Vc of the capacitor storage type power source 407 is low in the initial stages and hence the PWM signal generation circuit 4062 is performing a constant current charge operation in a control mode CC according to the error amplifying signal output from the constant current signal generation circuit 401, the object of control of the current diminishing signal generation circuit 402 and that of the constant voltage signal generation circuit 403 are smaller than the respective reference values to be compared, while the object of control of the input constant voltage signal generation circuit 404 is larger than the reference value to be compared. Therefore, if error amplifying signals having a large value are output from them, neither the charge current I nor the charge voltage Vc of the capacitor storage type power source 407 increases. Further, the input voltage Vi does not decrease and the error amplifying signals are held close to the respective upper limit values so that the diodes D21, D31, D41 are biased in the opposite directions and held off.

However, as the constant current charge operation is continued, the charge voltage Vc of the capacitor storage type power source 407 increases while the current reference value Vref(v–i) of the current diminishing signal generation circuit 402 gradually decreases until it becomes smaller than the current reference value Vrefi of the constant current signal generation circuit 401. Then, the error amplifying signal output from the current diminishing signal generation circuit 402 becomes smaller than the error amplifying signal output from the constant current signal generation circuit 401. At this moment, the diode D11 that is connected to the output of the constant current signal generation circuit 401 is turned off and the diode D21 connected to the output of the current diminishing signal generation circuit 402 is turned on so that a current diminishing operation is conducted in a control mode V-I where the charge current I is controlled in such a way that the charge voltage Vc of the capacitor storage type power source 407 increases and the charge current I decreases in inverse proportion to the increase of the charge voltage Vc. In FIG. 31A, the switch point is indicated by the point where the charge voltage Vc of the capacitor storage type power source 407 becomes equal to Vst.

The charge current is also controlled in the following manner. As the charge operation starts, the input voltage Vi at the side of the charge power source 405 is gradually decreased from the maximum voltage and eventually falls below the voltage reference value Vrefvi output from the input constant voltage signal generation circuit 404. Then, the error amplifying signal output from the input constant voltage signal generation circuit 404 becomes smaller than the error amplifying signal output from the current diminishing signal generation circuit 402 to turn off the diode D21 connected to the output of the current diminishing signal generation circuit 402 and turn on the diode D41 connected to the output of the input constant voltage signal generation circuit 404 so that the charge operation is conducted in an input constant voltage charge control mode (for the MPPT feature when solar cells are employed as a charge power source or the control feature for the directions of "arrow a" and "arrow b" in FIG. 31B), where the charge current is controlled in such a way that the input voltage Vi does not become lower than the voltage reference value Vrefvi, as indicated by "arrow b" in FIG. 31B.

As the charge voltage Vc of the capacitor storage type power source 407 increases further and becomes larger than the voltage reference value Vrefvc of the constant voltage signal generation circuit 403, the error amplifying signal output from the constant voltage signal generation circuit 403 becomes smaller than the error amplifying signal output from the current diminishing signal generation circuit 402 so that the diode D21 connected to the output of the current diminishing signal generation circuit 402 is turned off and the diode D31 connected to the output of the constant voltage signal generation circuit 403 is turned on so that a constant voltage charge operation is conducted in a control mode CV where the charge current is so controlled as to make the charge voltage Vc smaller than the voltage reference value Vrefvc. In FIG. 31A, the switch point is indicated by the point where the charge voltage Vc of the capacitor storage type power source 407 becomes equal to Vfu.

Figure 32:
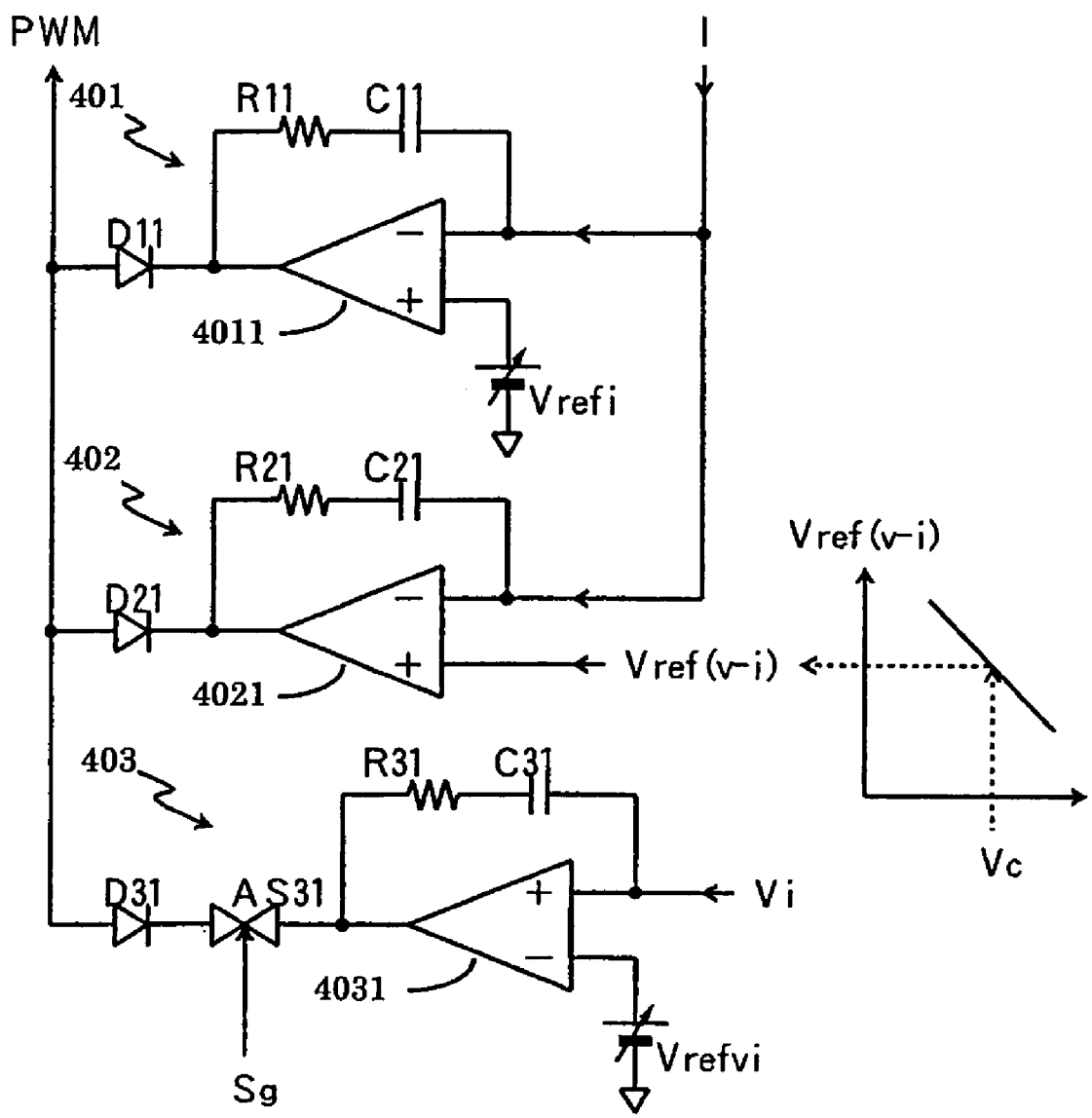
FIG. 32 is a circuit diagram of an embodiment of an error signal generation circuit.
Figure 33A:
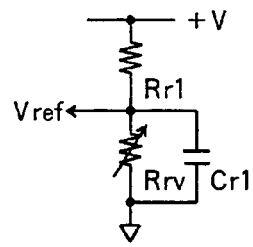
FIG. 33A is a circuit diagram of an embodiment of a reference value generation circuit.
Figure 33B:
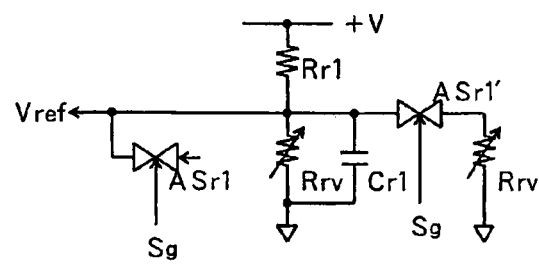
FIG. 33B is a circuit diagram of an embodiment of a reference value generation circuit.
Figure 34A:
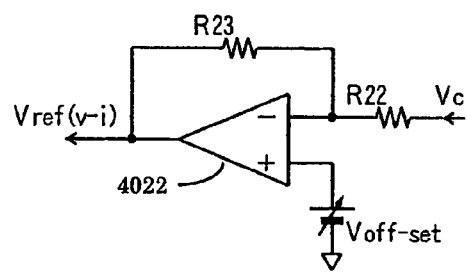
FIG. 34A is a circuit diagram of another embodiment of a signal processing circuit.
Figure 34B:
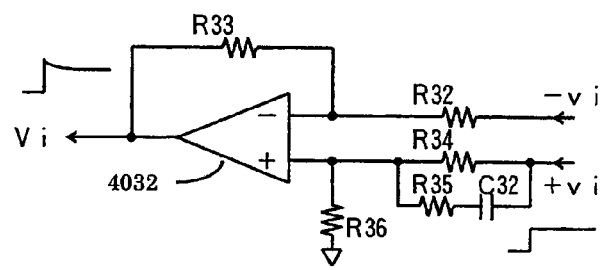
FIG. 34B is a circuit diagram of another embodiment of a signal processing circuit.

FIG. 32 is a circuit diagram of an embodiment of an error signal generation circuit. FIG. 33A is a circuit diagram of an embodiment of reference value generation circuit. FIG. 33B is a circuit diagram of another embodiment of a reference value generation circuit. FIG. 34A is a circuit diagram of an embodiment of a signal processing circuit. FIG. 34B is a circuit diagram of another embodiment of a signal processing circuit. In the drawings, there are shown operational amplifiers 11, 21, 22, 31, 32, analog switches AS31, ASr1, ASr1', capacitors C11, C21, C22, C31, C32, Cr1, resistors R11, R21 through R23, R31 through R36, Rr1, variable resistors Rrv, Rrv' and a bias power source +V.

Referring to FIG. 32, the constant current signal generation circuit 401 inputs a detection signal of the charge current I to the inverted input terminal– and the current reference value Vrefi to the non-inverted input terminal+ of the operational amplifier 11 and connects a series circuit of the capacitor C11 and the resistor R11 between the inverted input terminal– and the output terminal to form an error amplifier circuit. Similarly, the current diminishing signal generation circuit 402 inputs a detection signal of the charging circuit I to the inverted input terminal– and the current reference value Vref (v–i) to the non-inverted input terminal+ of the operational amplifier 21 and connects a series circuit of the capacitor C21 and the resistor R21 between the inverted input terminal– and the output terminal to form an error amplifier circuit. On the other hand, the input constant voltage signal generation circuit 403 inputs a detection signal of the input voltage Vi to the non-inverted input terminal+ and the input voltage reference value Vrefvi to the inverted input terminal– of the operational amplifier 31 and connects a series circuit of the capacitor C31 and the resistor R31 between the non-inverted input terminal+ and the output terminal to form an error amplifier circuit.

The above-described reference value setting circuits can be formed by using various known circuits. FIGS. 33A and 33B illustrate examples of a reference value setting circuit. Referring to FIG. 33A, the stabilized bias power source +V is divided by a voltage divider circuit of the fixed resistor Rr1 and the variable resistor Rrv and the reference value Vref is taken out from the voltage dividing connection point and adjusted to produce the predetermined voltage by means of the variable resistor Rrv. Note that the capacitor Cr1 is connected in parallel with the variable resistor Rrv as an anti-noise measure. As shown in FIG. 33B, similar circuits may be connected in parallel by way of an analog switch ASr1 so that the reference value can be switched by turning on/off the analog switch ASr1. Still alternatively, a variable resistor Rrv' may be connected in parallel with the variable resistor Rrv by way of an analog switch ASr1' to switch the reference value. When the circuit is arranged so as to switch the reference value by means of analog switches ASr1, ASr1', the value of the constant current charge can be switched stepwise under predetermined conditions if the circuit is employed for the current reference value setting circuit Vrefi. Then, for example, it is possible to switch the charge current for constant current charge by processing the bypass operation signal of a parallel monitor by means of a logic processing circuit and using the output signal of the logic processing circuit as a switching signal.

As pointed out above, the current reference value Vref(v–i) illustrated in FIG. 32 shows a value that is inversely proportional to the increase of the charge voltage Vc of the capacitor storage type power source 407. More specifically, as shown in FIG. 34A, a subtraction circuit is formed by using an operational amplifier 4022 having an inverted input terminal– where a detection signal of the charge voltage Vc of the capacitor storage type power source 407 is input by way of a resistor R22 and an non-inverted input terminal+ where an offset value Voff-set is input and a resistor R23 connected between the inverted input terminal– and the output terminal to generate such a reference value. The current reference value Vref(V–i) of Voff-set+(Voff-set–Vc) R23/R22 (2Voff-set–Vc when R23=R22) is taken out from the subtraction circuit. If Voff-set is made equal to Vst of FIG. 30A, the reference value of the constant current signal generation circuit 401 and that of the current diminishing signal generation circuit 402 become equal to each other when the charge voltage Vc of the capacitor storage type power source 407 rises to Voff-set so that a control mode for diminishing the electric current is selected from this point.

The detection sensitivity of the input voltage Vi shown in FIG. 32 can be improved by connecting −vi of the voltage detection line to the non-inverted input terminal− of the operational amplifier 4032 by way of the resistor R32 and +vi of the voltage detection line to the voltage divider circuit of the resistors R34 and R36 while connecting the voltage dividing connection point thereof to the non-inverted input terminal+ of the operational amplifier 4032 and also connecting a series circuit of the capacitor C32 and the resistor R35 in parallel with the resistor R34.

Figure 35:
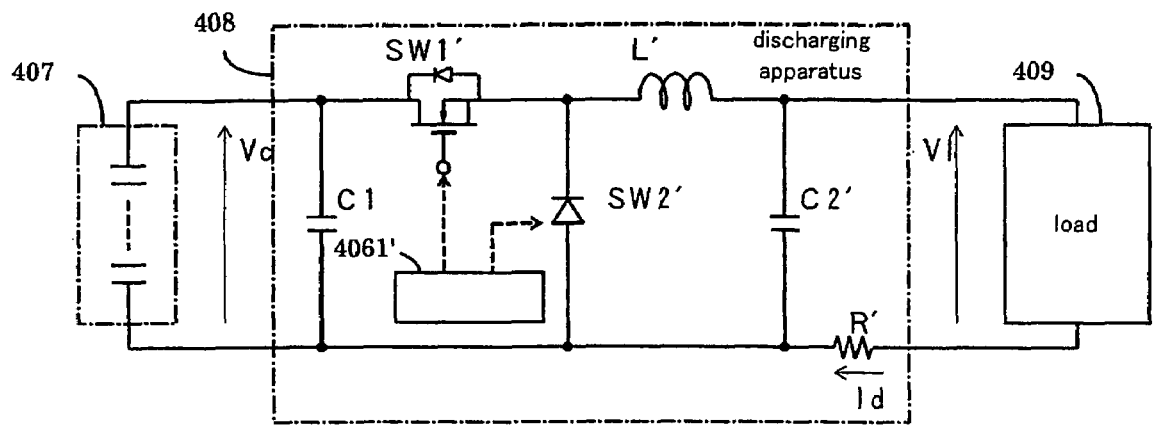
FIG. 35 is a circuit diagram of the main circuit of an embodiment of discharging apparatus for a capacitor storage type power source according to the present invention.

FIG. 35 is a circuit diagram of the main circuit of an embodiment of a discharging apparatus for a capacitor storage type power source according to the present invention. In FIG. 35, there are shown a discharging apparatus 408, a load 409, a signal processing circuit 4061', capacitors C1', C2', a coil L', a current detecting resistor R', switching circuits SW1', SW2', a discharge current Id, a charge voltage Vc and a load voltage Vl.

The discharging apparatus illustrated in FIG. 35 comprises a voltage-lowering type switching converter that turns on/off the switching circuit SW1' by means of a PWM signal and turns on/off the synchronous rectifier circuit SW2' at phases inverse relative to each other to supply a discharge current (load current) to a load. The switching converter is formed by connecting the discharge controlling switch circuit SW1' and a choke coil L' in series between the capacitor storage type power source 407 and the load 9 in series and connecting the synchronous rectifier circuit SW2' to the series connection point of them in parallel, while connecting capacitors C1', C2' in parallel between the input side and the output side. The discharging apparatus inserts and connects the current detecting resistor R' in series in order to detect the discharge current Id. With each of the embodiments of FIGS. 28 and 35, the charging apparatus can also be used as a discharging apparatus and vice versa, although it may be needless to say that the signal processing circuit for the charging apparatus differs from its counterpart for the discharging apparatus. More specifically, in the case of a charging apparatus, the charge current is controlled in any of the predetermined charge control modes (CC, V-I, CV, InCV, etc.) as described earlier by referring to the embodiment of FIG. 28. In the case of a discharging apparatus, the discharge current is controlled in any of the feed control modes of the load.

The present invention is by no means limited to the above-described embodiment, which may be modified in various different ways without departing from the spirit and scope of the present invention. For example, the above described embodiment is adapted to operate in different control modes including a constant current mode CC, a current diminishing charge mode V-I, a constant voltage mode CV and an input constant voltage charge mode InCV, which modes are selected under predetermined conditions, it may alternatively be so arranged that only a constant current mode CC and a current diminishing charge mode V-I are provided as control modes and the capacitor storage type power source is charged to a full charge condition in a current diminishing charge mode V-I or alternatively in a constant power charge mode CP or the charge operation may be terminated at the full charge voltage. Additionally, the constant current signal generation circuit and the current diminishing signal generation circuit are not limited to those illustrated in FIG. 30A and each of them may be replaced by an appropriately designed alternative circuit that is equivalent to it.

Figure 36:
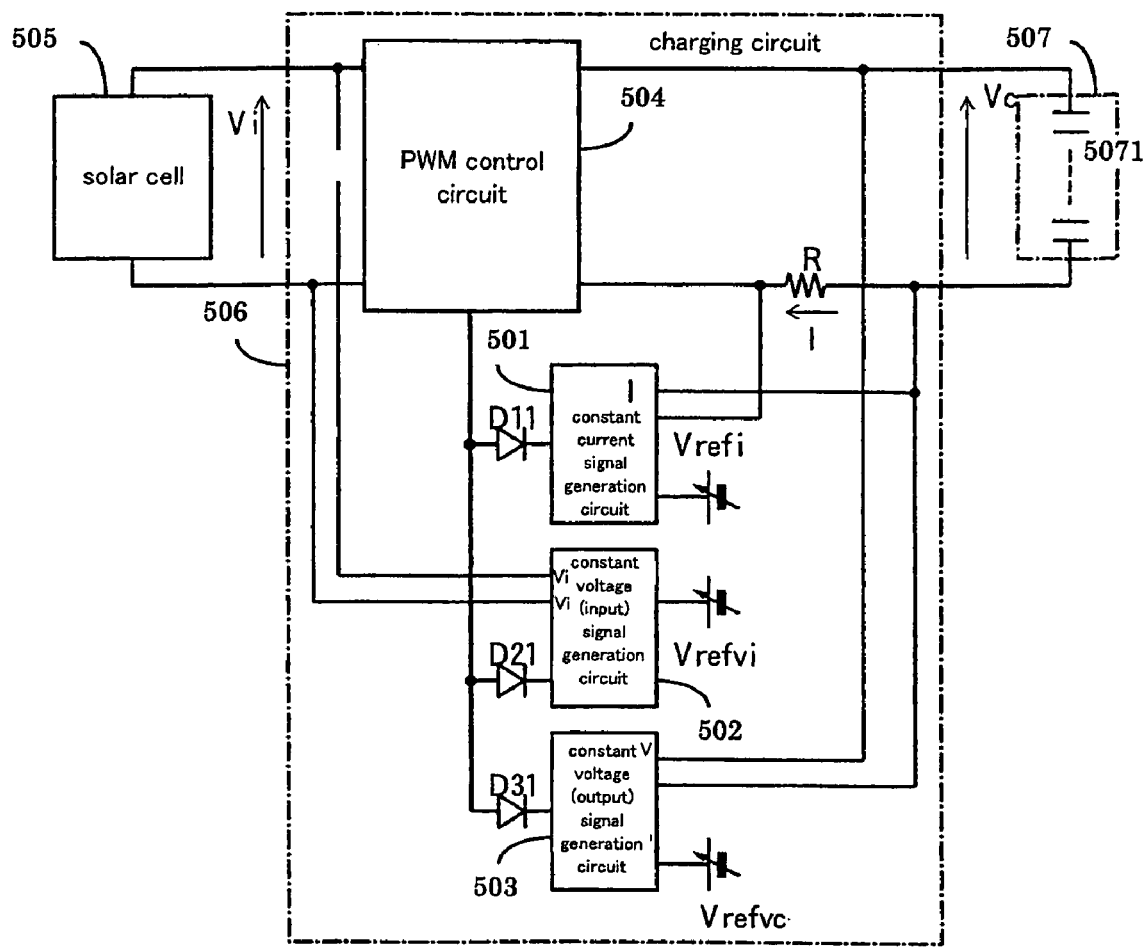
FIG. 36 is a circuit diagram of an embodiment of a charging apparatus for a capacitor storage type power source according to the present invention.
Figure 37A:
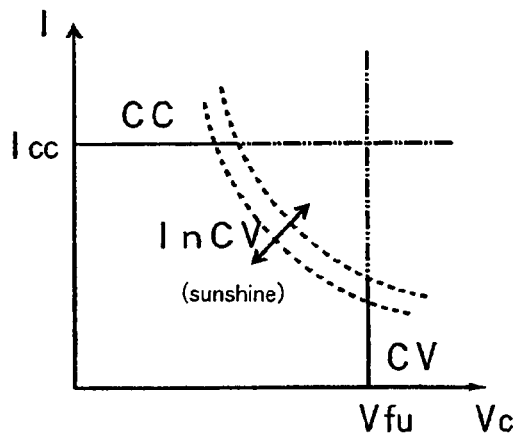
FIG. 37A is a graph illustrating a control mode and the characteristics of a solar cell.
Figure 37B:
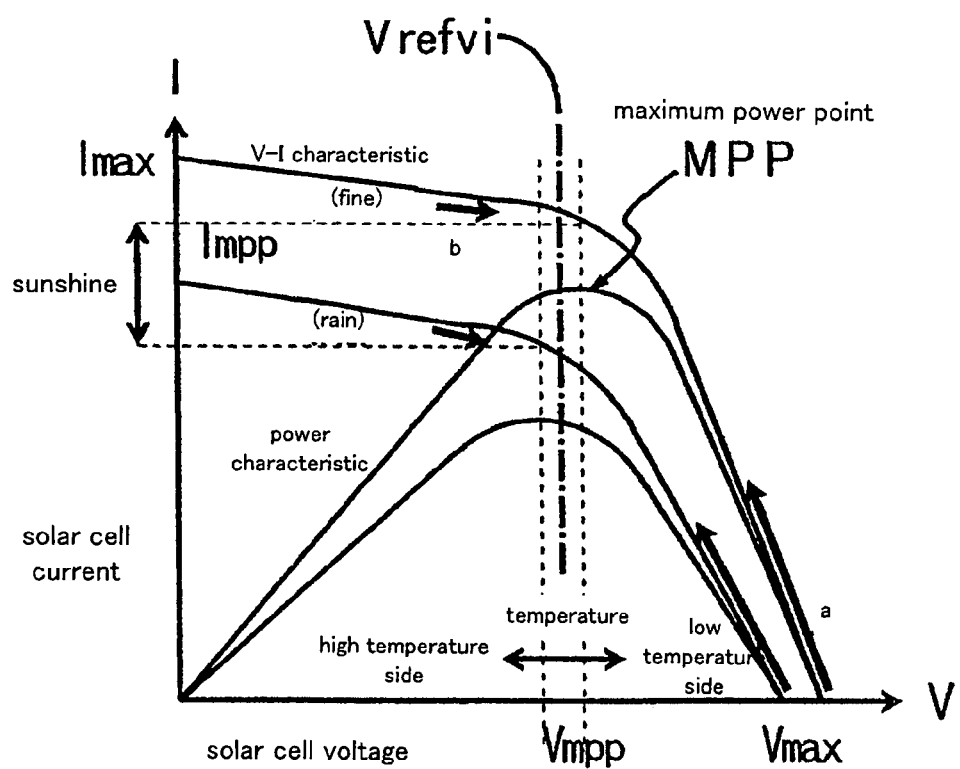
FIG. 37B is a graph illustrating a control mode and the characteristics of a solar cell.

(A fifth aspect of the invention) Now, another embodiment of the present invention will be described by referring to the related drawings. FIG. 36 is a circuit diagram of an embodiment of a charging apparatus for a capacitor storage type power source according to the present invention. FIGS. 37A and 37B are graphs illustrating control modes and the characteristics of a solar cell. Referring to the drawings, there are shown a constant current signal generation circuit 501, an input constant voltage signal generation circuit 502, a charge constant voltage signal generation circuit 503, a PWM control circuit 504, solar cells 505, a charging apparatus 506, a capacitor storage type power source 507, diodes D11, D21, D31, a current detecting resistor R, a current reference value setting circuit Vrefi, an input voltage reference value setting circuit Vrefvi, a charge voltage reference value setting circuit Vrefvc, a charge current I, a charge voltage Vc and an input voltage Vi.

The charging apparatus for a capacitor storage type power source of this embodiment of FIG. 36 is adapted to electrically charge a capacitor storage type power source 507 formed by connecting a plurality of electric double layer capacitors in series from a charge power source of solar cells 505 by way of the charging apparatus 506 and store electric energy in them. The plurality of electric double layer capacitors of the capacitor storage type power source 507 are provided with respective parallel monitors that are connected in parallel to bypass the charge current when the charge voltage is raised and gets to a predetermined reference voltage, although they may not be provided with parallel monitors. In the case of a capacitor storage type power source 507 having electric double layer capacitors that are equipped with respective parallel monitors, if the electric double layer capacitors are charged unevenly to respective charge voltages that are different from each other in a charge operation, the parallel monitors of the electric double layer capacitors that are charged beyond the predetermined reference voltage bypass the charge current to make the charge voltage agree with the predetermined reference voltage to limit the charge voltage to the reference voltage. Thus, once the full charge voltage of the electric double layer capacitors is defined to be equal to the reference voltage, all the electric double layer capacitors are uniformly charged to the full charge voltage.

The charging apparatus 506 detects the charge current I and compares it with the predetermined current reference value Vrefi set by the current reference value setting circuit. Then, it compares the input voltage Vi with the predetermined input voltage reference value Vrefvi that is set by the input voltage reference value setting circuit and the charge voltage Vc of the capacitor storage type power source 507 with the predetermined charge voltage reference value Vrefvc that is set by the charge voltage reference value setting circuit and performs a PWM (pulse width modulation) control operation so as to limit the charge current I when the input voltage falls below the input voltage reference value Vrefvi (input constant voltage charge) and also limit the charge current when the charge voltage Vc exceeds the charge voltage reference value Vrefvc (constant voltage charge). As a specific circuit configuration, the charging apparatus 506 is equipped with a PWM control circuit 504, a constant current signal generation circuit 501, an input constant voltage signal generation circuit 502, a constant voltage signal generation circuit 503 and a logical OR circuit formed by diodes D11, D21, D31 for selectively inputting the error amplifying signals from these signal generation circuits to the PWM control circuit 504.

The constant current signal generation circuit 501 is formed by an error amplifying circuit that takes out the voltage fall between the terminals of the current detecting resistor R inserted and connected in series to the charging circuit as detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 501 is large when the charge current I that is input as an object of control is smaller than the current reference value Vrefi but small when the charge current I is larger than the current reference value Vrefi. As the error amplifying signal is input to the PWM control circuit 504, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi, so that consequently a constant current charge operation is conducted in a control mode CC where the charge current I is controlled so as to be held to a constant level according to the current reference value Vrefi as shown in FIG. 37A.

The input constant voltage signal generation circuit 502 is formed by an error amplifying circuit that detects the voltage of the charge power source of solar cells 505, or the input voltage Vi, inputs it as an object of control, compares it with the voltage reference value Vrefvi set in advance by the voltage reference value setting circuit and outputs an error amplifying signal thereof. Thus, the output value of the error amplifying signal output from the input constant voltage signal generation circuit 4 is small when the input voltage Vi that is input as an object of control is smaller than the input voltage reference value Vrefvi but large when the input voltage Vi is larger than the voltage reference value Vrefvi. As the error amplifying signal is input to the PWM control circuit 504, it performs an input constant voltage charge operation in a control mode InCV where the charge current I is controlled so as to be decreased when the input voltage Vi is smaller than the input voltage reference value Vrefvi but increased when the input voltage Vi is larger than the input voltage reference value Vrefvi, as indicated by "arrow a" and "arrow b" in FIG. 37B.

The constant voltage signal generation circuit 503 is formed by an error amplifying circuit that detects the charge voltage Vc of the capacitor storage type power source 507, inputs it as an object of control, compares it with the voltage reference value Vrefv set in advance by the voltage reference value setting circuit and outputs an error amplifying signal thereof. Thus, the output value of the error amplifying signal output from the constant voltage signal generation circuit 503 is large when the charge voltage Vc that is input as an object of control is smaller than the voltage reference value Vrefv but small when the charge voltage Vc is larger than the voltage reference value Vrefv. As the error amplifying signal is input to the PWM control circuit 504, it performs a constant voltage charge operation in a control mode CV where the charge current I is controlled so as to be increased when the charge voltage Vc is smaller than the voltage reference value Vrefv but decreased when the charge voltage Vc is larger than voltage reference value Vrefv.

The diodes D11, D21, D31 are connected to the input of the PWM control circuit 504 respectively from the constant current signal generation circuit 501, the input constant voltage signal generation circuit 502 and the constant voltage signal generation circuit 503 with the opposite polarities to form a logical OR circuit that inputs the smallest error amplifying signal to the PWM control circuit 504 out of the error amplifying signals output from the constant current signal generation circuit 501, the input constant voltage signal generation circuit 502 and the constant voltage signal generation circuit 503. Now, the charge mode switching control (CC→InCV→CV) of the logical OR circuit will be described by referring to FIGS. 37A and 37B.

First, in the initial stages of the charge operation after the start, the diode D11 is turned on while the diodes D21, D31 are held off and a constant current charge operation is conducted in a control mode CC. In other words, when the charge voltage Vc of the capacitor storage type power source 507 is low and hence the PWM control circuit 504 is performing a constant current charge operation in a control mode CC according to the error amplifying signal output from the constant current signal generation circuit 501, the object of control of the input constant voltage signal generation circuit 502, which is the input voltage Vi, is greater than the reference value to be compared with and the object of control of the input constant voltage signal generation circuit 502, which is the charge voltage Vc, is smaller than the reference value to be compared with because the output of the solar cells is small and found in the region indicated by "a" in FIG. 37B. Therefore, while error amplifying signals having a large value are output from them, neither the charge current I nor the charge voltage Vc of the capacitor storage type power source 507 increases and the error amplifying signals are held close to the respective upper limit values so that the diodes D21, D31 are biased in the opposite directions and held off.

However, as the constant current charge operation is continued, the charge voltage Vc of the capacitor storage type power source 507 and the output of the solar cells 505 rises until the voltage of the solar cells 505, or the input voltage, falls from near the maximum power point MPP to the region "b" in FIG. 37B. Then, the error amplifying signal output from the input constant voltage signal generation circuit 502 becomes smaller than the error amplifying signal output from the constant current signal generation circuit 501. At this moment, the diode D11 that is connected to the output of the constant current signal generation circuit 501 is turned off and the diode D21 connected to the output of the input constant voltage signal generation circuit 502 is turned on so that an operation of controlling and decreasing the charge current I is conducted in a control mode InCV for the input constant voltage.

The input constant voltage charge control mode realizes a functional feature that corresponds to that of a maximum power point tracker (MPPT) effective for preventing the charge voltage from falling below the maximum power point (MPP), or the input voltage of the maximum power point (MPP), to reduce the charge efficiency when solar cells are employed as a charge power source. As shown in FIG. 37B, solar cells have specific characteristics including a hill-shaped power characteristic having its peak at the maximum power point and a voltage-current characteristic that the electric current decreases from a maximum current Imax to 0 as the voltage rises until the maximum voltage Vmax is reached while the electric current steeply falls when the voltage passes the maximum power point MPP. These characteristics fluctuate depending on sun light and the ambient temperature. When a capacitor storage type power source that is in a discharged condition is charged with electricity by PWM control, using solar cells having such characteristics as a charge power source, the solar cell current toward the maximum power point MPP and the output of the solar cells rises in the direction of "a" indicated in FIG. 37B.

As the charge voltage Vc of the capacitor storage type power source 507 increases further and becomes larger than the voltage reference value Vrefv of the constant voltage signal generation circuit 503, the error amplifying signal output from the constant voltage signal generation circuit 503 becomes smaller than the error amplifying signal output from the current diminishing signal generation circuit 2 so that the diode D21 connected to the output of the current diminishing signal generation circuit 502 is turned off and the diode D31 connected to the output of the constant voltage signal generation circuit 503 is turned on so that a constant voltage charge operation is conducted in a control mode CV where the charge current is so controlled as to make the charge voltage Vc smaller than the voltage reference value Vrefv. In FIG. 37A, the switch point is indicated by the point where the charge voltage Vc of the capacitor storage type power source 507 becomes equal to Vfu.

Figure 38:
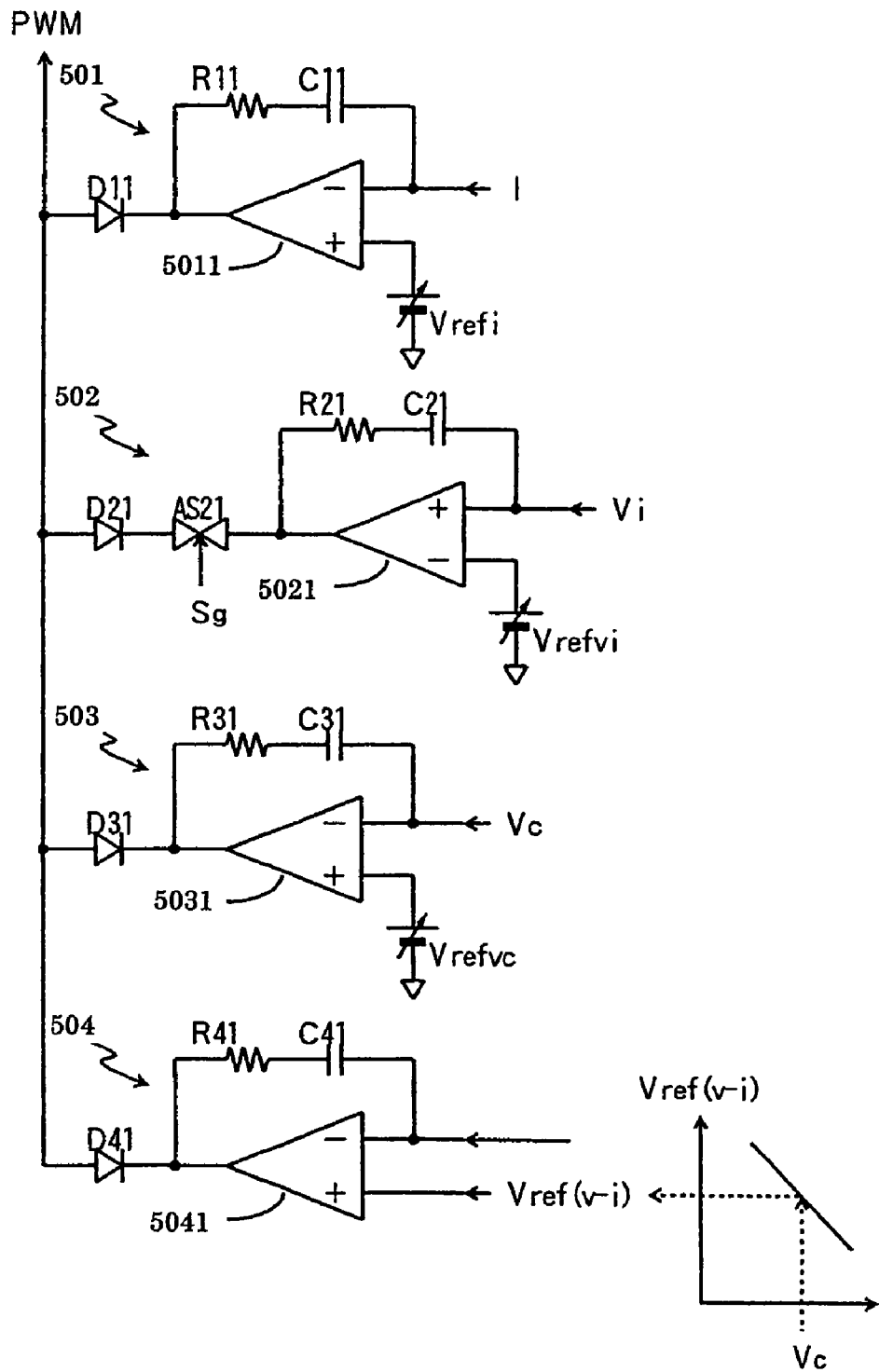
FIG. 38 is a circuit diagram of an embodiment of an error signal generation circuit.
Figure 39A:
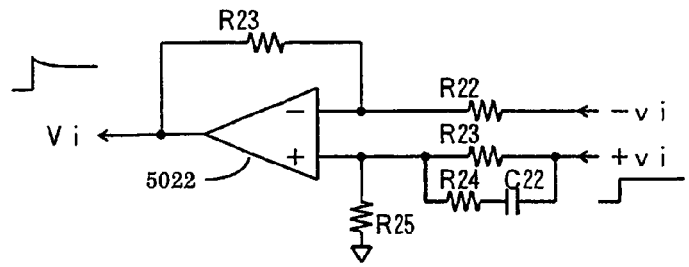
FIG. 39A is a circuit diagram of an embodiment of a reference value generation circuit.
Figure 39B:
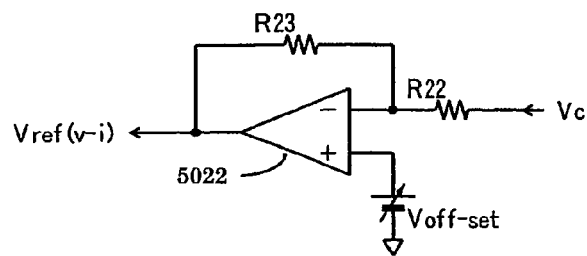
FIG. 39B is a circuit diagram of an embodiment of a reference value generation circuit.
Figure 40A:
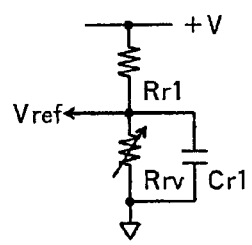
FIG. 40A is a circuit diagram of another embodiment of a signal processing circuit.
Figure 40B:
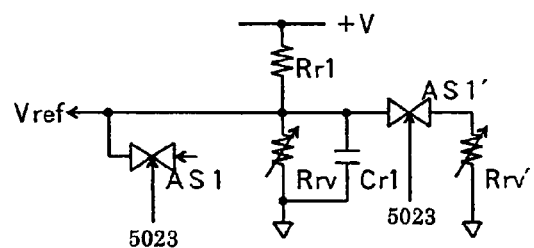
FIG. 40B is a circuit diagram of another embodiment of a signal processing circuit.

Now, specific configurations of the signal generation circuits will be described below. FIG. 38 is a circuit diagram of an embodiment of an error signal generation circuit. FIG. 39A is a circuit diagram of an embodiment of a reference value generation circuit. FIG. 39B is a circuit diagram of an embodiment of a reference value generation circuit. FIG. 40A is a circuit diagram of another embodiment of a signal processing circuit. FIG. 40B is a circuit diagram of another embodiment of a signal processing circuit. In these figures, there are shown operational amplifiers 5011, 5021, 5022, 5031, 5032, analog switches AS31, ASr1. ASr1', capacitors C11, C21, C22, C31, C32, Cr1, resistors R11, R21 through R23, R31 through R36, Rr1, variable resistors Rrv, Rrv' and a bias power source +V.

Referring to FIG. 38, the constant current signal generation circuit 501 inputs a detection signal of the charge current I to the inverted input terminal– and the current reference value Vrefi to the non-inverted input terminal+ of the operational amplifier 5011 and connects a series circuit of the capacitor C11 and the resistor R11 between the inverted input terminal– and the output terminal to form an error amplifier circuit. The input constant voltage signal generation circuit 502 inputs a detection signal of the input voltage Vi to the non-inverted input terminal+ and the input voltage reference value Vrefvi to the inverted input terminal– of the operational amplifier 5021 and connects a series circuit of the capacitor C21 and the resistor R21 between the non-inverted input terminal+ and the output terminal to form an error amplifier circuit. The analog switch AS21 connected to the output of the operational amplifier 5021 is turned on/off according to signal Sg to cut off the operational amplifier 5021 when the input constant voltage control mode InCV is out of use. The constant voltage signal generation circuit 503 inputs a detection signal of the charge voltage Vc to the inverted input terminal– and the voltage reference value Vrefvc to the non-inverted input terminal+ of the operational amplifier 5031 and connects a series circuit of the capacitor C31 and the resistor R31 between the inverted input terminal– and the output terminal to form an error amplifier circuit. Similarly, the current diminishing signal generation circuit 504 inputs a detection signal of the charge current I to the inverted input terminal– and the current reference value Vref(V–i) to the non-inverted input terminal+ of the operational amplifier 5041 and connects a series circuit of the capacitor C41 and the resistor R41 between the inverted input terminal– and the output terminal to form an error amplifying circuit. This circuit generates current reference value Vref(v–i) that reduces the charge current I in inverse proportion to the increase of the charge voltage Vc of the capacitor storage type power source 507, compares the current reference value Vref (v–i) with the object of control, or the charge current I, and outputs a corresponding error amplifying signal. The current reference value Vref(v–i) is generated by inverting the charge voltage Vc of the capacitor storage type power source 507 (Vout=–Vin) and turning it into a positive value by means of an offset value Voff-set (=Voff-set–Vin).

The above-described reference value setting circuits can be formed by using various known circuits. FIGS. 39A and 39B illustrate examples of reference value setting circuit. Referring to FIG. 39A, the stabilized bias power source +V is divided by a voltage divider circuit of the fixed resistor Rr1 and the variable resistor Rrv and the reference value Vref is taken out from the voltage dividing connection point and adjusted to produce the predetermined voltage by means of the variable resistor Rrv. Note that the capacitor Cr1 is connected in parallel with the variable resistor Rrv as an anti-noise measure. As shown in FIG. 39B, similar circuits may be connected in parallel by way of an analog switch ASr1 so that the current reference value can be switched by turning on/off the analog switch ASr1. Still alternatively, a variable resistor Rrv' may be connected in parallel with the variable resistor Rrv by way of an analog switch ASr1' to switch the reference value. When the circuit is arranged so as to switch the reference value by means of analog switches ASr1, ASr1', the value of the constant current charge can be switched stepwise under predetermined conditions if the circuit is employed for the current reference value setting circuit Vrefi. Then, for example, it is possible to switch the charge current for constant current charge by processing the bypass operation signal of a parallel monitor by means of a logic processing circuit and using the output signal of the logic processing signal as a switching signal.

As pointed out above, the current reference value Vref(v–i) illustrated in FIG. 38 shows a value that is inversely proportional to the increase of the charge voltage Vc of the capacitor storage type power source 507. More specifically, as shown in FIG. 40A, a subtraction circuit is formed by using an operational amplifier 22 having an inverted input terminal– where a detection signal of the charge voltage Vc of the capacitor storage type power source 507 is input by way of a resistor R22 and an non-inverted input terminal+ where an offset value Voff-set is input and a resistor R23 connected between the inverted input terminal– and the output terminal to generate such a reference value. The current reference value Vref(V–i) of Voff-set+(Voff-set–Vc) R23/R22 (2Voff-set–Vc when R23=R22) is taken out from the subtraction circuit. If Voff-set is made equal to Vst of FIG. 38A, the reference value of the constant current signal generation circuit 501 and that of the current diminishing signal generation circuit 502 become equal to each other when the charge voltage Vc of the capacitor storage type power source 507 rises to Voff-set so that a control mode for diminishing the electric current is selected from this point.

The detection sensitivity of the input voltage Vi shown in FIG. 38 can be improved by connecting –vi of the voltage detection line to the non-inverted input terminal– of the operational amplifier 5032 by way of the resistor R32 and +vi of the voltage detection line to the voltage divider circuit of the resistors R34 and R36 while connecting the voltage dividing connection point thereof to the non-inverted input terminal+ of the operational amplifier 5032 and also connecting a series circuit of the capacitor C32 and the resistor R35 in parallel with the resistor R34.

Figure 41A:
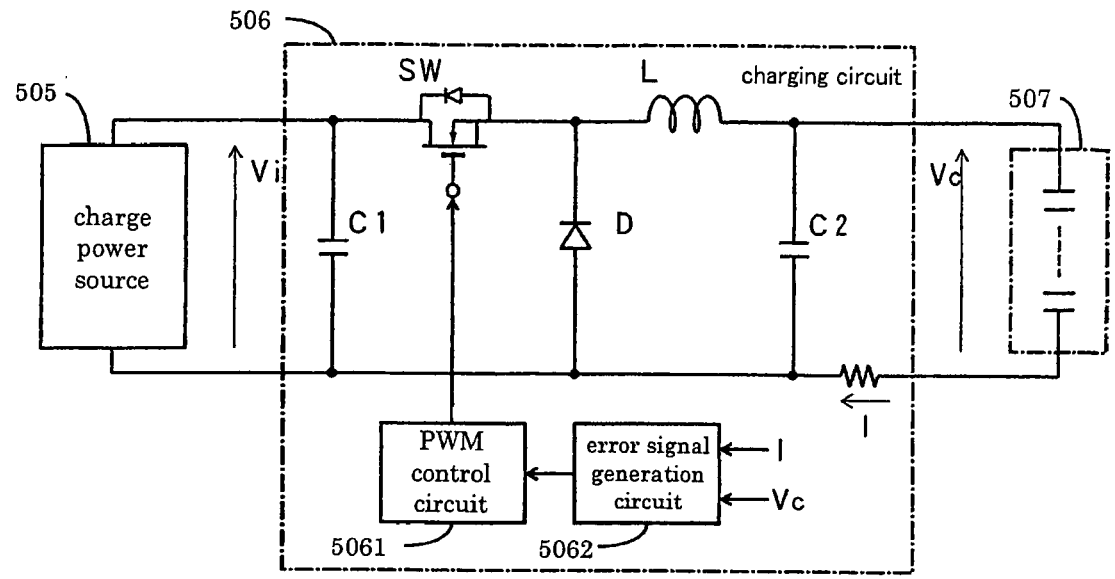
FIG. 41A is a circuit diagram of an embodiment of a charging apparatus equipped with a PWM controlled switching converter.
Figure 41B:
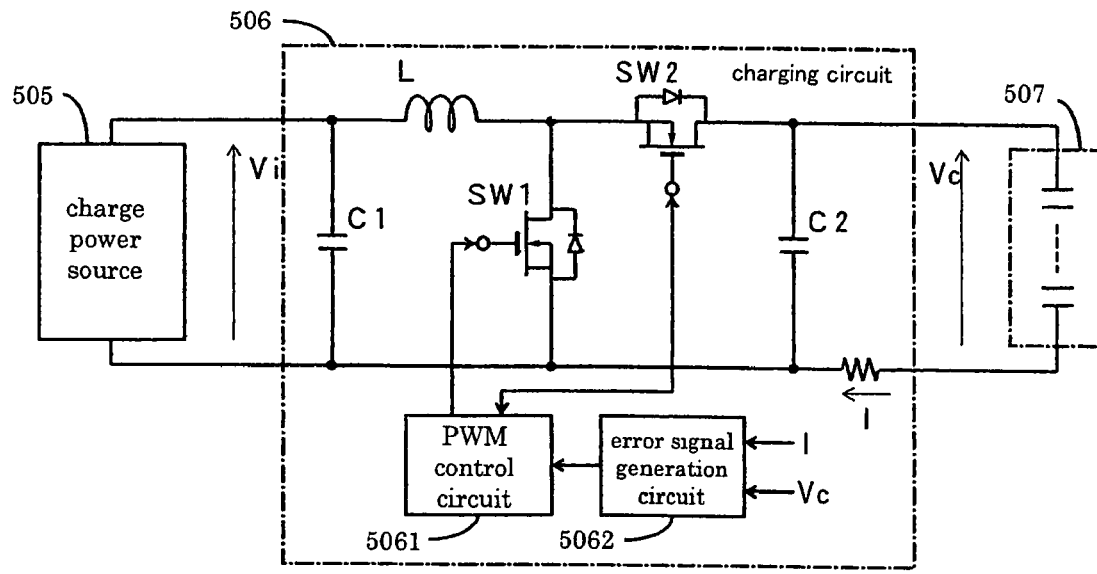
FIG. 41B is a circuit diagram of an embodiment of a charging apparatus equipped with a PWM controlled switching converter.

FIG. 41A is a circuit diagram of an embodiment of a charging apparatus comprising a PWM controlled switching converter. FIG. 41B is a circuit diagram of another embodiment of a charging apparatus comprising a PWM controlled switching converter. FIGS. 41A and 41B show a control circuit 5061, an error signal generation circuit 5062, capacitors C1, C2, a diode D, a coil L, a current detecting resistor R, a switching circuit SW1, a synchronous rectifier circuit SW2, a charge current I, a charge voltage Vc and a supply voltage Vi.

The charging apparatus illustrated in FIG. 41A comprises a voltage-lowering type switching converter that turns on/off the switching circuit SW by means of a PWM signal to supply a charge current that is formed by connecting a charge controlling switch circuit SW and a choke coil L in series between the charge power source 505 and the capacitor storage type power source 507 and connecting a diode D (synchronous rectifier circuit) to the series connection point in parallel at phases inverse relative to each other and then connecting capacitors C1, C2 in parallel between the input side and the output side. Additionally, a current detecting resistor R is inserted and connected in series in order to detect the charge current. On the other hand, the charging apparatus illustrated in FIG. 41B comprises a voltage-boosting type switching converter that turns on/off the switching circuit SW1 by means of a PWM signal and turns on/off the synchronous rectifier circuit SW2 at phases inverse relative to the switching circuit SW1 to supply a charge current, the switching converter being formed by connecting a charge controlling choke coil L and a synchronous rectifier circuit SW2 in series between the charge power source 505 and the capacitor storage type power source 507 and connecting a switching circuit SW1 to the series connection point in parallel and then connecting capacitors C1, C2 in parallel between the input side and the output side. Additionally, a current detecting resistor R is inserted and connected in series in order to detect the charge current. The PWM control circuit 5061 supplies a PWM signal to the switching circuits SW, SW1 and the synchronous rectifier circuit SW2 and the error signal generation circuit 62 supplies an error amplifying signal according to the charge current I the charge voltage Vc, the reference value and the offset value of the capacitor storage type power source 507 to the PWM control circuit 5061 in a manner as described earlier.

The present invention is by no means limited to the above-described embodiment, which may be modified in various different ways without departing from the spirit and scope of the present invention. For example, the above described embodiment is adapted to operate in different control modes including a constant current mode CC, an input constant voltage charge mode InCV, a constant voltage charge mode CV and a current diminishing mode V-I, which modes are selected under predetermined conditions, it may alternatively be so arranged that only a constant current mode CC and an input constant voltage charge mode InCV are provided as control modes and the electric charge is judged until a full charge condition or the charge operation may be terminated at the full charge voltage. Additionally, the constant current signal generation circuit and the other signal generation circuits are not limited to those illustrated in FIG. 38 and each of them may be replaced by an appropriately designed alternative circuit that is equivalent to it. Still additionally, since the maximum power point MPP of a solar cell fluctuates according to the sun shine, as shown in FIG. 37B, the current sun shine and the current temperature may be detected and the input voltage reference value Vrefvi to be set may be changed according to the detected sun shine.

Figure 42:
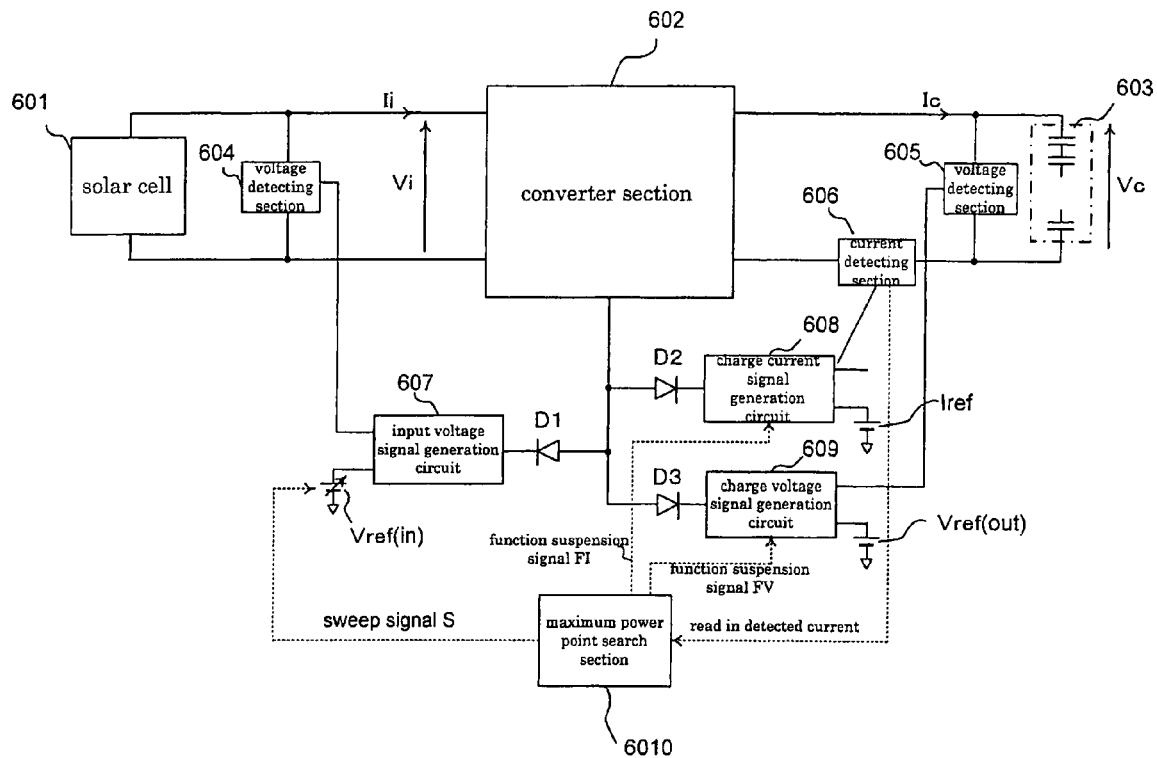
FIG. 42 is a schematic block diagram of an embodiment of a charging apparatus for a capacitor storage type power source according to the present invention.
Figure 43:
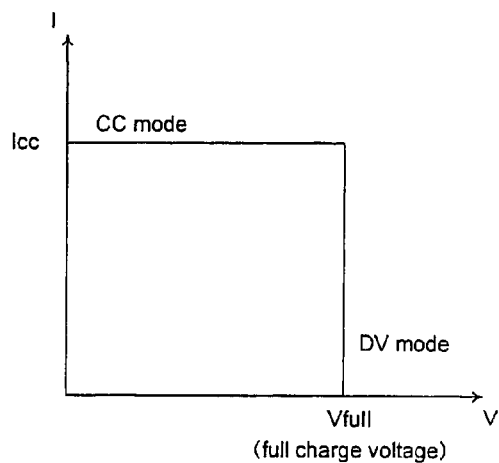
FIG. 43 is a graph illustrating a control mode of an embodiment of a charging apparatus for a capacitor storage type power source according to the present invention.

(A sixth aspect of the invention) Now, another embodiment of the present invention will be described by referring to the related drawings. FIG. 42 is a schematic block diagram of an embodiment of a charging apparatus for a capacitor storage type power source according to the present invention. FIG. 43 is a graph illustrating a control mode of the embodiment of a charging apparatus for a capacitor storage type power source.

FIG. 42 shows solar cells 601, a converter section 602, a capacitor section 603, a voltage detecting section at the input side of the converter section 602, a voltage detecting section at the output side of the converter section 602, a current detecting section 606 for detecting the electric current at the output side of the converter section 602 and outputting it as voltage, an input voltage signal generation circuit 607, a charge current signal generation circuit 608, a charge voltage signal generation circuit 609, a maximum power point search section 6010, diodes D1, D2, D3 for an OR circuit for automatically shifting the operation mode, an input voltage reference value setting circuit Vref(in), a charge voltage reference value setting circuit Vref(out), a charge current reference value setting circuit Iref, a charge current Ic for the capacitor section 603, a charge voltage Vc for the capacitor section 603, an input voltage Vi for the converter section 602 and an input current Ii for the converter section 602. The current value and the voltage value of the converter section 602 are respectively a charge current value and a charge voltage value from the viewpoint of the capacitor section 603 so that they may be referred to as "charge current signal generation circuit 608" and "charge voltage signal generation circuit 609", respectively.

The charging apparatus for a capacitor storage type power source of this embodiment of FIG. 42 is adapted to electrically charge the capacitor section 603 typically formed by connecting a plurality of electric double layer capacitors both in series and in parallel from the solar cells 601 by way of the converter section 602 and store electric energy there.

The converter section 602 detects the charge current I and compares it with the current reference value Iref of the charge current reference value setting circuit 608 in order to make the charge current I show a constant value (constant current charge). The converter section 602 also compares the input voltage Vi with the input voltage reference value Vref(in) of the input voltage reference value setting circuit to make the input voltage Vi show a constant value.

Additionally, the converter section 602 compares the charge voltage Vc of the capacitor section 603 with the charge voltage reference value Vref(out) of the charge voltage reference value setting circuit and performs a PWM (pulse width modulation) control operation of limiting the charge current (constant voltage charge) whenever the charge voltage Vc exceeds the charge voltage reference value Vref(out) by means of the PWM section (not shown) in the converter section 602. For this purpose, the converter section 602 is provided with an input voltage signal generation circuit 607, a charge current signal generation circuit 608, a charge voltage signal generation circuit 609 and a logical OR circuit formed by using diodes D1, D2, D3 for automatically switching the error amplifying signals from these signal generation circuits.

Note that the converter section 602 can take any conversion system for the power conversion circuit to correspond to the relative relationship of the voltage of the solar cells 601 and that of the capacitor section 603. More specifically, it takes a voltage-lowering converter system when the voltage of the solar cells 601 is higher than that of the capacitor section 603 but a voltage-boosting converter system when the voltage of the solar cells 601 is lower than that of the capacitor section 603, whereas it takes a voltage-boosting-lowering converter system when the voltage of the solar cells 601 can be higher and lower than that of the capacitor section 603. Additionally, it can switch from one to the other appropriately. A transformer may be interposed between the input side and the output side for insulation. Any of the above listed systems can be applied to the present invention so long as the output is a power converter circuit that can operate in a current mode (current type).

The charge current signal generation circuit 608 is typically formed by an error amplifying circuit adapted to take out the voltage fall between the terminals of the current detecting resistor connected in series to the charging circuit as a detection signal of the charge current Ic, input it as an object of control, compares it with Iref set as reference value of the error amplifying circuit by the charge current reference value setting circuit and output an error amplifying signal for the difference. The error amplifying signal output from the charge current signal generation circuit 608 shows the polarity that makes the output value large when the charge current I, or the object of control, is smaller than the charge current reference value Iref but small when the charge current Ic is larger than the charge current reference value Iref. As the converter section 602 receives the error amplifying signal as input, it controls the pulse width (duty ratio) according to the magnitude of the input error amplifying signal in such a way that it boosts the charge current Ic when the charge current I is smaller than the charge current reference value Iref but lowers the charge current Ic when the charge current I is larger than charge current reference value Iref so that consequently the charge operation is conducted in a constant current mode (CC mode) for controlling the charge current and keeping it to a constant level according to the charge current reference value Iref. The converter section 602 may be adapted to operate not only for PWM but also for PFM (pulse frequency modulation) and PAM (pulse amplitude modulation).

The input voltage signal generation circuit 607 is typically formed by an error amplifying circuit adapted to detect the voltage of the solar cells 601 that is the charge power source, or the input voltage Vi, input it as an object of control, compares it with voltage reference value Vref (in) set in advance by the input voltage reference value setting circuit and output an error amplifying signal for the difference. The output value of the error amplifying signal output from the input voltage signal generation circuit 607 is small when the object of control, or the input voltage Vi, is smaller than the voltage reference value Vref(in) but large when the object of control, or the input voltage Vi, is larger than the voltage reference value Vref (in). As the converter section 602 receives the error amplifying signal as input, it controls the charge current in such a way that it lowers the charge current I when the input voltage Vi is smaller than the input voltage reference value Vref (in) but boosts the charge current I when the input voltage Vi is larger than the input voltage reference value Vref(in) so that consequently the charge operation is conducted in an input constant voltage mode ("constant voltage control mode" to be more accurate) for controlling the charge current.

The charge voltage signal generation circuit 609 is typically formed by an error amplifying circuit adapted to detect the charge voltage Vc of the capacitor section 603, input it as an object of control, compares it with voltage reference value Vref(out) set in advance by the charge voltage reference value setting circuit and output an error amplifying signal for the difference. The output value of the error amplifying signal output from the charge voltage signal generation circuit 609 is large when the object of control, or the charge voltage Vc, is smaller than the voltage reference value Vref(out) but small when the object of control, or the input voltage Vc, is larger than the voltage reference value Vref (out). As the converter section 602 receives the error amplifying signal as input, it controls the charge current according to the magnitude of the input error amplifying signal in such a way that it boosts the charge current I when the input voltage Vc is smaller than the voltage reference value Vref(out) but lowers the charge current I when the charge voltage Vc is larger than the input voltage reference value Vref(out) so that consequently the charge operation is conducted in a constant voltage mode (CV mode) for controlling the charge current mainly in order to prevent an overcurrent of the capacitors.

The diodes D1, D2, D3 are connected to the input of the converter section 602 respectively from the input voltage signal generation circuit 607, the charge current signal generation circuit 608 and the charge voltage signal generation circuit 609 with the polarities of the inverse directions to form a logical OR circuit that inputs the smallest error amplifying signal out of the error amplifying signals output from the input voltage signal generation circuit 607, the charge current signal generation circuit 608 and the charge voltage signal generation circuit 609.

The maximum power point search section 6010 typically comprises a microcomputer, a non-volatile memory means for operating the microcomputer and a writable memory means for temporarily storing data and is adapted to generate a sweep signal S for sweeping the charge current reference value Iref, a function suspension signal FI for temporarily suspending the function of the charge current signal generation circuit 608 and a function suspension signal FV for temporarily suspending the function of the charge voltage signal generation circuit 609, read in the detection current from the current detecting section 606 and determine the maximum power point of the solar cells 601 according to the read in detection current in a manner as will be described hereinafter. The input voltage reference setting circuit Vref (in) receives the sweep signal S to sweep the Vi from 0 to a predetermined voltage value. During the sweep, the maximum power point search section 6010 outputs function suspension signals FI, FV. Both the function suspension signal FV input to the charge voltage signal generation circuit 609 and the function suspension signal FI input to the input current signal generation circuit 608 are signals sufficiently larger than the respective error amplifying signals output from the input voltage signal generation circuit 607 so that only the input voltage signal generation circuit 607 is allowed to operate for an output that can protect the capacitor section 603.

Now, the principle of this embodiment of a charging apparatus for a capacitor storage type power source according to the present invention and having the above-described configuration will be described below. The power conversion efficiency η has the following relationships with the output power of the solar cells: $Ppv = Vi \times Ii$ and the power charged in the capacitor section 2: $Pca = Vc \times Ic$.

Namely, from $Ppv \times \eta = Pca$ $$Vi \times Ii \times \eta = Vc \times Ic \qquad (1).$$

Since the voltage Vc of the capacitor section does not change sharply, it can be regarded to be substantially constant for a short period of time. On this assumption, the maximum power point of the solar cells 601 is the solar cell output voltage Vi where Ic shows the largest value.

On the basis of the above-described principle, the operation of this embodiment of a charging apparatus for a capacitor storage type power source will be described below. Note that the operation that is described below is realized as the charging apparatus cooperates with the writable memory means according to an operation command written in the non-volatile memory means. Also note that the means for causing the maximum power point search section 6010 to perform the following operation may not necessarily be a microcomputer and any equivalent means may alternatively be used for the purpose of the present invention. Assume here that the routine for determining the maximum power point of the solar cells is executed once in every predetermined period of time by the maximum power point search section 6010. The maximum power point search section 6010 generates a function suspension signal FI for temporarily suspending the function of the charge current signal generation circuit 608 and a function suspension signal FV for temporarily suspending the function of the charge voltage signal generation circuit 609. Thus, as the input voltage signal generation circuit 609 receives these signals, it outputs a signal that is sufficiently large if compared with the error amplifying signals so as to apparently suspend the functions of the charge current signal generation circuit 608 and the charge voltage signal generation circuit 609 and allows only the input voltage signal generation circuit 607 to operate. At this time, the maximum power point search section 6010 generates a sweep signal S and adjusts the input voltage reference value setting circuit Vref(in) so as to sweep the Vi from 0 to a predetermined voltage value Vo. At the same time, the maximum power point search section 6010 reads in and stores the detection current from the current detecting section 606. In other words, it acquires a pair of data (Vi–Ic) at each of the points arranged at regular intervals while sweeping Vi from 0 to a predetermined voltage value Vo. The value of Vi that gives the largest value for Ic is selected as the voltage that produces the maximum power point of the solar cells 601. Then, the maximum power point search section 6010 sets the determined value of Vref(in) that gives the above value of Vi in the input voltage reference value setting circuit. Since the maximum power point of the solar cells 601 can be shifted, the maximum power point search section 6010 has the above described sweep operation repeated when a predetermined time period elapses or when the charge current Ic fluctuates beyond a predetermined value.

Now, the advantages of the operation of this embodiment of a charging apparatus for a capacitor storage type power source according to the present invention will be described below. As may be clear from the formula (1) above, the maximum power point is detected by means of the product of multiplication of the output of the solar cells and the power conversion efficiency η. With this technique of determining the maximum power point of the present invention, it is possible to determine the maximum power point of the solar cells 601, taking the power conversion efficiency η of the converter section 602 in consideration. The output of the solar cells 601 falls by the magnitude of a digit in a cloudy or raining weather where the sunlight is reduced if compared with the output when it is fine. In such a weather condition, the efficiency of the power conversion circuit such as the converter section is aggravated considerably when the solar cells operate at a low output level. Therefore, a charging apparatus for a capacitor storage type power source according to the present invention that is adapted to detect the maximum power point at the side charging the capacitor section 2 by way of a power conversion circuit is very advantageous if compared with an arrangement for detecting the maximum power point only by computing the output of the solar cells because it reflects the efficiency of the power conversion circuit. It should be noted here that, when the output is smaller by the magnitude of a digit, the output current of an ordinary power conversion circuit falls below the idling current level and the input power may not be converted to the output side. This embodiment provides an additional advantage of simplifying the circuit configuration because it does not need to detect the power by multiplying Vc and Ic so that the computational operations of the embodiment are simple and easy.

Figure 44:
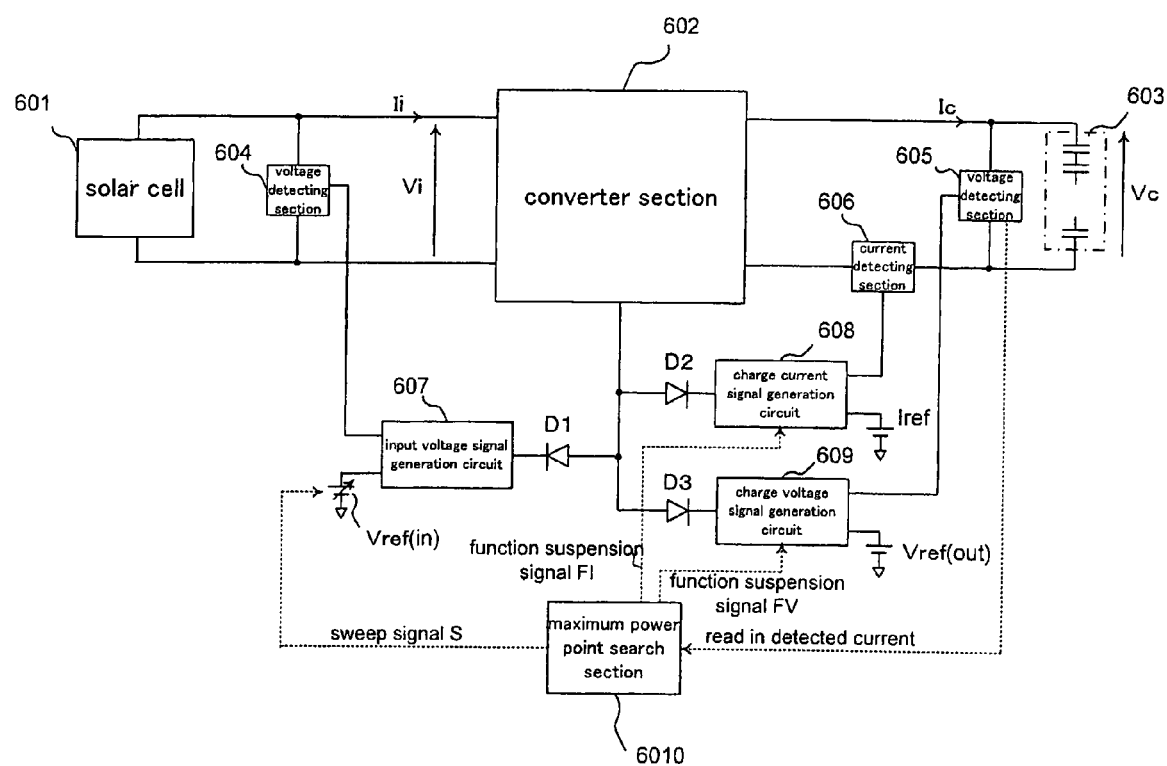
FIG. 44 is a schematic block diagram of an embodiment of a charging apparatus for a capacitor storage type power source according to the present invention.
Figure 45:
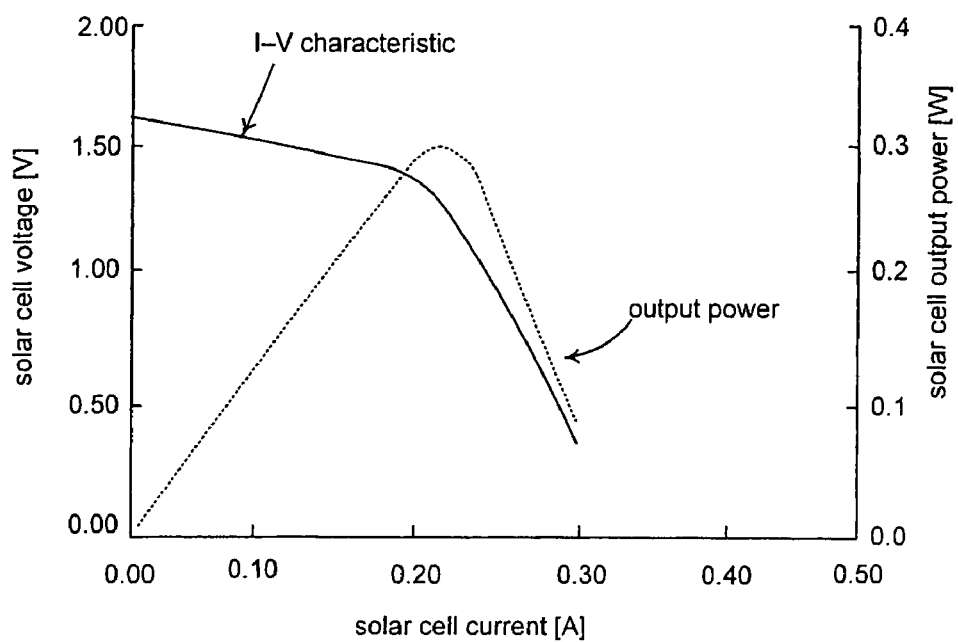
FIG. 45 is a graph illustration the relationship of the output current, the output voltage and the output power of a solar cell.

Now, the principle of this embodiment of a charging apparatus for a capacitor storage type power source according to the present invention will be described below. FIG. 44 is a schematic block diagram of an embodiment of a charging apparatus for a capacitor storage type power source according to the present invention. This embodiment differs from the above described embodiment in that the detected value of the current detecting section 606 is not read in but the detected value of the voltage detecting section 605 is read in for the maximum power point. Otherwise, this embodiment is identical with the immediately preceding embodiment.

Now, the principle of the embodiment of a charging apparatus for a capacitor storage type power source having the above described configuration will be described below. If the electrostatic capacity of the capacitor section 602 is C, the change of the voltage of the capacitor section 602 is the difference between the capacitor voltage Vc1 at time t1 when a measurement is started and the capacitor voltage Vc2 at time t2 when the measurement is terminated. Thus, duration of the measurement, or the measurement time, is expressed by $\Delta t = t2-t1$ and the charge efficiency of the capacitor section 2 is assumed to be ηca.

The capacitor voltage when the capacitor section is charged for the measurement time $\Delta t$, changing the voltage Vi of the solar cells, satisfies the requirement of $Ppv \times \Delta t \times \eta \times \eta ca = 0.5 \times C \times \{(Vc2)^2 - (Vc1)^2\}$. Thus, $$Vi \times Ii \times (t2-t1) \times \eta \times \eta ca = 0.5 \times C \times \{(Vc2)^2 - (Vc1)^2\} \qquad (2)$$

Since formula (2) includes the capacitor charge efficiency ηca in addition to the power conversion circuit η of the converter section 602 of (1), it is possible to determine the maximum power point of the solar cells 601 by means of the quantity of energy stored in the capacitor section 602. In this embodiment, the solar cell voltage Vi that maximizes $\Delta Vc$ is determined and defined as maximum power point. Since this embodiment does not involve the current detecting operation that uses the formula (1) and only requires the capacitor voltage to be measured, there can be cases where this embodiment can control the charge operation more accurately. Thus, this embodiment provides a charging apparatus for a capacitor storage type power source that is suitable for electrically charging a capacitor section having a relatively small capacity.

Now, on the basis of the above described principle, the operation of this embodiment of a charging apparatus for a capacitor storage type power source will be described below. Note that the operation that is described below is realized as the microcomputer in the maximum power point search section 6010 cooperates with the writable memory means according to an operation command written in the non-volatile memory means. Also note that the means for causing the maximum power point search section 6010 to perform the following operation may not necessarily be a microcomputer and any equivalent means may alternatively be used for the purpose of the present invention.

Assume here that the routine for determining the maximum power point of the solar cells is executed once in every predetermined period of time by the maximum power point search section 6010. The maximum power point search section 6010 generates a function suspension signal FI for temporarily suspending the function of the charge current signal generation circuit 608 and a function suspension signal FV for temporarily suspending the function of the charge voltage signal generation circuit 609. Thus, as the input voltage signal generation circuit 607 receives these signals, it outputs a signal that are sufficiently large if compared with the error amplifying signals so as to apparently suspend the functions of the charge current signal generation circuit 608 and the charge voltage signal generation circuit 609 and allows only the input voltage signal generation circuit 607 to operate. At this time, the maximum power point search section 6010 generates a sweep signal S and adjusts the input voltage reference value setting circuit Vref(in) so as to sweep the Vi from 0 to a predetermined voltage value Vo. The sweep of the Vi from 0 to a predetermined voltage Vo is made to be linearly proportional to the time t.

At the same time, the maximum power point search section 6010 reads in and stores the detection voltage from the voltage detecting section 5. In other words, it acquires a pair of data (Vi–ΔVc) at each of the points arranged at regular intervals while sweeping Vi from 0 to a predetermined voltage value Vo. The value of Vi that gives the largest value for ΔVc is selected as the voltage that produces the maximum power point of the solar cells 601. Then, the maximum power point search section 6010 sets the determined value of Vref(in) that gives the above value of Vi in the input voltage reference value setting circuit. Since the maximum power point of the solar cells 601 can be shifted, the maximum power point search section 6010 has the above described sweep operation repeated when a predetermined time period elapses.

Now, the advantages of the above-described first embodiment will be summarized below.

It is possible to detect the maximum power point only by detecting the current or the voltage of the capacitor side.

It is possible to detect the maximum power point that includes the efficiency of the power conversion circuit such as the converter section (with the function of following the maximum power point in a controlled manner).

Additionally, with the second embodiment, it is possible to detect the maximum power point that includes both the efficiency of the power conversion circuit and the charge efficiency of the capacitor section.

The efficiency can fall remarkably when there is substantially no input to the power conversion circuit. However, according to the present invention, the efficiency is excellent when the output of the solar cells is low because it is possible to detect the maximum power point that includes the efficiency of the power conversion circuit.

While most known electric cells can display the power charged in the cell, it is not possible to confirm the power actually charged in the cell. For example, when a lead accumulator is electrically charged at an ambient temperature of about 0° C., the rate of the chemical change that takes place falls dramatically if the charge current is flowing (a condition expressed as inactivated) so that the accumulated energy is far less than the product of multiplication of the flowing electric current and the duration of the flow of the electric current. In short, the charge efficiency falls remarkably. On the other hand, when a capacitor is used as a charging element, it is possible to electrically charge the element and observe the accumulated energy accurately because the element does not involve any chemical reaction. Thus, it is possible to build a natural energy source that can accurately display the accumulated electric energy and provide the above listed advantages by using a charging apparatus for a capacitor storage type power source according to the present invention.

While the sweep operation of this embodiment is controlled by a microcomputer in the above description, it is not necessary to use a microcomputer so long as it is possible to realize such a sweep operation as described above.

While the maximum power point search section 6010 of the above-described embodiment searches for the maximum power point by sweeping the Vi, it may alternatively be so arranged as to detect the maximum power point by sweeping the Ii.

Figure 46:
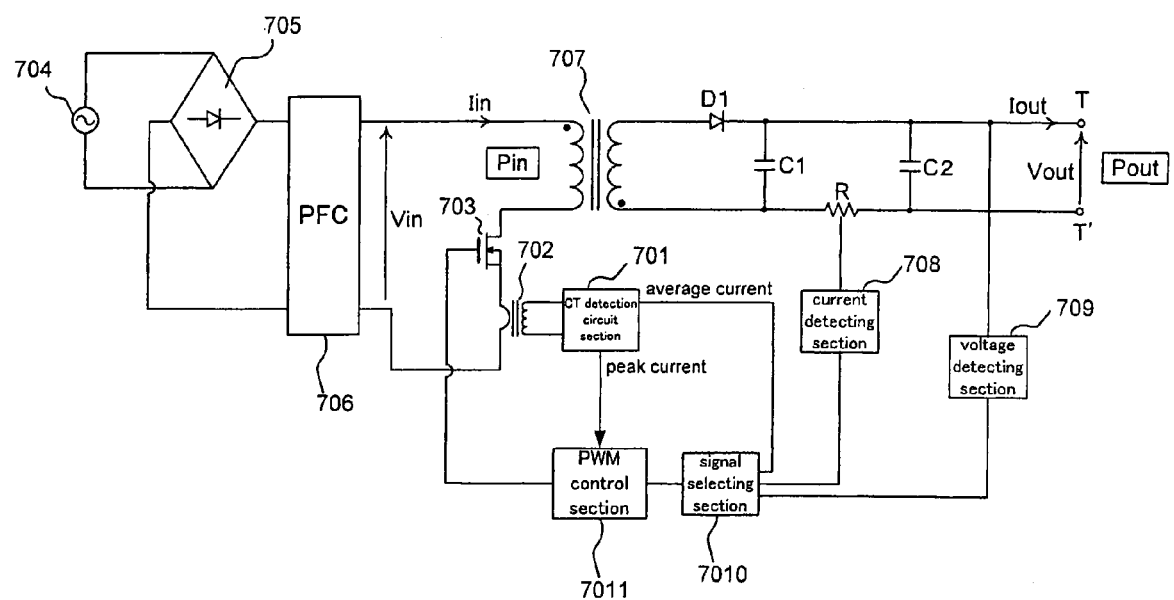
FIG. 46 is a schematic block diagram of an embodiment of a charging apparatus for a capacitor storage type power source according to the present invention.

(A seventh aspect of the invention) Now, another embodiment of the present invention will be described by referring to the related drawing. FIG. 46 is a schematic block diagram of an embodiment of a charging apparatus for a capacitor storage type power source according to the present invention. FIG. 46 shows a CT detection circuit section 701, a current transformer (CT) 702, a switching element 703, an AC power source 704, a total wave rectifier circuit 705, a power factor correction circuit (PFC) 706, a transformer 707, a current detecting section 708, a voltage detecting section 709, a signal selecting section 7010, a PWM control section 7011, a diode D1, capacitors C1, C2 and a resistor R.

For example, the current from the AC power source 704 that may be a commercial power source is rectified by the total wave rectifier circuit 705 and then input to the power factor correction circuit (PFC) 706. The power factor is the quotient obtained by dividing the effective power by the apparent power and expressed by W/(V×I). In the case of a direct current, the power factor is necessarily equal to 1 and hence no power factor correction circuit is required. However, a power factor correction circuit is generally provided when an AC power source 704 is used. The power factor correction circuit (PFC) 706 can be controlled so as to make the downstream Vin show a constant voltage value. Then, the Vin is applied to the primary side winding of the transformer 707. The switching element 703 that is typically formed by FET turns on/off the electric current that flows to the primary side winding of the transformer 707 to induce a switching signal at the secondary side. The switching converter that is used in a charging apparatus for a capacitor storage type power source according to the present invention is adapted to store magnetic excitation energy in the winding of the transformer when the switching element 703 is turned on and discharge magnetic excitation energy when the switching element 703 is turned off. The induced voltage is rectified and smoothed at the output side of the switching converter (the secondary side of the transformer) by the diode D1 and the capacitors C1, C2 so that a DC voltage is supplied between the terminals T-T' of the charging apparatus for a capacitor storage type power source.

The PWM control section 7011 controls the on/off operation of the switching element 703 to control the output of the switching converter. A charging apparatus for a capacitor storage type power source according to the present invention is adapted to operate in any of three charge modes including a constant voltage mode (CV mode), a constant current mode (CC mode) and a constant power mode (CP mode). The signal from the voltage detecting section 708 is input to the PWM control section 7011 by way of the signal selecting section 7010 in a constant voltage mode (CV mode) and the signal from the current detecting section 708 is input to the PWM control section 7011 by way of the signal selecting section 7010 in a constant current mode (CC mode), whereas the average value signal from the CT detection circuit section 701 is input to the PWM control section 7011 by way of the signal selecting section 7010 in a constant power mode (CP mode). The CT detection circuit section 701 comprises a circuit for detecting the peak current of the primary side of the transformer 707 in order to prevent an overcurrent from flowing through the primary side of the transformer. Due to the overcurrent prevention feature of the primary side of the transformer 707, the PWM control section 7011 can stop the switching operation of the switching element 703 when the peak current signal is input from the CT detection circuit section 701 to the PWM control section 7011 and if an overcurrent is about to flow. An optical coupling arrangement may be made between the signal selecting section 7010 and the current detecting section 708 and between the signal selecting section 7010 and the voltage detecting section 709, considering the insulation between the primary side and the secondary side of the transformer.

The current transformer (CT) 702 is basically to detect the electric current flowing through the primary side of the transformer. Therefore, the primary side of the current transformer 702 is connected to the primary side of the transformer 707 in series by way of the switching element 703 and to the CT detection circuit section 701. The CT detection circuit section 701 outputs a signal that is proportional to the average current value and a signal that is proportional to the peak current value of the primary side of the transformer 707.

Now, the constant power mode (CP mode) of a charging apparatus for a capacitor storage type power source according to the present invention will be described below. Referring to FIG. 46, the capacitors (not shown) are connected between the terminals T-T' of the charging apparatus for a capacitor storage type power source and electrically charged. Assume here that the voltage of the charging apparatus for a capacitor storage type power source is Vout, the current that flows into the capacitors is Iout and the power supplied to the capacitors is Pout. Also assume here that the output voltage of the power factor correction circuit (PFC) 706 (which is the voltage input to the transformer 707) is Vin and the current flowing into the transformer is Iin and the power supplied to the transformer 707 is Pin.

With the technique that is generally used for the charging apparatus to operate in a constant power mode (CP mode), Pout that is the product of multiplication of Vout and Iout is monitored and fed back to keep it to a constant level. However, with a charging apparatus for a capacitor storage type power source according to the present invention, feedback control is employed only in the constant voltage mode (CV mode) and the constant current mode (CC mode) and no feedback control is used for the control operation in the constant power mode (CP mode). The concept that lies under this arrangement will be described below.

If the efficiency of the switching converter of a charging apparatus for a capacitor storage type power source is η, the relationship between Pout and Pin is expressed as $$Pout = \eta \times Pin.$$

When η is assumed to be a constant, it is only necessary to realize Pin=(constant) for establishing Pout=(constant). If the operation is not required to be highly rigorously accurate in a constant power mode, it may be safe to assume that η is constant. Pin is expressed as $$Pin = Vin \times Iin$$

and since the power factor correction circuit (PFC) 6 can perform a control operation for establishing Vin=(constant), it is only necessary for a charging apparatus for a capacitor storage type power source according to the present invention to perform a control operation for establishing Iin=(constant) in order to realize Pin=(constant).

For the control operation to establish Iin=(constant), it is necessary to monitor not an instantaneous current value of Iin but the average current value. In a charging apparatus for a capacitor storage type power source according to the present invention, the CT detection circuit section 701 takes out a signal that is proportional to the average current value of Iin according to the input from the current transformer (CT) 702.

Figure 47:
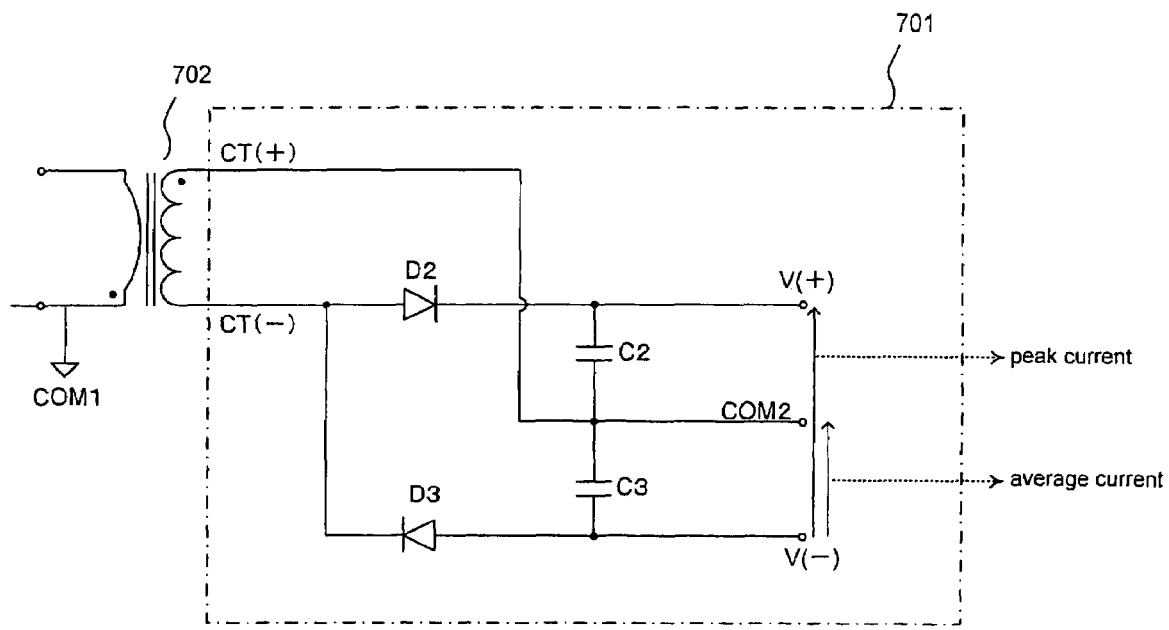
FIG. 47 is a circuit diagram of the CT detection circuit section of an embodiment of a charging apparatus for a capacitor storage type power source according to the present invention.

Now, the CT detection circuit section of this embodiment of a charging apparatus for a capacitor storage type power source according to the present invention will be described below. FIG. 47 is a circuit diagram of the CT detection circuit section of this embodiment of a charging apparatus for a capacitor storage type power source. FIG. 47 shows diodes D2, D3 for current rectification and peak holding capacitors C2, C3. As shown in FIG. 47, one of the terminals of the current transformer 2 is CT(+) and the other terminal is CT(−). The terminals V(+), V(−) and COM2 are defined as shown in FIG. 47. Since no DC component appears at the secondary side of the current transformer 2, the average voltage value of the secondary side of the current transformer 2 appears at the COM2 that is the middle point of V(+) and V(−).

Figure 48:
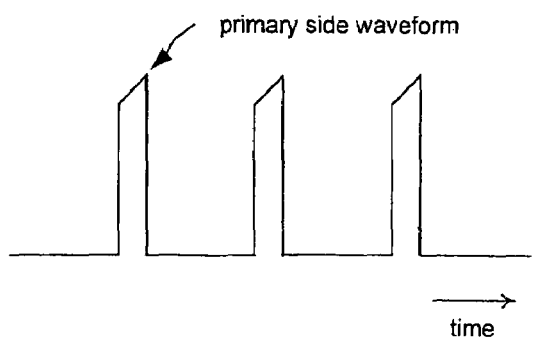
FIG. 48 is a graph illustrating the waveform of the electric current flowing at the primary side of the current transformer (CT) of a charging apparatus for a capacitor storage type power source according to the present invention.
Figure 49:
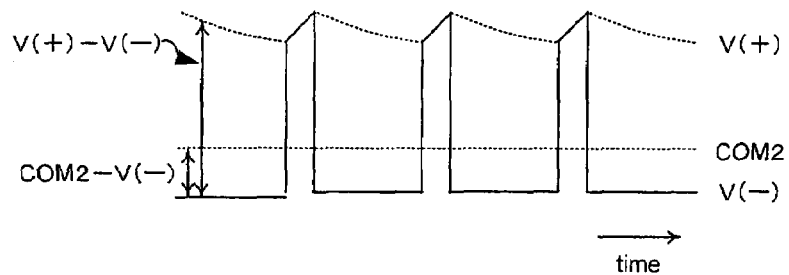
FIG. 49 is a graph illustrating the waveform of the voltage between the terminals of the CT detection circuit section of a charging apparatus for a capacitor storage type power source according to the present invention.
Figure 50:
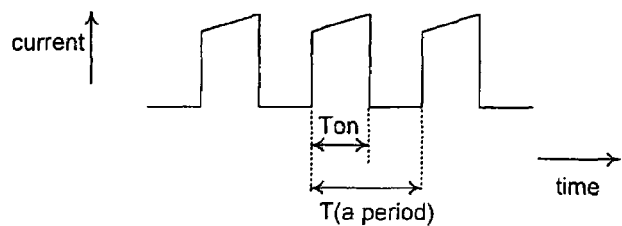
FIG. 50 is a graph illustrating the waveform of the electric current generated at the primary side of the transformer of a switching converter.
Figure 51:
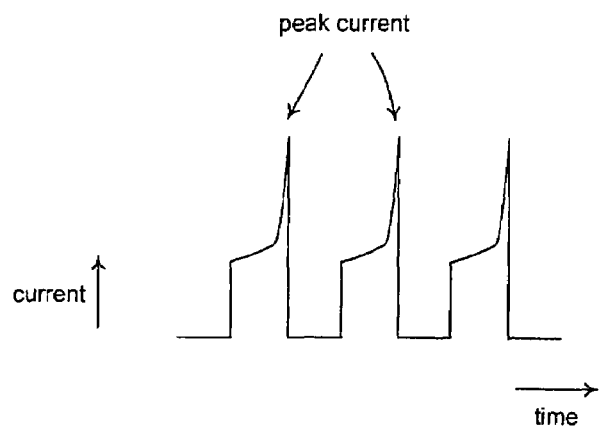
FIG. 51 is a graph illustrating the waveform of the electric current generated at the primary side of the transformer of a switching converter when magnetic saturation appears in the core of the transformer.

FIG. 48 is a graph illustrating the waveform of the electric current flowing at the primary side of the current transformer (CT) of a charging apparatus for a capacitor storage type power source according to the present invention. FIG. 49 is a graph illustrating the waveform of the voltage between the terminals of the CT detection circuit section of a charging apparatus for a capacitor storage type power source according to the present invention. It is possible to observe at the secondary side of the current transformer 2 the waveform of a current that is similar to that of the current flowing through the primary side thereof. Since the average voltage value of the secondary side of the current transformer 2 appears at COM2, it is possible to take out a voltage value that is proportional to the peak current of Iin from between V(+) and −V(−) terminals and the voltage value that is proportional to the average current of Iin from between COM2 and −V(−) terminals.

The voltage that is proportional to the peak current of Iin that is taken out from between V(+) and −V(−) terminals is input to the PWM control section 7011. When the voltage rises above a predetermined value (for example, when Iin becomes an overcurrent), the PWM control section 7011 suspends the on/off operation of the switching element 703 to control the peak current that flows at the primary side of the transformer 707.

On the other hand, the voltage that is proportional to the average current of Iinn that is output from between COM2 and −V(−) terminals is input to the PWM control section 7011 by way of the signal selecting section 7010. The PWM control section 7011 performs a constant power operation according to the above-described principle, referring to the voltage (and hence the average current of Iin) in a constant power mode (CP mode).

In this way, with this embodiment of a charging apparatus for a capacitor storage type power source according to the invention, it is possible to detect the average current flowing through the primary side of the transformer 707 and, at the same time, the peak current flowing through the primary side of the transformer 707 by utilizing the current transformer 2 and the CT detection circuit section 701 so that it is not necessary to arrange two independent circuits for detecting the average current and the peak current. Thus, this embodiment provides an advantage of a simple circuit configuration and that of cost reduction.

Figure 52:
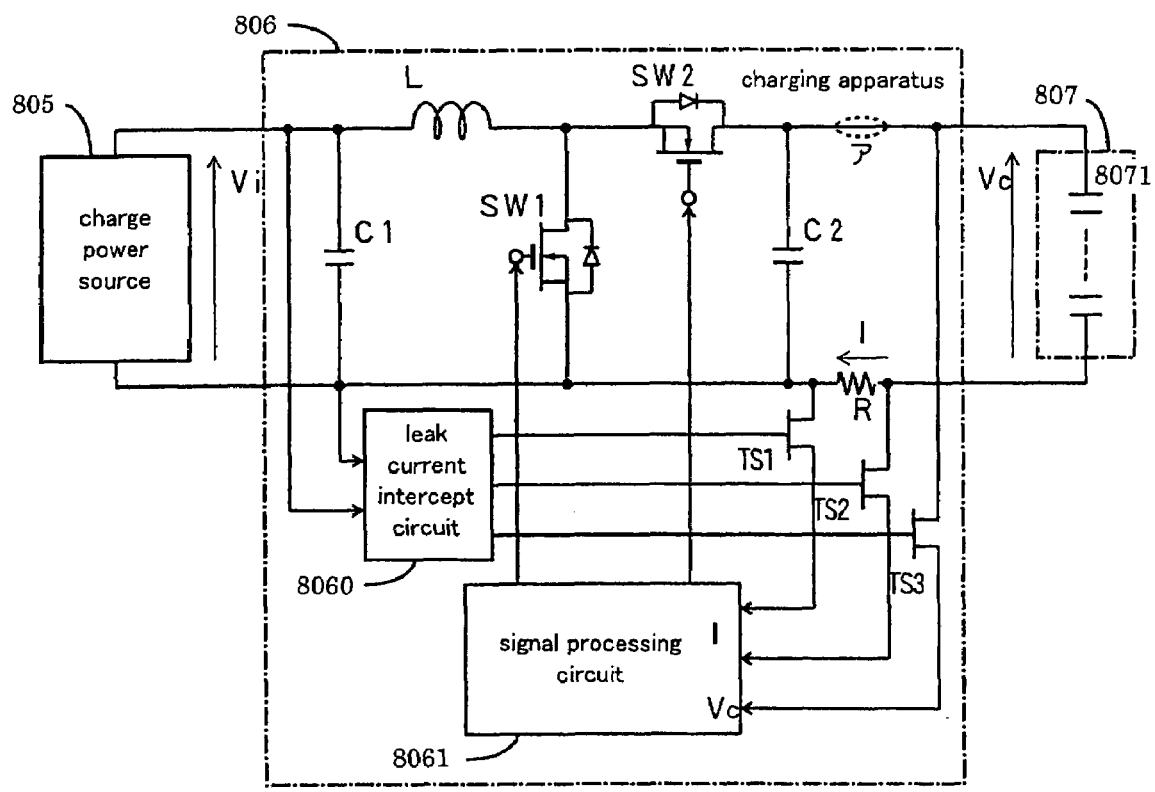
FIG. 52 is a circuit diagram of the main circuit of an embodiment of a charging apparatus for a capacitor storage type power source according to the present invention.
Figure 53:
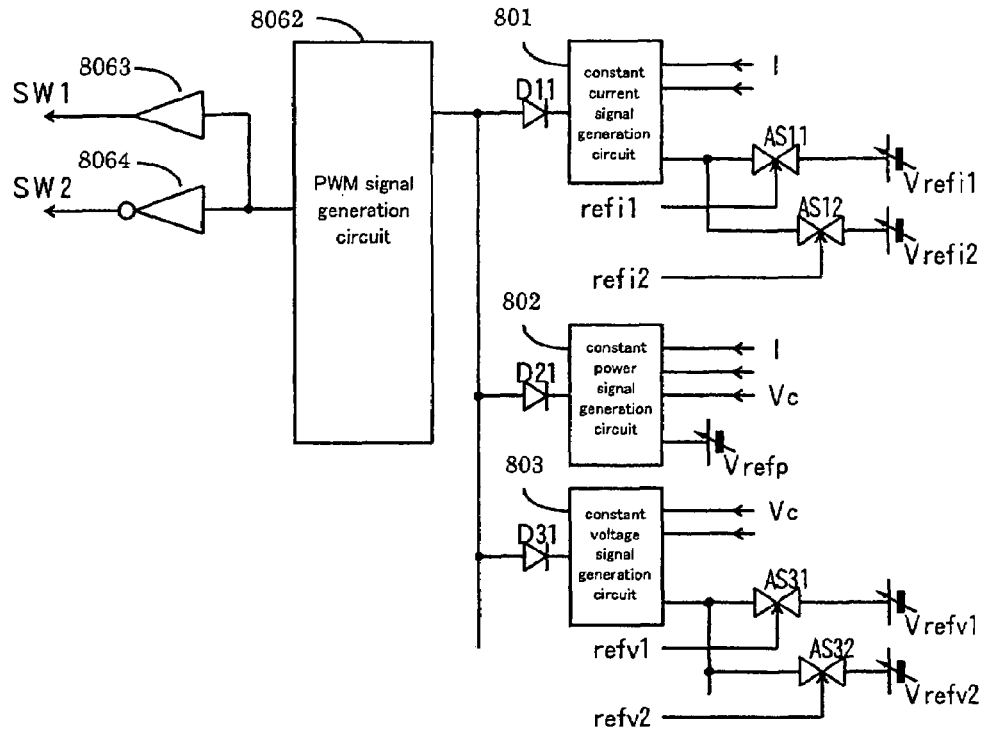
FIG. 53 is a circuit diagram of the signal processing circuit of an embodiment of a charging apparatus for a capacitor storage type power source according to the present invention.

(An eighth aspect of the invention) Now, another embodiment of the present invention will be described by referring to the related drawings. FIG. 52 is a circuit diagram of the main circuit of an embodiment of a charging apparatus for a capacitor storage type power source according to the present invention. FIG. 53 is a circuit diagram of an embodiment of signal processing circuit of the charging apparatus for a capacitor storage type power source according to the present invention. Since a discharging apparatus has a circuit configuration substantially the same as a charging apparatus only except that the charge power source of the charging apparatus is replaced by a capacitor storage power source and the capacitor storage power source of the charging apparatus is replaced by a load, the embodiment will be described in terms of the charging apparatus. The drawings show a constant current signal generation circuit 801, a constant power signal generation circuit 802, a constant voltage signal generation circuit 803, a charge power source 805, a charging apparatus 806, a capacitor storage type power source 807, a leak current intercept circuit 8060, a control circuit 8061, a PWM signal generation circuit 8062, an amplifier 8063, an inverted amplifier 8064, an electric double layer capacitor 8071, analog switches AS11, AS12, AS21, AS22, capacitors C1, C2, diodes D11, D21, D31, a coil L, a current detecting resistor R, a main switching circuit SW1, a synchronous rectifier circuit SW2, signal intercept switches TS1 through TS3, current reference value setting circuits Vrefi1, Vrefi2, a power reference value setting circuit Vrefp, voltage reference value setting circuits Vrefv1, Vrefv2, a charge current I, a charge voltage Vc and an input voltage Vi.

The charging apparatus for a capacitor storage type power source of this embodiment of FIG. 52 is adapted to electrically charge a capacitor storage type power source 807 formed by connecting a plurality of electric double layer capacitors 8071 in series from a charge power source of solar cells 805 by way of the charging apparatus 806 and store electric energy in them. The charging apparatus 806 comprises a voltage-boosting type switching converter that is formed by connecting the charge controlling choke coil L and the synchronous rectifier circuit SW2 in series between the charge power source 805 and the capacitor storage type power source 807, also connecting the main switching circuit SW1 to the series connection point of them in parallel, and connecting the smoothing capacitors C1, C2 in parallel between the input side and the output side. Additionally, a current detecting resistor R is inserted and connected in series in order to detect the charge current I.

The signal processing circuit 8061 is to control the charge current by turning on/off the main switch circuit SW1 and the synchronous rectifier circuit SW2 at phases inverse to relative to each other according to on/off control signals. For this purpose, the signal processing circuit 8061 detects the charge current I and the charge voltage Vc, compares them as objects of control with respective reference values defined for control purposes and generates and outputs on/off control signals according to the error amplifying signals produced as a result of the comparisons. The on/off control signals are modulated for the pulse width depending on the charge mode in effect, which may be a constant current mode, a constant power mode or a constant voltage mode. More specifically, as shown in FIG. 53, the signal processing circuit 8061 includes a constant current signal generation circuit 801, a constant power signal generation circuit 802, a constant voltage signal generation circuit 803 and a PWM signal generation circuit 8062. The circuits (1 through 3) for generating error amplifying signals respectively compare the reference values set by the current reference value setting circuit Vrefi1 or Vrefi2, the constant power reference value setting circuit Vrefp, the constant voltage reference value setting circuit Vrefv1 or Vrefv2, with the detection signals of the charge current I and the charge voltage Vc and the signals that are obtained as signals of objects of control by computations on these signals (e.g., the charge power P obtained by multiplication of I and Vc) to output error amplifying signals. Then, the output error amplifying signals are input to the PWM signal generation circuit 8062 by way of a logical OR formed by diodes D11, D21, D31. The PWM signal generation circuit 8062 generates an on/off control signal (PWM signal) that is modulated for the pulse width. The PWM signal is output to the main switching circuit SW1 and the synchronous rectifier circuit SW2 respectively by way the amplifier 8063 and the inverting amplifier 8064.

When the capacitor storage type power source 807 is charged to the full charge voltage and in a standby state and produces a leak current, the accumulated electric power is discharged with time as heat to give rise to a large loss of energy. For example, when a charging apparatus of a 30 W level is connected to a capacitor module whose full charge voltage is 60V, a leak current of about 40 mA is produced in reality. Then, the charged and accumulated power can be wasted if the charge/discharge efficiencies are improved by means of constant current charge and a synchronous rectifier circuit. At the first glance, it may seem to be sufficient to intercept such a leak current at point "a" shown in FIG. 52 that is close to the capacitors from which an electric current flows. However, the capacitors show a high output density if compared with a secondary battery and hence high charge/discharge rates to produce an electric current that flows very fast. In other words, a switch for intercepting a leak current can become broken with ease unless the switch allows a large forward current to flow. On the other hand, it is found by looking into the leak current of the charging apparatus that the leak current flows most by way of the signal lines connected to the signal processing circuit 8061. The signal lines are those for detecting the charge current I used by the constant current signal generation circuit 801, the constant power signal generation circuit 802 and the constant voltage signal generation circuit 803 and those for detecting the constant voltage.

The leak current intercept circuit 8060 determines if the charging apparatus is operating for charging electricity or in a charge stand-by state by detecting the input voltage Vi. If it is determined that the charging apparatus is in a charge stand-by state, it operates the signal intercept circuit and breaks the signal lines of the signal processing circuit 8061 that are operating to detect the charge current and the charge voltage. More specifically, the leak current intercept circuit determines if the charge power source for charging the capacitor storage type power source is intercepted or not and hence the charging apparatus is in a stand-by state or not by seeing if the input voltage Vi is being applied and a predetermined voltage is observed or not and intercepts the signal lines of the signal processing circuit 8061 in a stand-by state where the charge power source is intercepted. The signal lines are connected from the signal processing circuit 8061 to the circuit for charging the capacitor storage type power source 807 and include those connected to the output terminal side for the purpose of detecting the charge voltage Vc of the capacitor storage type power source 807 and those connected between the opposite terminals of the current detecting resistor R for the purpose of detecting the charge current I. The signal intercept switches TS1 through TS3 are connected in series to the respective signal lines as signal intercept circuits for intercepting the corresponding signals. The signal intercept switches TS1 through TS3 are typically formed by using semiconductor elements such as FETs or NPN (PNP) transistors.

Referring to FIG. 53, the constant current signal generation circuit 801 is formed by an error amplifying circuit that takes out the voltage fall between the terminals of the current detecting resistor R inserted and connected in series to the charging apparatus as detection signal of the charge current I, inputs it as an object of control, compares it with the current reference value Vrefi set in the current reference value setting circuit as the reference value of a comparator and outputs an error amplifying signal thereof. Thus, the output value of the error amplifying signal output from the constant current signal generation circuit 801 is large when the charge current I that is input as an object of control is smaller than the current reference value Vrefi but small when the charge current I is larger than the current reference value Vrefi. As the error amplifying signal is input to the PWM signal generation circuit 8062, the circuit controls the pulse width (duty ratio) according to the magnitude of the error amplifying signal that is input to increase the charge current I when the charge current I is smaller than the current reference value Vrefi but decrease the charge current I when the charge current I is larger than the current reference value Vrefi so that consequently the constant current charge operation is conducted in a control mode CC where the charge current I is controlled so as to be held to a constant level according to the current reference value Vrefi.

Similarly, the constant power signal generation circuit 802 is formed by an error amplifying circuit that inputs the charge power P as an object of control, compares it with the power reference value Vrefp set in the power reference value setting circuit as the reference value of a comparator and outputs an error amplifying signal thereof. Thus, the output value of the error amplifying signal output from the constant power signal generation circuit 802 is large when the charge power P that is the input as an object of control is smaller than the power reference value Vrefp but small when the charge power P is larger than the power reference value Vrefp. As the error amplifying signal is input to the PWM signal generation circuit 8062, the circuit controls the pulse width (duty ratio) according to the magnitude of the error amplifying signal that is input to increase the charge current I when the charge power P is smaller than the power reference value Vrefp but decrease the charge current I when the charge power P is larger than the power reference value Vrefp so that consequently the constant power charge operation is conducted in a control mode CP where the charge current I is controlled so as to hold the charge power P to a constant level according to the current reference value Vrefp.

The diodes D11, D21, D31 are connected to the input of the PWM signal generation circuit 8062 respectively from the constant current signal generation circuit 801, the constant power signal generation circuit 802 and the constant voltage signal generation circuit 803 with the opposite polarities to form a logical OR circuit that inputs the smallest error amplifying signal to the PWM signal generation circuit 8062 out of the error amplifying signals output from the constant current signal generation circuit 801, the constant power signal generation circuit 802 and the constant voltage signal generation circuit 803.

The charge mode switching control operation of the logical OR circuit will be described further below. First, in the initial stages of the charge operation after the start, the diode D11 is turned on while the diodes D21, D31 are held off and a constant current charge operation is conducted in a control mode CC. In other words, when the charge voltage Vc of the capacitor storage type power source 807 is low and hence the PWM signal generation circuit 8062 is performing a constant current charge operation in a control mode CC according to the error amplifying signal output from the constant current signal generation circuit 801 in the initial stages, the object of control of the constant power signal generation circuit 802 and that of the constant voltage signal generation circuit 803 are smaller than the respective reference values to be compared. Therefore, if error amplifying signals having a large value are output from them, neither the charge current I nor the charge voltage Vc of the capacitor storage type power source 807 increases and the error amplifying signals are held close to the respective upper limit values so that the diodes D21, D31 are biased in the opposite directions and held off.

However, as the constant current charge operation is continued, the charge voltage Vc of the capacitor storage type power source 807 increases and the charge power P eventually becomes larger than the power reference value Vrefp of the constant power signal generation circuit 802. Then, the error amplifying signal output from the constant power signal generation circuit 802 becomes smaller than the error amplifying signal output from the constant current signal generation circuit 801. At this moment, the diode D11 that is connected to the output of the constant current signal generation circuit 801 is turned off and the diode D21 connected to the output of the constant power signal generation circuit 802 is turned on so that a constant power charge operation is conducted in a control mode CP where the charge current I is controlled in such a way that the charge power P of the capacitor storage type power source 807 may not exceed the power reference value Vrefp.

As the constant power charge operation is continued, the charge voltage Vc of the capacitor storage type power source 807 rises and eventually becomes higher than the voltage reference value Vrefvc of the constant voltage signal generation circuit 803. Then, the error amplifying signal output from the constant voltage signal generation circuit 803 becomes smaller than the error amplifying signal output from the constant power signal generation circuit 802. At this moment, the diode D21 that is connected to the output of the constant power signal generation circuit 802 is turned off and the diode D31 connected to the output of the constant voltage signal generation circuit 803 is turned on so that a constant voltage charge operation is conducted in a control mode CV where the charge current is controlled in such a way that the charge voltage Vc may not exceed the voltage reference value Vrefvc.

In this way, with the charging apparatus 806 of this embodiment, the charge current I is detected and compared with the predetermined current reference value Vrefi that is set by the current reference value setting circuit so as to keep the charge current I at a constant level (constant current charge: CC). As the capacitor storage type power source 807 is electrically charged to show a predetermined voltage, the charge power P is computed and compared with the predetermined power reference value Vrefp that is set by the power reference value setting circuit so as to keep the charge power P to a constant level (constant power charge: CP). As the capacitor storage type power source 807 is electrically charged to a full charge voltage level, the charge voltage Vc is compared with the predetermined voltage reference value Vrefvc that is set by the voltage reference value setting circuit so as to keep the charge voltage Vc at a constant level (constant voltage charge: CV). In this way, the control modes are selectively used to control the main switch circuit SW1 and the synchronous rectifier circuit SW2 by PWM (pulse width modulation) control.

In the embodiment of FIG. 53, the constant current signal generation circuit 801 can select one of a plurality of current reference value setting circuits Vrefi1 and Vrefi2 by means of analog switches AS11, AS12 and change the selected current reference value while the constant voltage signal generation circuit 803 can select one of a plurality of constant voltage reference value setting circuits Vrefv1 and Vrefv2 by means of analog switches AS31, AS32 and change the reference value.

The selection of the current reference value Vrefi1 or Vrefi2 is realized under the condition that any of the parallel monitors that are connected to the respective electric double layer capacitors 8071 in parallel bypasses the charge current (according to a full charge signal: F signal) while the withstand current upper limit value of the parallel monitors is held low relative to the withstand current upper limit value of the electric double layer capacitors 8071. The analog switch AS11 is held on by means of a selection signal refi1 and the analog switching AS12 is held off by means of a selection signal refi2 until any of the parallel monitors bypasses the charge current so as to electrically charge the electric double layer capacitors 8071 with a large charge current that corresponds to the withstand current upper limit value. However, once the current bypassing operation of any of parallel monitors is detected, the analog switch AS11 is turned off by means of a selection signal refi1 and the analog switch AS12 is turned on by means of a selection signal refi2 so as to select a charge current level lower than the withstand current upper limit value of the parallel monitors. As a result of switching the current reference value, it is possible to reduce the capacity of the parallel monitors and minimize the power loss that can be produced by the bypassing operation after the appearance of a full charge condition.

When a plurality of charging apparatus are operated in parallel and the charging apparatus are controlled so as to output charge currents of the same level, the value of the charge current detected by the master charging apparatus is made to be equal to the current reference value of the slave charging apparatus. In such a case, the analog switch AS11 is turned on by means of selection signal refi1 and the analog switching AS12 is turned off by means of selection signal refi2 in the single master charging apparatus, while the analog switch AS11 is turned off by means of a selection signal refi11 and the analog switch AS12 is turned on by means of a selection signal refi2 in all the slave charging apparatus in order to current the detected value of the charge current taken out from the master charging apparatus as current reference value setting circuit Vrefi2. Then, the plurality of charging apparatus does not operate independently. In this way, the plurality of charging apparatus can be synchronously controlled by selecting one of them as master charging apparatus and selecting the charge current output from the master charging apparatus as current reference value for all the slave charging apparatus. Then, it is possible to increase the entire charge current and charge the capacitor storage type power source at high speed.

The selection of one of the constant voltage reference value setting circuits Vrefv1, Vrefv2 is typically realized by means of external signals (refv1, refv2) such as the output signals of a rated voltage switch. According to an empirical law, when the rated voltage of the electric double layer capacitors 8071 is 5V, empirically the service life of the electric double layer capacitor capacitors 8071 is prolonged by 1.5 times when the operating voltage is lowered by 0.2V from 5V. Thus, the analog switch AS31 is turned on by means of a selection signal refv1 to select the constant voltage reference value Vrefv1 in an ordinary operation mode but the analog switch AS32 is turned on by means of a selection signal refv2 to select the constant voltage reference value Vrefv2 in a longevity operation mode.

Figure 54:
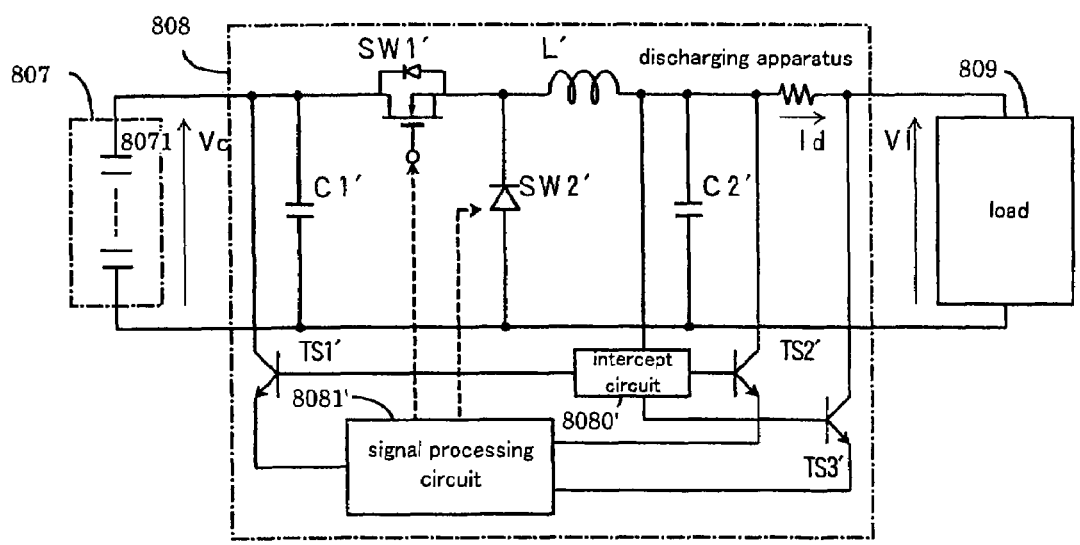
FIG. 54 is a circuit diagram of the main circuit of another embodiment of a charging apparatus for a capacitor storage type power source according to the present invention.

FIG. 54 is a circuit diagram of an embodiment of a discharging apparatus for a capacitor storage type power source according to the present invention. In FIG. 54, there are shown a leak current intercept circuit 80', a signal processing circuit 81', capacitors C1', C2', a coil L', a current detecting resistor R', switching circuits SW1', SW2' and signal intercept switches TS1' through TS3'.

The discharging apparatus illustrated in FIG. 54 comprises a voltage-lowering type switching converter that turns on/off the switching circuit SW1' by means of a PWM signal and turns on/off the synchronous rectifier circuit SW2' at phases inverse relative to each other to supply a discharge current (load current) to a load. The switching converter is formed by connecting a discharge controlling switch circuit SW1' and a choke coil L' in series between the capacitor storage type power source 807 and the load 809 and connecting a synchronous rectifier circuit SW2' to the series connection point of them in parallel, while connecting capacitors C1', C2' in parallel between the input side and the output side and a current detecting resistor R' for detecting the discharge current Id is inserted and connected in series.

The leak current intercept circuit 80' determines if the discharging apparatus is operating for discharging electric current or in a stand-by state by detecting the load voltage Vl. If it is determined that the discharging apparatus is in a stand-by state, it operates the signal intercept circuit and beaks the signal lines of the signal processing circuit 8081' that are operating to detect the discharge current, the capacitor voltage and the load voltage. More specifically, the leak current intercept circuit determines if the main switching circuit that operates for discharging a current is turned off or not and hence if the discharging apparatus is in a stand-by state or not by seeing if the load voltage V1 is being output and a predetermined voltage is observed or not and intercepts the signal lines of the signal processing circuit 81' when the charge voltage V1 is not output and the charging apparatus is in a stand-by state. The signal lines are connected from the signal processing circuit 8081' to the circuit for discharging the capacitor storage type power source 807 and include those connected to the input terminal side for the purpose of detecting the charge voltage Vc of the capacitor storage type power source 807, those connected to the output terminal side for the purpose of detecting the load voltage V1 and those connected between the opposite terminals of the current detecting resistor R' for the purpose of detecting the discharge current Id. The signal intercept switches TS1' through TS3' are connected in series to the respective signal lines as signal intercept circuits for intercepting the corresponding signals.

With each of the embodiments of FIGS. 52 and 54, the charging apparatus can also be used as discharging apparatus and vice versa, although it may be needless to say that the signal processing circuit for the charging apparatus differs from its counterpart for the discharging apparatus. More specifically, in the case of a charging apparatus, the charge current is controlled in any of the predetermined charge control modes (CC, CP) as described earlier by referring to the embodiment of FIG. 52. In the case of a discharging apparatus, the discharge current is controlled in any of the feed control modes of the load. Note that in the embodiments of FIGS. 52 and 54, the synchronous rectifier circuits SW2, SW2' may be replaced by diodes (flywheel diodes). The detection element (current detecting resistor R) for detecting the electric current in a charge operation or discharge operation may be connected to the common line (common grounding line) as in the case of the embodiment of FIG. 52 or the detection element (current detecting resistor R') for detecting the electric current in a charge operation or discharge operation may be connected to the line at the side opposite to the common line as in the case of the embodiment of FIG. 54. With the latter arrangement, the leak current intercept circuit does not need to be considered relative to the common line so that the circuit design can be simplified.

In a charge stand-by state, the switching circuit SW1 is turned off in the embodiment of FIG. 52. In a discharge stand-by state, the switching circuit SW1' is turned off in the embodiment of FIG. 54. Thus, a charge stand-by state or a discharge stand-by state can be determined by seeing the voltage of the circuit for charging or discharging, whichever appropriate, an electric current that is arranged at the side opposite to the side of the connection of the capacitor storage type power source 807 relative to the main switching circuit SW1 or SW1' and the choke coil L or L', whichever appropriate. In other words, if the voltage is nil, it is possible to say that the switching circuit SW1' is turned off and the charge operation or the discharge operation, whichever appropriate, is suspended regardless of the voltage of the capacitor storage type power source.

The present invention is by no means limited to the above-described embodiments, which may be modified in various different ways without departing from the spirit and scope of the invention. For example, while a charge stand-by state or a discharge stand-by state of the charging circuit or the discharging circuit, whichever appropriate, is determined by seeing the voltage of the charging circuit or the discharging circuit arranged at the side opposite to the side of the connection of the capacitor storage type power source in the above described embodiments, such a state can alternatively be determined by seeing the state of a stand-by switch for suspending a charge or discharge operation or a signal for controlling a charge suspending operation or a discharge suspending operation, whichever appropriate. Still alternatively, it may be so arranged that signals are intercepted by means of a leak current intercept circuit when the charge current or the discharge current is lower than a predetermined level as a result of detecting the charge current or the discharge current and determining that a charge stand-by state or a discharge stand-by state, whichever appropriate, is there. While signal intercept switches TS1 through TS3 that are formed by using semiconductor switching elements are inserted and connected in series to signal lines in the above description, signal lines may alternatively be connected/disconnected by means of contacts such as relays that operate at or above a predetermined voltage level.

Figure 55:
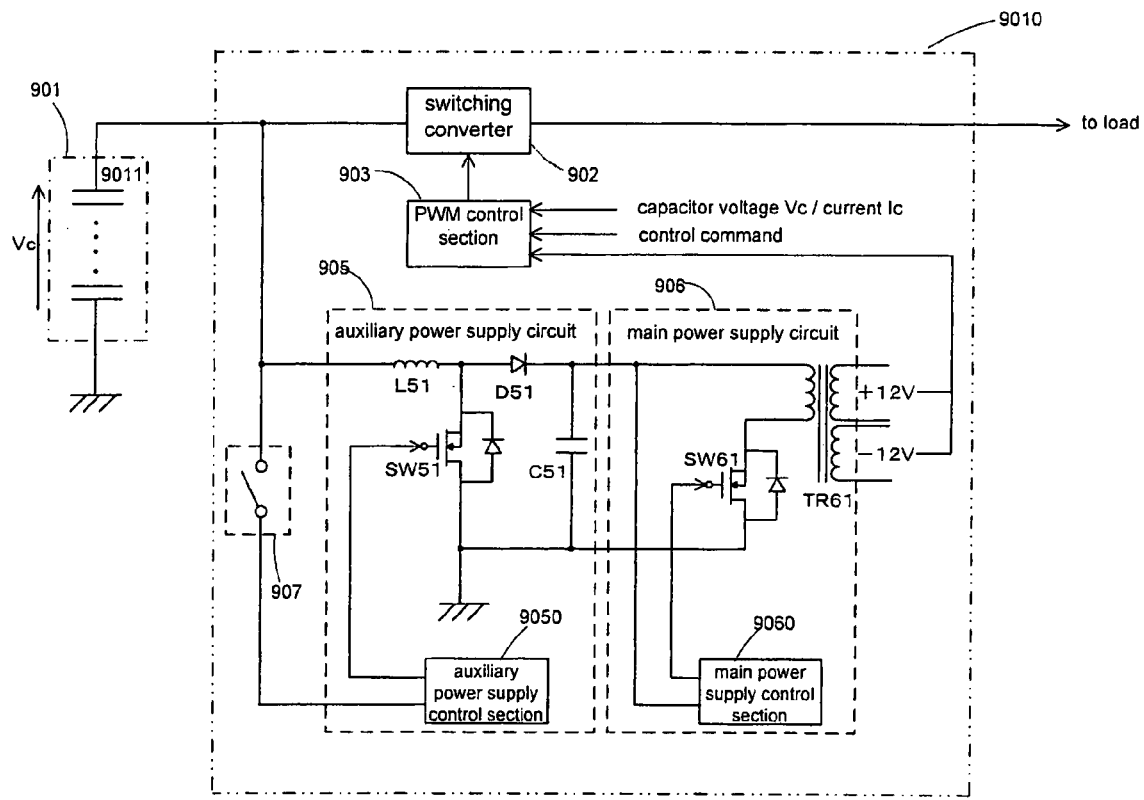
FIG. 55 is a circuit diagram of an embodiment of discharging apparatus for a capacitor storage type power source according to the present invention.

(A ninth aspect of the invention) Now, another embodiment of the present invention will be described by referring to the related drawings. FIG. 55 is a schematic circuit diagram of an embodiment of discharging apparatus for a capacitor storage type power source according to the present invention. In FIG. 55, there are shown a capacitor storage type power source 901, a switching converter 902, a PWM control section 903, an auxiliary power supply circuit 905, a main power supply circuit 906, a voltage boosting operation control circuit 907, a discharging circuit module 9010, electric double layer capacitors 9011, an auxiliary power source supply control section 9050, a main power supply control section 9060, a capacitor C51, a diode D51, a choke coil L51, switching circuits SW51, SW61 and a capacitor voltage Vc.

The discharging apparatus for a capacitor storage type power source illustrated in FIG. 55 comprises a switching converter 902 for turning on/off the electric discharge from the capacitor storage type power source 901 to the load, a PWM control section 903 for controlling on/off operations of the switching converter 902 by means of PWM (pulse width modulation) signals according to control commands, the capacitor voltage Vc and the capacitor current Ic, an auxiliary power supply circuit 905 and a main power supply circuit 906, the auxiliary power supply circuit 905 and the main power supply circuit 906 operating as control power supply circuits for the PWM control section 903. The combined arrangement of the switching converter 902 and the PWM control section 903 operates as power source for a load so that it may be referred to as a main power source. On the other hand, the combined arrangement of the main power supply circuit 906 and the auxiliary power supply circuit 905 operates as a power source for the PWM control section 903 of the main power source so that it may be referred to as an auxiliary power source. In the following description, these combined arrangements may be referred to as "main power source" and "sub power source" respectively. The entire arrangement that includes the "main power source" and the "sub power source" and is enclosed by double-dotted chain lines in FIG. 55 is modularized to form a discharging circuit module 9010. Further, in this specification, the capacitor storage type power source 901 may be referred to as "capacitor module" hereinafter. Such capacitor modules are provided for 16V, 30V, 60V and so on and may be combined selectively and appropriately in response to the request of the client.

The auxiliary power supply circuit 905 operates as auxiliary power source that is operated as auxiliary means for reducing the fluctuations of the capacitor voltage Vc of the electric current fed from the capacitor storage type power source 901 if the capacitor voltage Vc fluctuate to a large extent. After the fluctuations are adjusted so as to be found within a predetermined range by the auxiliary power supply circuit 905, the main power supply circuit 906 stabilizes the voltage typically to +12V or −12V and supplies it to the PWM control section 903 as a control power. The voltage boosting operation control circuit 907 drives the auxiliary power supply circuit 905 to operate when the voltage supplied from the capacitor storage type power source 901 to the main power supply circuit 906 falls. For example, if the full charge voltage of the capacitor voltage Vc is 60V and the voltage boosting operation control circuit 905 determines that the capacitor voltage Vc of the electric current fed from the capacitor storage type power source 901 has fallen below 30V which is half of the full charge voltage, the voltage boosting operation control circuit 907 drives the auxiliary power supply circuit 905 in a voltage boosting mode. As the auxiliary power supply circuit 905 operates in this way, the main power supply circuit 906 is supported by the auxiliary power supply circuit 905 so as to operate efficiently and properly even when the voltage of the capacitor storage type power source 901 falls.

The auxiliary power supply circuit 905 is formed by connecting a choke coil L51 and a switching circuit SW51 in series to the power feed circuit so as to take out the boosted voltage from the series connection point according to the on/off of the switching circuit SW51 by way of the diode D51 to operate as a voltage boosting type switching converter. The auxiliary power supply circuit 905 operates in a voltage boosting mode, when the auxiliary power supply control section 9050 is driven to control the switching circuit SW51 for on/off operations by means of a PWM signal. Thus, as the switching circuit SW51 is turned on, the auxiliary power supply circuit 905 accumulates electric energy in the choke coil L51 and the accumulated energy is added to the voltage of the input side to boost the voltage when the switching circuit SW51 is turned off. When the auxiliary power supply control section 9050 stops operating and the switching circuit SW51 is turned off, the auxiliary power supply circuit 905 operates in a voltage non-boosting mode and the input voltage, or the capacitor voltage Vc, is output to the main power supply circuit 906 by way of the choke coil L51 and the diode D51 without being boosted.

The voltage boosting operation control circuit 907 controls the operation of switching from the voltage boosting mode to the voltage non-boosting mode and vice versa. It determines the input voltage, or the capacitor voltage Vc, and connects the auxiliary power supply control circuit 9050 to the feed circuit when the input voltage is low.

For example, if the full charge voltage of the capacitor voltage Vc is 60V and the voltage boosting operation control circuit 907 determines that the capacitor voltage Vc has fallen but is still above 30V which is half of the full charge voltage, the voltage boosting operation control circuit 907 cuts off the auxiliary power supply control section 9050 from the capacitor storage type power source 901. Thus, the PWM control of the auxiliary power supply control section 9050 is suspended and the auxiliary power supply circuit 905 is made to operate in a voltage non-boosting mode. As the capacitor voltage Vc falls below 30V, the voltage boosting operation control section 907 connects the auxiliary power supply control section 9050 to the capacitor storage type power source 901. As a result, the PWM control of the auxiliary power supply control section 9050 is resumed and the auxiliary power supply circuit 905 is made to operate in a power boosting mode. As the auxiliary power supply circuit 905 is put into a voltage boosting mode, the voltage fall of the capacitor storage type power source 901 is compensated and boosted to efficiently support the main power supply circuit 906 for operation.

When a capacitor storage type power source 901 whose capacitor voltage is originally 16V, the voltage boosting operation control circuit 907 of this embodiment always connects the auxiliary power supply control section 9050 to the capacitor storage type power source 901 so that the auxiliary power supply control section 9050 of the auxiliary power supply circuit 905 is made to operate always for PWM control and hence the auxiliary power supply circuit 905 operates in a voltage boosting mode.

For a capacitor storage type power source 901 of the type under consideration, components may be prepared in advance as modules such as capacitor modules of 16V, 60V and so on for the full charge voltage. Then, the voltage boosting operation control circuit 907 turns the auxiliary power supply circuit 905 on/off according to the voltage of the capacitor storage type power source 901.

In this way, with the above-described embodiment, a single type of discharging circuit module can accommodate capacitor modules of various different voltages so that the capacitor module can be utilized until its voltage falls to about ¼ of the full charge voltage by appropriately connecting or disconnecting the auxiliary power supply circuit of the sub power source. Thus, the power accumulated in the capacitor module can be exploited very efficiently.

The main power supply circuit 906 is a constant voltage power supply circuit that connects a series circuit of the primary winding of the transformer TR61 and the switching circuit SW61 to the output of the auxiliary power supply circuit 905 to control the switching circuit SW61 for on/off so that a rectified and smoothed constant voltage of +12V or −12V may be output from the secondary winding side of the transformer TR61 under the control of the main power supply control section 9060. More specifically, the main power supply control section 9060 detects the input voltage, and controls the switching circuit SW61 for on/off by means of PWM signals. Thus, since the auxiliary power supply circuit 905 is arranged upstream relative to the main power supply circuit 906 and, if the input voltage falls, the auxiliary power supply circuit 905 boosts the voltage, doubling it, so that the main power supply circuit 906 may provide a constant voltage, the auxiliary power supply circuit 905 can stabilize the output voltage within a voltage range that is twice as wide as the adjustable voltage range of the main power supply circuit 906 as control power source.

Figure 56:
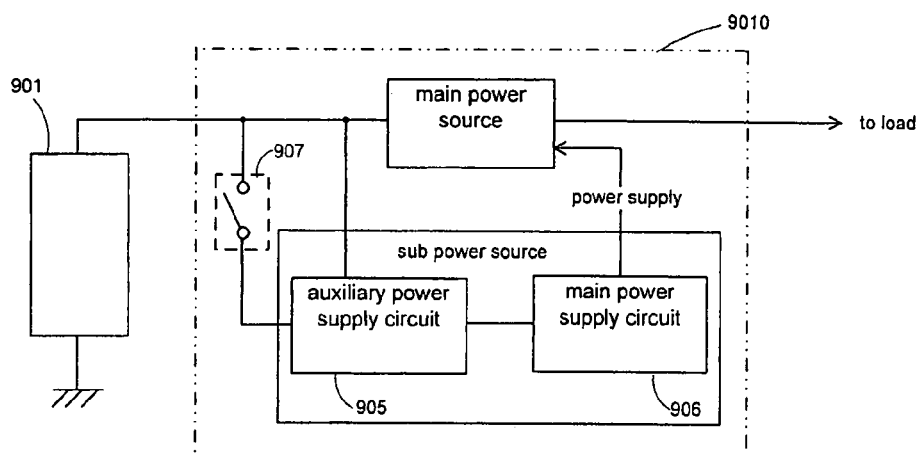
FIG. 56 is a schematic block diagram of a discharging apparatus for a capacitor storage type power source according to the present invention.

Now, the concept of modularizing various components to produce capacitor modules, charging circuit modules and discharging circuit modules for the purpose of the present invention will be described below. FIG. 56 is a schematic block diagram of a discharging apparatus for a capacitor storage type power source according to the present invention. In FIG. 56, the elements similar to those of FIG. 55 are denoted respectively by the same reference symbols. As an actual product, capacitor modules of capacitor storage type power sources are provided for 16V, 30V, 60V and so on and may be combined selectively and appropriately in response to the request of the client. In FIG. 55, the switching converter 902 and the PWM control section 903 are power sources for the load. Therefore, these components are collectively shown as a main power source in FIG. 56. Additionally, the main power supply circuit 906 and the auxiliary power supply circuit 905 are power supply circuits to be used for the main power source. Therefore, these components are collectively shown as sub power source in FIG. 56. The voltage boosting operation control section 907 of FIG. 56 is the same as that of FIG. 55. In actual products, the main power source, the sub power source and the voltage boosting operation control circuit 907 are collectively combined to form a single discharging circuit module and the discharging circuit module can be combined appropriately with any of various capacitor modules of different voltages and a charging circuit module (not shown) to form a capacitor storage type system. Thus, such a discharging circuit module is adapted to accommodate capacitor modules of various voltages such as 16V, 30V, 60V and so on. This embodiment is a discharging circuit module where the auxiliary power supply control circuit 5 is controlled by the voltage boosting operation control circuit 907.

Figure 57A:
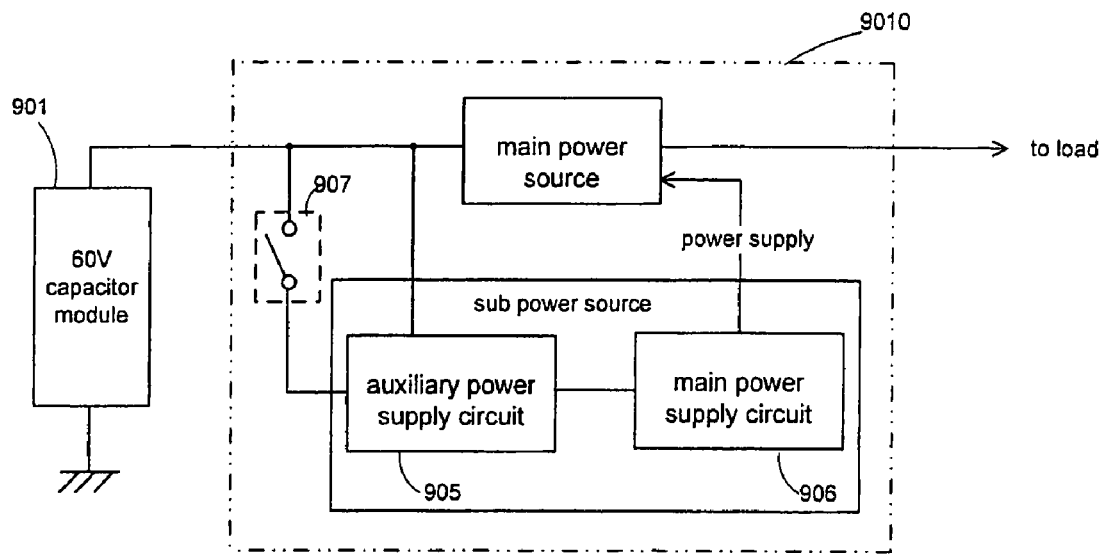
FIG. 57A is a schematic block diagram of a discharging apparatus for a capacitor storage type power source when a 60V capacitor module is used as capacitor storage type power source 901.
Figure 57B:
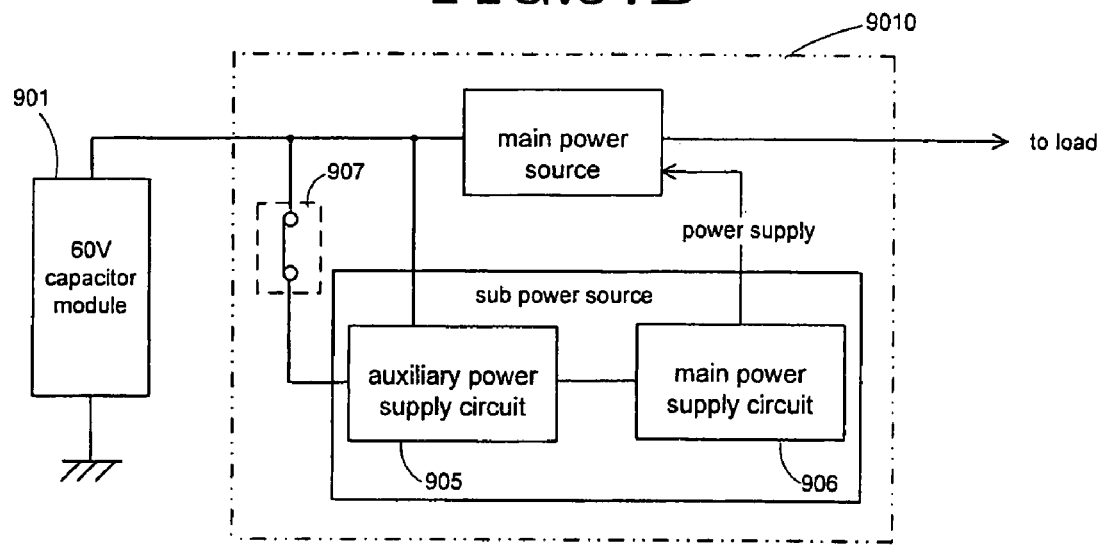
FIG. 57B is a schematic block diagram of a discharging apparatus for a capacitor storage type power source when a 60V capacitor module is used as capacitor storage type power source 901.

FIGS. 57A and 57B illustrate a schematic block diagram of a discharging apparatus for a capacitor storage type power source when a 60V capacitor module is used as capacitor storage type power source 901. As shown in FIG. 57A, when the voltage of the capacitor module is not lower than 30V in a discharge operation, the auxiliary power supply circuit 905 is cut off by the voltage boosting operation control circuit 907 so that the sub power source is operated only by the main power supply circuit 906. As the capacitor module discharges electricity and its voltage falls below 30V, the voltage boosting operation control circuit 907 connects the auxiliary power supply circuit 5, which is then made to operate in a voltage boosting mode and support the operation of the main power supply circuit 906 as shown in FIG. 57B.

Figure 58:
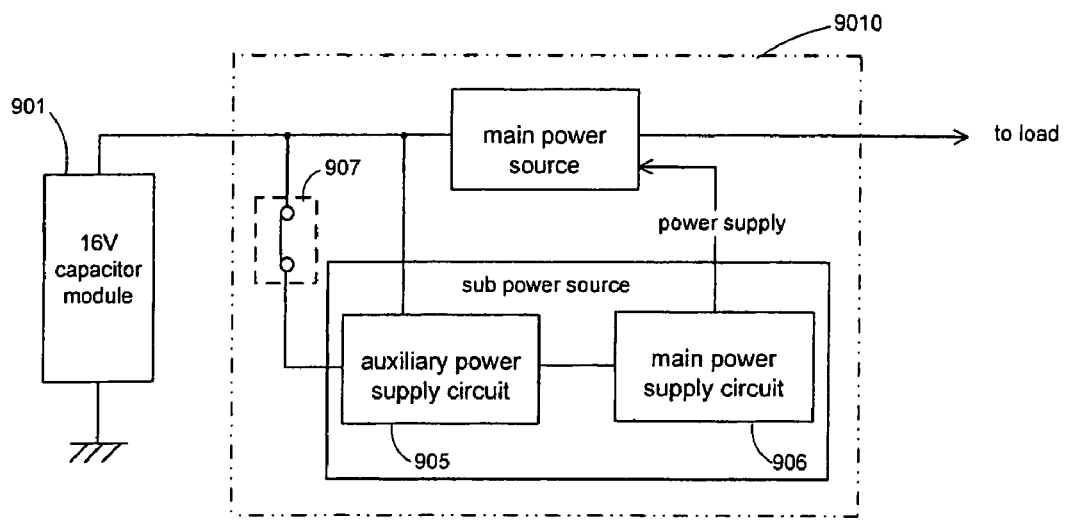
FIG. 58 is a schematic block diagram of a discharging apparatus for a capacitor storage type power source when a 16V capacitor module is used as capacitor storage type power source 901.

FIG. 58 is a schematic block diagram of a discharging apparatus for a capacitor storage type power source when a 16V capacitor module is used as capacitor storage type power source 901. When a 16V capacitor module is used, the voltage of the capacitor module is originally low. Thus, the voltage boosting operation control circuit 907 constantly connects the auxiliary power supply circuit 905 and controls it so as to make it operate in a voltage boosting mode and support the main power supply circuit 906.

As described above, only a single discharging circuit module of this embodiment can accommodate capacitor modules of various different voltages. More specifically, when the rated voltage of a capacitor module is high, the discharging circuit module can connect the auxiliary power supply circuit of the sub power source or cut it off appropriately so that the capacitor module may be utilized until its voltage falls to about ¼ of the full charge voltage. When the rated voltage of a capacitor module is low, the discharging circuit module constantly connects the auxiliary power supply circuit so that the capacitor module may be utilized until its voltage falls to about ¼ of the full charge voltage. Thus, a single discharging circuit module can be used for capacitor modules of various rated voltages to very efficiently exploit the accumulated power.

Figure 59:
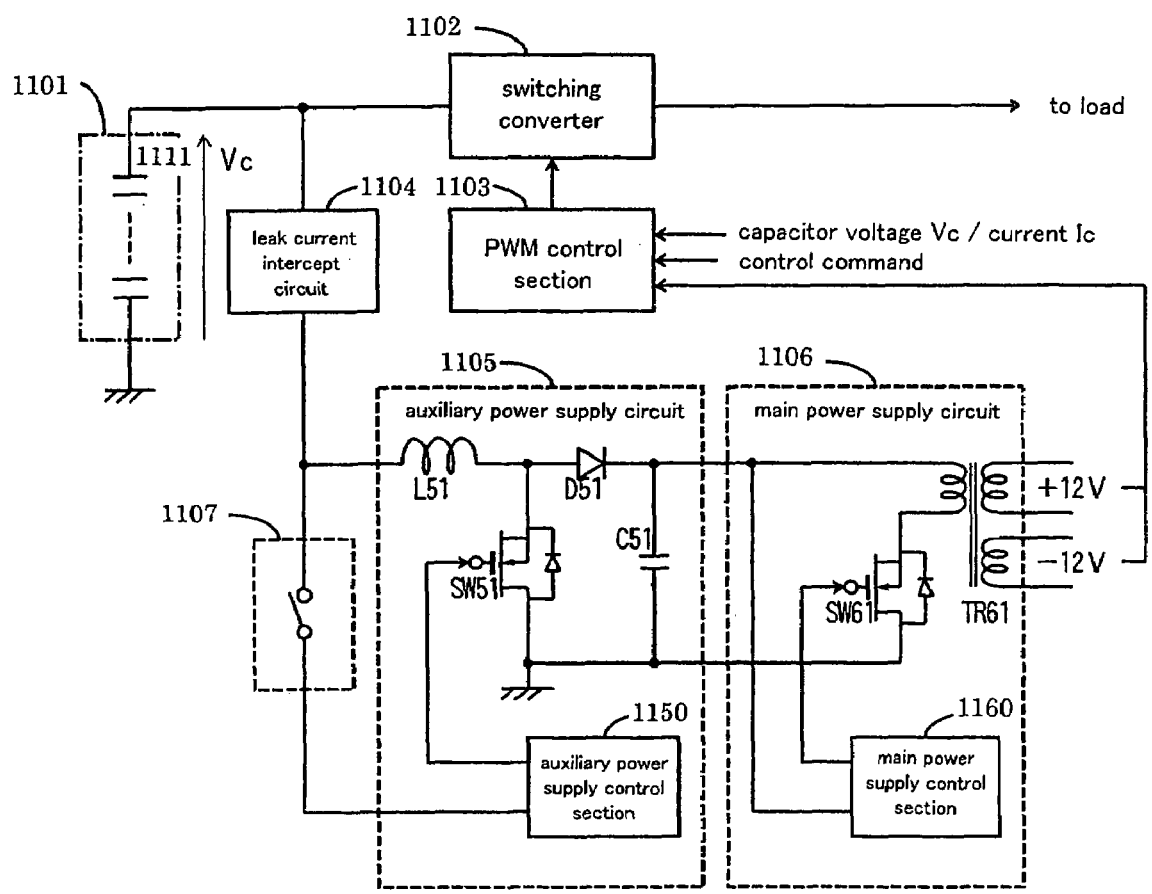
FIG. 59 is a circuit diagram of an embodiment of discharging apparatus for a capacitor storage type power source according to the present invention.
Figure 60:
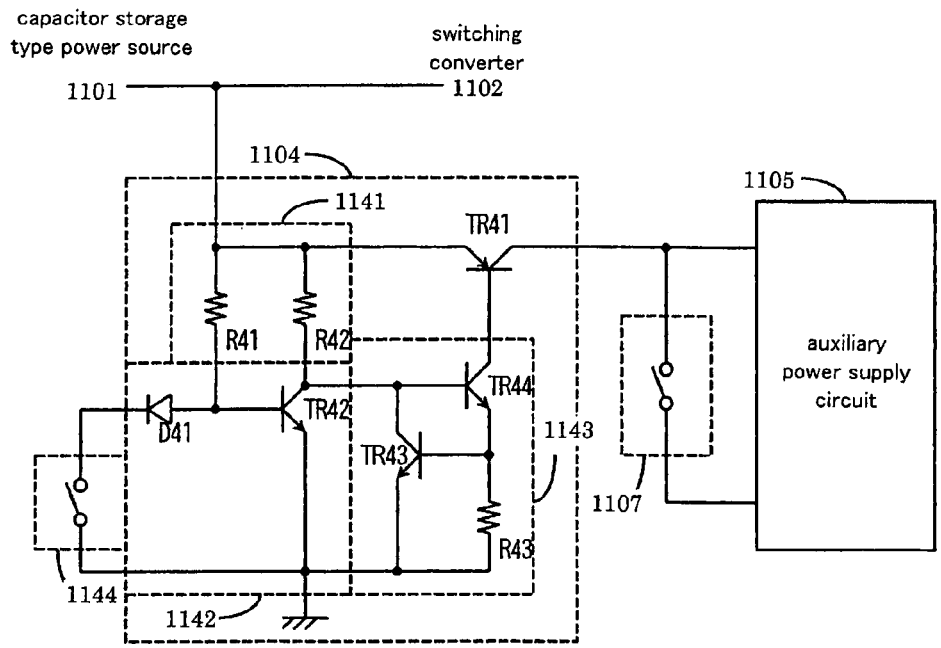
FIG. 60 is a circuit diagram of an embodiment of leak current intercept circuit.

(A tenth aspect of the invention) Now, another embodiment of the present invention will be described by referring to the related drawings. FIG. 59 is a schematic circuit diagram of an embodiment of discharging apparatus for a capacitor storage type power source according to the present invention. FIG. 60 is a circuit diagram of an embodiment of leak current intercept circuit. In FIGS. 59 and 60, there are shown a capacitor storage type power source 1101, a switching converter 1102, a PWM control section 1103, a leak current intercept circuit 1104, an auxiliary power supply circuit 1105, a main power supply circuit 1106, a voltage boosting operation control circuit 1107, electric double layer capacitors 1111, a high impedance circuit 1141, a judge circuit 1142, an intercept control circuit 1143, a discharge suspension detection circuit 1144, an auxiliary power supply control section 1150, a main power supply control section 1160, a capacitor C51, diodes D41, D51, a coil L51, resistors R41 to R43 switching circuits SW51, SW61, transistors TR41 through TR44 and a capacitor voltage Vc.

The discharging apparatus for a capacitor storage type power source illustrated in FIG. 59 comprises a switching converter 1102 for turning on/off the electric discharge from the capacitor storage type power source 1101 to the load, a PWM control section 1103 for controlling on/off operations of the switching converter 1102 by means of PWM (pulse width modulation) signals according to control commands, the capacitor voltage Vc and the current Ic, an auxiliary power supply circuit 1105 and a main power supply circuit 1106, the auxiliary power supply circuit 1105 and the main power supply circuit 1106 operating as control power supply circuits for the PWM control section 1103. The auxiliary power supply circuit 1105 operates as an auxiliary power source that is operated as auxiliary means for reducing the fluctuations of the capacitor voltage Vc of the electric current fed from the capacitor storage type power source 1101 if the capacitor voltage Vc fluctuate to a large extent. After the fluctuations are adjusted so as to be found within a predetermined range by the auxiliary power supply circuit 1105, the main power supply circuit 1106 stabilizes the voltage typically to +12V or −12V and supplies it to the PWM control section 1103 as control power. The leak current intercept circuit 1104 is connected in series to the feed circuit from the capacitor storage type power source 1101 to the auxiliary power supply circuit 1105 that operates as control power supply circuit in order to intercept the leak current to the control power supply circuit in a discharge stand-by state by cutting off the feed circuit when the discharge operation is suspended. The voltage boosting operation control circuit 1107 drives the auxiliary power supply circuit 1105 to operate in a voltage boosting mode when it determines that the capacitor voltage Vc supplied from the capacitor storage type power source 1101 falls to a level lower than ½ of the full charge voltage.

The auxiliary power supply circuit 1105 is formed by connecting a choke coil L51 and a switching circuit SW51 in series to the power feed circuit so as to take out the boosted voltage from the series connection point according to the on/off of the switching circuit SW51 by way of the diode D51 to operate as voltage boosting type switching converter. The auxiliary power supply circuit 1105 operates in a voltage boosting mode, when the auxiliary power supply control section 1150 is driven to control the switching circuit SW51 for on/off operations by means of a PWM signal. Thus, as the switching circuit SW51 is turned on, the auxiliary power supply circuit 1105 accumulates electric energy in the choke coil L51 and the accumulated energy is added to the voltage of the input side to boost the voltage when the switching circuit SW51 is turned off. When the auxiliary power supply control section 1150 stops operating and the switching circuit SW51 is turned off, the auxiliary power supply circuit 1105 operates in a voltage non-boosting mode and the input voltage, or the capacitor voltage, is output to the output terminal of the auxiliary power supply circuit 1105 through the choke coil L51 and the diode D51 without being boosted.

The voltage boosting operation control circuit 1107 controls the operation of switching from the voltage boosting mode to the voltage non-boosting mode and vice versa. It determines the input voltage, or the capacitor voltage, and connects the auxiliary power supply circuit 1150 to the feed circuit when the input voltage is low. More specifically, if the full charge voltage of the capacitor voltage Vc is 60V and the voltage boosting operation control circuit 1107 determines that the capacitor voltage Vc has fallen but is still above 30V which is a half of the full charge voltage, the voltage boosting operation control circuit 1107 cuts off the auxiliary power supply control section 1150 from the capacitor storage type power source 1101. Thus, the PWM control of the auxiliary power supply control section 1050 is suspended and the auxiliary power supply circuit 1105 is made to operate in a voltage non-boosting mode. As the capacitor voltage Vc falls below 30V, the voltage boosting operation control circuit 1107 connects the auxiliary power supply control section 1150 to the capacitor storage type power source 1101. As a result, the PWM control of the auxiliary power supply control section 1150 is resumed and the auxiliary power supply circuit 1105 is made to operate in a power boosting mode.

The main power supply circuit 1106 is a constant voltage power supply circuit that connects a series circuit of the primary winding of the transformer TR61 and the switching circuit SW61 to the output of the auxiliary power supply circuit 1105 to control the switching circuit SW61 for on/off so that a rectified and smoothed constant voltage of +12V or −12V may be output from the secondary winding side of the transformer TR61 under the control of the main power supply control section 1160. More specifically, the main power supply control section 1160 detects the input voltage and controls the switching circuit SW61 for on/off by means of PWM signals. Thus, since the auxiliary power supply circuit 1105 is arranged upstream relative to the main power supply circuit 1106 and, if the input voltage falls, the auxiliary power supply circuit 1105 boosts the voltage, doubling it, so that the main power supply circuit 1106 may provide a constant voltage, the auxiliary power supply circuit 1105 can stabilize the output voltage within a voltage range that is twice as wide as the adjustable voltage range of the main power supply circuit 1106 as control power source.

The leak current intercept circuit 1104 typically comprises a transistor TR1, a high impedance circuit 1141, a judge circuit 1142, a bias voltage supply circuit 1143 and a discharge detection circuit 1144 as shown in FIG. 60. The transistor TR1 is an intercept circuit for intercepting the power feed circuit by inserting and connecting its emitter/collector circuit to the power feed circuit for feeding power from the capacitor storage type power source 1101 to the auxiliary power supply circuit 1105 of the control power supply circuit in series. The bias voltage supply circuit 1143 supplies a bias voltage to the base of the transistor TR1 that operates as intercept circuit. The judge circuit 1142 determines a discharge active state or a discharge stand-by state on the basis of the signal from the discharge detection circuit 1144 to control the bias voltage supply circuit 1143 and turns off the bias voltage being supplied to the base of the transistor TR1 in a discharge stand-by state. The high impedance circuit 1141 connects the feed circuit to the judge circuit for determining a discharge active state or a discharge stand-by state and controlling the bias voltage supply circuit 1143 by way of a high impedance element formed by using resistors R41, R42 showing a resistance of the order of 1 MΩ. The signal of the discharge detection circuit 1144 that provides the basis for the determination of the judge circuit 1142 is typically a contact signal of an external switch that becomes off when the discharge is suspended.

In the judge circuit 1142 that determines a discharge stand-by state on the basis of a contact signal of an external switch, the NPN transistor TR42 is turned off (non-conductive) in a discharge active state because of the short-circuiting between the base and the emitter but turned of (conductive) in a discharge stand-by state because the base current is supplied by way of the resistor R41. As the transistor TR42 is turned off, the transistor TR44 is turned on to turn on the PNP transistor TR41 so that the power feed circuit of the capacitor storage type power source 1101 and the auxiliary power supply circuit 1105 is connected. As the transistor TR42 is turned on, the transistor TR44 is turned off to turn off the transistor TR41 so that the power feed circuit of the capacitor storage type power source 1101 and the auxiliary power supply circuit 1105 is disconnected.

In a discharge stand-by state where the external switch of the discharge detection circuit 1144 is turned off and only the transistor TR42 is turned on while the transistors TR41, TR43, TR4 are turned off, only the base current and the collector current flow from the capacitor storage type power source 1101 to the transistor TR42 by way of the resistors R41, R42 of the high electromagnetic circuit 1141. Thus, with such a circuit configuration, only an electric current is allowed to flow through the high impedance element formed by resistors R41, R42 showing a resistance of the order of 1 MΩ in a discharge stand-by state.

Resistors up to several hundreds kΩ are generally employed because a resistor showing a high resistance is apt to pick up noises. However, in this embodiment, the power loss due to a leak current is dramatically suppressed in a discharge stand-by state by using resistors R41, R2 that show a resistance of the order of 1 MΩ for the high impedance circuit 1141. With this arrangement, the leak current and hence the power loss in a discharge stand-by state are minimized. The heat generation is also minimized in the circuit. Additionally, the circuit formed by connecting the resistor R43 to the emitter of the NPN transistor TR44, connecting the base/emitter circuit of the NPN transistor TR43 in parallel with the resistor R43, connecting the collector terminal of the NPN transistor TR43 to the base of the NPN transistor TR44 in the intercept control circuit 1143 operates as a constant current circuit for keeping the voltage fall of the resistor R43 to a constant level. Therefore, the collector current of the transistor TR44 is constant if the capacitor voltage fluctuates to a large extent so that a constant current bias voltage is supplied to the transistor TR41.

Figure 61:
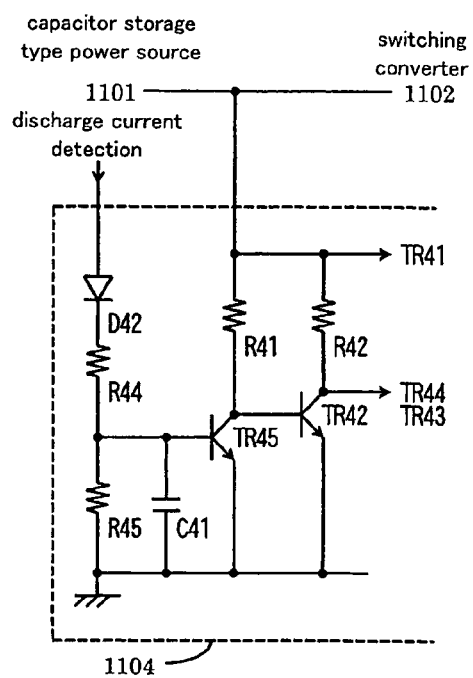
FIG. 61 is a circuit diagram of another embodiment of a leak current intercept circuit according to the present invention.
Figure 62:
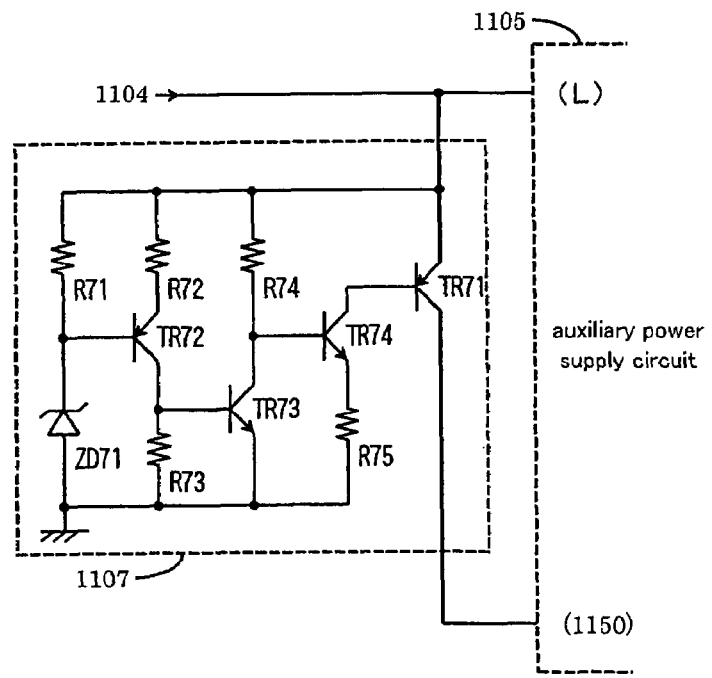
FIG. 62 is a view of an embodiment of a voltage boosting operation control circuit according to the present invention.

FIG. 61 is a circuit diagram of another embodiment of leak current intercept circuit according to the present invention. FIG. 62 shows an embodiment of a voltage boosting operation control circuit according to the present invention. In FIGS. 61 and 62, there are shown capacitors C41, C71, a diode D42, resistors R44, R45, R71 through R74, transistors TR45, TR71 through TR73 and a constant voltage diode ZD71. While the contact signal of an external switch that is turned off when the discharge is suspended from the discharge detection circuit 44 is connected to the base of the transistor TR42 of the judge circuit 1142 in the leak current intercept circuit shown in FIG. 60, the voltage of the output side of the switching converter 1102 and the PWM signal output from the PWM control section 1103 are connected to the judge circuit of the current intercept circuit in the embodiment of FIG. 61.

In the embodiment of FIG. 61, the discharge detection circuit 1144 of FIG. 60 is replaced by a circuit formed by a diode D42, resistors R44, R45, a capacitor C41 and a transistor TR45, where the level of the discharge detection signal is determined by the transistor TR45 and the transistor TR42 is turned on/off according to the on/off state of the transistor TR45. When the voltage of the output side of the switching converter 1102 and the PWM signal output from the PWM control section 1103 are input to the series circuit of the diode D42 and the resistors R44, R45 as a discharge detection signal, the transistor TR45 is turned on (conductive) when the discharge operation is activated and hence the level of the discharge detection signal is high but turned off (non-conductive) when the discharge is suspended and hence the level of the discharge detection signal falls below the base/emitter voltage of the transistor TR45.

Since the collector/emitter circuit of the transistor TR45 is connected to the base/emitter circuit of the transistor TR42, the transistor TR42 is turned off when the transistor TR45 is turned on, whereas the transistor TR42 is turned on when the transistor TR45 is turned off. When this embodiment is adopted, the transition from a discharge stand-by state to a start of a discharge operation can be realized when, for example, the switching converter 1102 and the PWM control section 1103 are driven to operate by a trigger produced by a start-up circuit for starting a discharge operation and the transistor TR45 is switched from off to on as the level of the discharge detection signal rises.

The voltage boosting operation control circuit 1107 of FIG. 62 is formed by connecting the power feed circuit to the auxiliary power supply control section 1150 of the auxiliary power supply circuit 1105 by way of the transistor TR71 so that the auxiliary power supply circuit 1105 is made to operate in a voltage boosting mode as the transistor TR71 is turned on but the auxiliary power supply control section 1150 is cut off from the power feed circuit to end the operation in the voltage boosting mode as the transistor TR71 is turned off. In the voltage boosting operation control circuit 1107, the input voltage, or the capacitor voltage, is applied to a series circuit of the resistor R71 and the constant voltage diode ZD71, the series connection point being connected to the base of the PNP transistor TR72, to determine if the capacitor voltage is not higher than the half of the full charge voltage or not. The transistor TR72 is turned on (conductive) when the capacitor voltage is higher than the reference value set in the constant voltage diode ZD71, which is the half of the full charge voltage in this case, whereas the transistor TR72 is turned off (non-conductive) when the capacitor voltage is not higher than the half of the full charge voltage. The collector output of the transistor TR72 is connected to the base of the NPN transistor TR73 and the collector output of the transistor TR73 is connected to the base of the NPN transistor TR74, while the collector output of the transistor TR74 is connected to the base of the transistor TR71. With this circuit, the transistor TR73 is turned on when the transistor TR72 is turned on and the transistor TR74 and the transistor TR71 are turned off when the transistor TR73 is turned on. Therefore, the transistor TR71 is turned off when the capacitor voltage is higher than the half of the full charge voltage so that the auxiliary power supply control section 1105 is cut off from the power feed circuit to stop its operation in a voltage boosting mode, whereas transistor TR71 is turned on when the capacitor voltage becomes not higher than the half of the full charge voltage so that the auxiliary power supply control section 1105 is connected to the power feed circuit to start operating in a voltage boosting mode and the capacitor voltage from the auxiliary power supply circuit 1105 is boosted and output to the main power supply circuit 1106.

Figure 63:
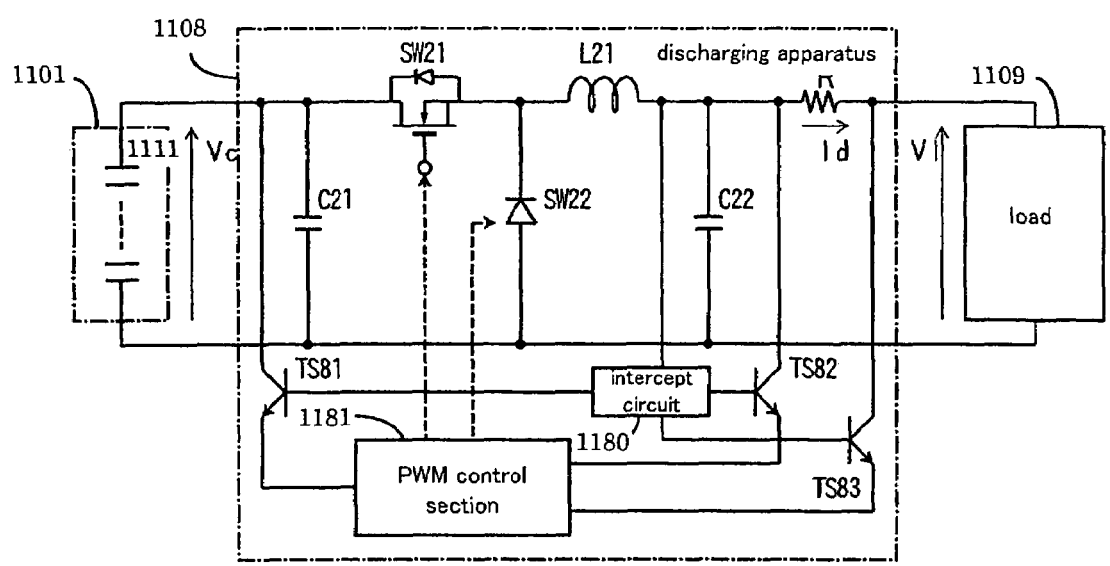
FIG. 63 is a circuit diagram of another embodiment of a discharging apparatus for a capacitor storage type power source according to the present invention.

FIG. 63 is a circuit diagram of another embodiment of a discharging apparatus for a capacitor storage type power source according to the present invention. FIG. 63 shows a discharging apparatus 1108, a load 1109, a leak current intercept circuit 1180, a PWM control section 1181, capacitors C21, C22, a coil L21, a current detecting resistor R, a switching circuit SW21, a synchronous rectifier circuit SW22 and signal intercept switches TS81 through TS83.

The discharging apparatus illustrated in FIG. 63 comprises a voltage-lowering type switching converter formed by connecting the discharge control switching circuit SW21 and the choke coil L21 in series between the capacitor storage power source 1101 and the load 1109, connecting the synchronous rectifier circuit SW22 in parallel to the series connection point, connecting the capacitors C21, C22 in parallel between the input side and the output side of the capacitor storage type power source 1101 so that the switching circuit SW21 is turned on/off according to the PWM signal and, at the same time, the synchronous rectifier circuit SW22 is turned on/off at phase inverse relative to each other so as to supply the discharge current (load current) to the load 1109. Additionally, the current detecting resistor R is inserted and connected in series in order to detect the discharge current Id.

The leak current intercept circuit 1180 determines if the discharging apparatus is operating for discharging electricity or in a discharge stand-by state by detecting the load voltage Vl. If it is determined that the charging apparatus is in a discharge stand-by state, it operates the signal intercept circuit and intercepts the signal lines of the PWM control section 1181 that are operating to detect the discharge current, the capacitor voltage and the load voltage. More specifically, the leak current intercept circuit determines if the main switching circuit SW21 for discharge electricity is off and hence in a discharge stand-by state by seeing if the load voltage Vl is being output at a predetermined voltage level or not. The signal lines of the PWM control section 1181 are disconnected when the load voltage Vl is in a discharge stand-by state. The signal lines are connected from the PWM control section 1181 to the circuit for discharging the capacitor storage type power source 1101 and include those connected to the input terminal side for the purpose of detecting the charge voltage Vc of the capacitor storage type power source 1101, those connected to the output terminal side for the purpose of detecting the load voltage Vl and those connected between the opposite terminals of the current detecting resistor R for the purpose of detecting the charge current I. The signal intercept switches TS81 through TS83 are connected in series to the respective signal lines as signal intercept circuits for intercepting the corresponding signals.

The present invention is by no means limited to the above-described embodiments, which may be modified in various different ways without departing from the scope of the present invention. For example, the synchronous rectifier circuit SW22 of the above-described embodiments may be replaced by a diode (flywheel diode). The detection element for detecting the electric current in a discharge operation (current detecting resistor R) may be connected to the common line or the line arranged at the side opposite to the common line.

What is claimed is:

1. A charging apparatus for electrically charging a capacitor storage type power source adapted to store electric energy in electric double layer capacitors, said apparatus comprising:

a switching circuit for turning on/off a charge current supplied from a charge power source to the capacitor storage type power source;

a current detection circuit for detecting the charge current;

a voltage detection circuit for detecting the voltage of the capacitor storage type power source;

a constant current control circuit for outputting an error amplifying signal for controlling the charge current according to a current value detected by the current detection circuit and a current reference value;

a power control circuit for outputting an error amplifying signal for controlling the charge current according to the current value detected by the current detection circuit, a voltage value detected by the voltage detection circuit and a power reference value;

a constant voltage control circuit for outputting an error amplifying signal for controlling the charge current according to the voltage detected by the voltage detection circuit and a voltage reference value;

a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the switching circuit and control the charge current;

the capacitor storage type power source having a plurality of electric double layer capacitors connected in series and parallel monitors for bypassing the respective charge currents of the capacitors;

the constant current control circuit selecting a smaller reference value from a plurality of reference values provided as the current reference value according to the bypassing operations of the parallel monitors.

2. A charging apparatus for electrically charging a capacitor storage type power source adapted to store electric energy in electric double layer capacitors, said apparatus comprising:

a switching circuit for turning on/off a charge current supplied from a charge power source to the capacitor storage type power source;

a current detection circuit for detecting the charge current;

a voltage detection circuit for detecting the voltage of the capacitor storage type power source;

a constant current control circuit for outputting an error amplifying signal for controlling the charge current according to a current value detected by the current detection circuit and a current reference value;

a power control circuit for outputting an error amplifying signal for controlling the charge current according to the current value detected by the current detection circuit, a voltage value detected by the voltage detection circuit and a power reference value;

a constant voltage control circuit for outputting an error amplifying signal for controlling the charge current according to the voltage value detected by the voltage detection circuit and a voltage reference value;

a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the switching circuit and control the charge current, the constant current control circuit having a circuit for switching, using another charging apparatus for a capacitor storage type power source as a master apparatus, the current reference value to a current value detected by the current detection circuit of the master apparatus.

3. A charging apparatus for electrically charging a capacitor storage type power source adapted to store electric energy in electric double layer capacitors, said apparatus comprising:

a switching circuit for turning on/off a charge current supplied from a charge power source to the capacitor storage type power source;

a current detection circuit for detecting the charge current;

a voltage detection circuit for detecting the voltage of the capacitor storage type power source;

a constant current control circuit for outputting an error amplifying signal for controlling the charge current according to a current value detected by the current detection circuit and a current reference value;

a power control circuit for subtracting a voltage value detected by the voltage detection circuit from a reference value, computationally comparing the difference of the subtraction and the current value detected by the current detection circuit and outputting an error amplifying signal for controlling the charge current;

a constant voltage control circuit for outputting an error amplifying signal for controlling the charge current according to the voltage value detected by the voltage detection circuit and a voltage reference value;

a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the switching circuit and control the charge current.

4. The apparatus according to any of claims 1 through 3, wherein
the logical OR circuit is a diode logical OR circuit.

5. The apparatus according to claim 1 or 2, wherein
the power control circuit compares the value obtained by multiplying the current value by the voltage value and the power reference value and outputs an error amplifying signal.

6. The apparatus according to any of claims 1 through 3, wherein
the constant voltage control circuit can select the voltage reference value from a plurality of different voltage reference values.

7. A charging apparatus for a capacitor storage type power source adapted to store electric energy in electric double layer capacitors, the apparatus charging the power source, controlling a charge current by modulating the pulse width by a pulse width modulation means from a charge power source, said apparatus comprising:

constant current signal generation means for comparing a first reference value and the charge current and generating an error amplifying signal;

current diminishing signal generation means for inputting a detection signal of the charge voltage of the capacitor storage type power source to the inverted input terminal of an operational amplifier by way of a resistor and an offset value to the non-inverted input terminal and comparing a second reference value taken out from a subtraction circuit formed by connecting a resistor between the inverted input terminal and the output terminal and the charge current to generate an error amplifying signal; and a logical OR circuit for inputting the error amplifying signal of the constant current signal generation means and the error amplifying signal of the current diminishing signal generation means, executing a logical OR process on the input error amplifying signals and outputting the outcome of the logical OR process to the pulse width modulation means;

the constant current charge according to the error amplifying signal of the constant current signal generation means being switched to the current diminishing charge according to the error amplifying signal of the current diminishing signal generation means in response to an increase of the charge voltage to the capacitor storage type power source.

8. The apparatus according to claim 7, further comprising:
constant voltage signal generation means for comparing the voltage reference value and the charge voltage of the capacitor storage type power source to generate an error amplifying signal;
the error amplifying signal of the constant voltage signal generation means being input to the logical OR circuit.

9. The apparatus according to claim 7, wherein
the electric double layer capacitors have respective parallel monitors for bypassing the charge current at a predetermined voltage;
the current diminishing signal generation means have a switching circuit for switching the error amplifying signal input to the logical OR circuit from effective to ineffective or vice versa;
the electric double layer capacitors are electrically charged by making the error amplifying signal of the current diminishing signal generation means ineffective; and
the switching circuit are controlled according to the bypass operation signal of any of the parallel monitors to switch the error amplifying signal of the current diminishing signal generation means to effective.

10. A charging apparatus for a capacitor storage type power source adapted to store electric energy in a plurality of electric double layer capacitors provided with respective parallel monitors for bypassing a charge current at a predetermined voltage, the apparatus charging the power source, controlling the charge current by modulating the pulse width by a pulse width modulation means from a charge power source, said apparatus comprising:

constant current signal generation means for comparing a first reference value and the charge current and generating an error amplifying signal;

current diminishing signal generation means for comparing a second reference value obtained by inverting the charge voltage of the capacitor storage type power source and turning it into a positive value by means of an offset value and the charge current to generate an error amplifying signal;

a switching circuit for switching effectiveness/ineffectiveness of the error amplifying signal of the current diminishing signal generation means;

a logical OR circuit for inputting the error amplifying signal of the constant current signal generation means and the error amplifying signal of the current diminishing signal generation means made effective by the switching circuit, executing a logical OR process on the input error amplifying signals and outputting the outcome of the logical OR process to the pulse width modulation means;

a charge process being executed by turning the error amplifying signal of the current diminishing signal generation means ineffective; and the switching circuit being controlled according to the bypass operation signals of the parallel monitors to turn the error amplifying signal of the current diminishing signal generation means effective.

11. A charging apparatus for a capacitor storage type power source adapted to store electric energy in a plurality of electric double layer capacitors connected in series and provided with respective parallel monitors for bypassing a charge current at a predetermined voltage, the apparatus charging the power source, controlling the charge current by modulating the pulse width by a pulse width modulation means from a charge power source, said apparatus comprising:

first charge current control means for lowering the charge current in inverse proportion to the increase of the charge voltage of the capacitor storage type power source;

second charge current control means for flowing the charge current of the withstand current value of the parallel monitors;

the apparatus operating the second charge current control means to control the charge current for a predetermined time period upon detecting one of the parallel monitors bypassing the charge current and subsequently the first charge current control means to control the charge current for another predetermined time period.

12. The apparatus according to claim 11, wherein
the control operation of the second charge current control means for the predetermined time period and the control operation of the first charge current control means for the other predetermined time period are repeated alternately.

13. A charging apparatus for an capacitor storage type power source, the capacitor storage type power source having a main switching circuit to be turned on/off according to an on/off signal and a synchronous rectifier circuit to be turned on/off at phases inverse relative to the main switching circuit to store electric energy in electric double layer capacitors by accumulating energy in a choke coil at the on time of the main switching circuit and discharging the energy accumulated in the choke coil by turning on the synchronous rectifier circuit at the off time of the main switching circuit, said apparatus comprising:

a current detection circuit for detecting a charge current;

a voltage detection circuit for detecting a charge voltage of the capacitor storage type power source;

a constant current control circuit for performing an operation of comparing a current detection value detected by the current detection circuit and a current reference value to output an error amplifying signal;

a power control circuit for performing an operation of comparing the current detection value detected by the current detection circuit and a power reference value to output an error amplifying signal;

a constant voltage control circuit for performing an operation of comparing a voltage detection value detected by the voltage detection circuit and a voltage reference value to output an error amplifying signal;

a logical OR circuit for selecting one of the error amplifying signals output from the constant current control circuit, the power control circuit and the constant voltage control circuit and outputting the selected error amplifying signal;

a control circuit for generating a pulse-width-modulated on/off control signal according to the error amplifying signal output from the logical OR circuit to turn on/off the switching circuit and the synchronous rectifier circuit and control the charge current;

a pulse width detection circuit for detecting pulse width of the on part of the on/off control signal as fallen below a predetermined value;

a signal holding circuit for holding the synchronous rectifier circuit to an off state by means of the detection signal of the pulse width detection circuit regardless of the on/off control signal; and a diode being connected to the polarity for discharging the energy accumulated in the choke coil in parallel with the synchronous rectifier circuit so as to stop the synchronous rectification under the condition of the pulse width fallen below the predetermined value.

14. The apparatus according to claim 13, wherein
the power control circuit is adapted to subtract the voltage value detected by the voltage detection circuit from the reference value and set the power reference value according to the difference obtained by the subtraction.

15. The apparatus according to claim 13, wherein
the pulse width detection circuit includes a rectifying and smoothing circuit for rectifying and smoothing the on/off control signal and a transistor circuit that is controlled so as to be turned off when the output of the rectifying and smoothing circuit gets to a predetermined value and that holds the signal for turning on/off the synchronous rectifier circuit to an off state.

16. The apparatus according to claim 13, wherein
the signal of the synchronous rectifier circuit is obtained by inverting the on/off control signal by means of an inversion circuit.

17. The apparatus according to claim 13, wherein
the main switching circuit and the synchronous rectifier circuit are supplied with an on/off signal by way of a delay circuit that delays the signal at the rising edge of a pulse.

18. The apparatus according to claim 17, wherein
the delay circuit is formed by inserting a parallel circuit of a diode showing the polarity opposite to the signal and a resistor in series and connecting a capacitor to the output side of the parallel circuit.

19. A charging apparatus for a capacitor storage type power source adapted to store electric energy in electric double layer capacitors, the apparatus charging the power source, controlling a charge current by modulating the pulse width by a pulse width modulation means from a charge power source, said apparatus at least comprising:

constant current signal generation means for comparing the charge current of the capacitor storage type power source with a current reference value and generating an error amplifying signal for holding the charge current to a constant level by limiting the charge current at the time of exceeding the current reference value;

input constant voltage signal generation means for comparing the input voltage from the charge power source with an input voltage reference value and generating an error amplifying signal for holding the input voltage to a constant level by lowering the charge current at the time of falling of the input voltage below the input voltage reference value and by raising the charge current at the time of rising of the input voltage above the input voltage reference value; and current diminishing signal generation means for setting a current diminishing reference value according to the value obtained by subtracting the voltage of the capacitor storage type power source from an offset value, comparing the current diminishing reference value with the charge current of the capacitor storage type power source and generating an error amplifying signal for bringing the charge current to the current diminishing reference value by limiting the charge current at the time of rising of the charge current above the current diminishing reference value;

the error amplifying signals being supplied to the pulse width modulation means by way of a logical OR circuit.

20. The apparatus according to claim 19, wherein the input constant voltage signal generation means connects with the logical OR circuit by way of a switching circuit for controlling the sending out of the error amplifying signals.

21. The apparatus according to claim 19, wherein when solar cells are used as a charge power source, the input voltage reference value is the solar cell voltage close to the maximum power point of the solar cells.

22. The apparatus according to claim 19, wherein the input voltage reference value changes according to the sunshine conditions.

23. The apparatus according to claim 19, wherein the logical OR circuit compares the charge voltage of the capacitor storage type power source defined by the constant voltage signal generation means with a charge voltage reference value along with the error amplifying signals and executes a logical OR process on the error amplifying signals for limiting the charge voltage to supply the outcome of the logical OR process to the pulse width modulation means, when the charge voltage exceeds the charge voltage reference value.

24. A charging apparatus for a capacitor storage type power source, the apparatus having solar cells, a power conversion circuit and capacitors so as to convert the output power of the solar cells by means of the power conversion circuit and store the converted power in the capacitors, said apparatus comprising:

a sweep section for sweeping the input voltage of the power conversion circuit within a predetermined range; and a current detection section for detecting the charge current to the capacitors;

the current detection section being adapted to detect the change in the charge current to the capacitors produced by the sweep of the input voltage by the sweep means;

the input voltage maximizing the charge current being defined as the maximum power point of the solar cells.

25. A charging apparatus for a capacitor storage type power source, the apparatus having solar cells, a power conversion circuit and capacitors so as to convert the output power of the solar cells by means of the power conversion circuit and store the converted power in the capacitors, said apparatus comprising:

a sweep section for sweeping the input voltage of the power conversion circuit within a predetermined range; and a voltage detection section for detecting the charge voltage to the capacitors;

the voltage detection section being adapted to detect the change with time of the charge voltage to the capacitors produced by the sweep of the input voltage by the sweep means;

the input voltage maximizing the change with time of the charge voltage being defined as the maximum power point of the solar cells.

26. A charging apparatus for a capacitor storage type power source adapted to induce an electric current in the secondary side winding by turning on/off the DC current applied to the primary side winding of a transformer by means of a switching element, rectify and smooth the induced current and supply the current to capacitors to charge the capacitors, said apparatus comprising:

a power factor improvement circuit for generating the DC current;

a pulse width modulation control section for controlling the on/off operation of the switching element; and a current transformer having a primary side connected to the primary side winding of the transformer in series and a secondary side connected to a current transformer circuit detection circuit section;

the current transformer circuit detection circuit section being adapted to take out a voltage proportional to the average current flowing through the primary side winding of the transformer and a voltage proportional to the peak current flowing through the primary side winding of the transformer.

27. A charge or discharging apparatus for a capacitor storage type power source, the apparatus having a main switching circuit for performing on/off operations according to on/off control signals and a choke coil and adapted to electrically charge or discharge the electric double layer capacitors of the power source, said apparatus comprising:

a signal intercept circuit inserted and connected in series to a signal line connected to the circuit for electrically charging or discharging the capacitor storage type power source for the purpose of detecting the current and the voltage at the time of charge or discharge, whichever appropriate;

the signal intercept circuit being adapted to intercept the signal of the signal line on a condition of the voltage being nil at a side opposite to the side of connecting the main switching circuit and the choke coil to the capacitor storage type power source.

28. A charging apparatus for a capacitor storage type power source, the apparatus having a main switching circuit for performing on/off operations according to on/off control signals and a choke coil and adapted to electrically charge the electric double layer capacitors of the power source, said apparatus comprising:

a current detection circuit for detecting a charge current;

a voltage detection circuit for detecting the voltage of the capacitor storage type power source;

a constant current control circuit for outputting an error amplifying signal for controlling the charge current according to a current value detected by the current detection circuit and a current reference value;

a power control circuit for outputting an error amplifying signal for controlling the charge current according to the current value detected by the current detection circuit, a voltage value detected by the voltage detection circuit and a power reference value;

a constant voltage control circuit for outputting an error amplifying signal for controlling the charge current according to the voltage value detected by the voltage detection circuit and a voltage reference value;

a logical OR circuit for selecting one of the error amplifying signals output from the constant current control circuit, the power control circuit and the constant voltage control circuit and outputting the selected error amplifying signal; and a control circuit for generating a pulse width modulation signal according to the error amplifying signal output from the logical OR circuit to turn on/off the main switching circuit and control the charge current;

a signal intercept circuit being inserted and connected in series to the signal line for detecting the charge current of the current detection circuit and the signal line for detecting the voltage of the voltage detection circuit, the signal intercept circuit being adapted to intercept the signals of the signal lines on a condition of the voltage being nil at the side opposite to the side of connecting the main switching circuit and the choke coil to the capacitor storage type power source.

29. A discharging apparatus for a capacitor storage type power source, the apparatus having a main switching circuit for performing on/off operations according to on/off control signals and a choke coil and adapted to electrically discharge the electric double layer capacitors of the power source, said apparatus comprising:

a current detection circuit for detecting a discharge current;

a voltage detection circuit for detecting the voltage of the capacitor storage type power source;

a control circuit for inputting a detected discharge current and a detected voltage and controlling the discharge current by turning the main switching circuit on/off; and a signal intercept circuit being connected in series to the signal line for detecting the discharge current of the current detection circuit and the voltage of the voltage detection circuit;

the signal line being disconnected by the signal intercept circuit provided that the voltage at the side opposite to the side connecting the main switching circuit and the choke coil to the capacitor storage type power source is nil.

30. A discharging apparatus for a capacitor storage type power source, the apparatus being separated from a charging apparatus for a capacitor storage type power source and adapted to discharge electric energy from the capacitor storage type power source storing electric energy in electric double layer capacitors to a load, said apparatus comprising:

a control circuit for controlling the discharge of electric energy to the load;

a main power supply circuit for supplying circuit drive power to the control circuit;

an auxiliary power supply circuit for boosting the voltage of the capacitor storage type power source to an operating voltage of the main power supply circuit and supplying circuit drive power to the main power supply circuit; and a voltage boosting operation control circuit adapted to turn off the auxiliary power supply circuit when the voltage of the capacitor storage type power source is not lower than a predefined value to output the voltage of the capacitor storage type power source to the main power supply circuit but turn on the auxiliary power supply circuit when the voltage of the capacitor storage type power source is lower than the predefined value to output the voltage of the capacitor storage type power source after it is boosted by the auxiliary power supply circuit.

31. A discharging apparatus of a capacitor storage type power source for discharging electric energy from the capacitor storage type power source storing electric power in electric double layer capacitors to a load, said apparatus comprising:

a control circuit having a control power supply circuit and adapted to control the electric discharge;

an intercept circuit for turning on/off the power feed circuit for feeding electric power from the capacitor storage type power source to the control power supply circuit;

a bias voltage supply circuit for supplying a bias voltage to the intercept circuit;

a judge circuit for determining e a discharge condition or a suspended discharge condition and controlling the bias voltage supply circuit so as to turn off the supply of the bias voltage in the suspended discharge condition; and a high impedance circuit for connecting the power feed circuit through a high impedance element to the judge circuit for determining the discharge condition or the suspended discharge condition and controlling the bias voltage supply circuit;

the electric current flowing in the suspended discharge condition being limited by the high impedance element.

32. The apparatus according to claim 31, wherein the bias voltage supply circuit constitutes a circuit for supplying a constant current bias voltage.

33. The apparatus according to claim 31, wherein the judge circuit determines a condition of the switch for suspending the electric discharge.

34. The apparatus according to claim 31, wherein the judge circuit determines the presence or absence of a signal for controlling the electric discharge of the control circuit.

35. The apparatus according to claim 31, wherein the judge circuit determines the presence or absence of a voltage at the load side.

36. The apparatus according to claim 31, wherein the control power supply circuit includes a voltage boosting circuit for boosting the voltage of the electric power fed from the capacitor storage type power source and a voltage stabilizing circuit connected to the voltage boosting circuit to stabilize the output voltage.

37. The apparatus according to claim 36, wherein the voltage boosting circuit includes a switching converter formed by connecting a choke coil and a switching circuit in series and adapted to take out a boosted voltage from the connection point of the series connection according to on/off of the switching circuit and the switching circuit is adapted to be switched from a voltage boosting mode for turning on/off the switching circuit to a voltage non-boosting mode for holding the switching circuit in an off condition and vice versa.

38. The apparatus according to claim 37, wherein the switching converter switches to the voltage-boosting mode after determining that the voltage of the power fed from the capacitor storage type power source to be not higher than ½ of the full charge voltage thereof.

39. The apparatus according to claim 31, wherein the control circuit is a circuit for controlling operations of turning on/off the discharge current according to pulse width modulation signals.

\* \* \* \* \*